US010952069B1

(12) United States Patent
Mohamed et al.

(10) Patent No.: US 10,952,069 B1
(45) Date of Patent: Mar. 16, 2021

(54) IOT CRYPTOSYSTEM DEVICE, SYSTEM, METHOD AND COMPUTER PROGRAM PRODUCT

(71) Applicant: Imam Abdulrahman Bin Faisal University, Dammam (SA)

(72) Inventors: Hala Ehab Hamdy Mohamed, Dammam (SA); Randa Mujahed Abualrob, Dammam (SA); Rawan Abdullah Alsleebi, Dammam (SA); Reem Fuad Shareef, Dammam (SA); Reem Ali Rawdhan, Dammam (SA); Khalid Adnan Alissa, Dammam (SA); Abdullah Mohammed Almuhaideb, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 261 days.

(21) Appl. No.: 16/142,775

(22) Filed: Sep. 26, 2018

Related U.S. Application Data

(60) Provisional application No. 62/582,747, filed on Nov. 7, 2017.

(51) Int. Cl.
*H04W 12/00* (2009.01)
*H04W 12/04* (2021.01)
(Continued)

(52) U.S. Cl.
CPC ......... *H04W 12/001* (2019.01); *H04L 9/3242* (2013.01); *H04W 12/04071* (2019.01);
(Continued)

(58) Field of Classification Search
CPC ........... H04W 12/001; H04W 12/1006; H04W 12/04071; H04W 12/1201; H04W 84/18; H04L 9/3242; H04L 2209/805
See application file for complete search history.

(56) References Cited

U.S. PATENT DOCUMENTS 6,219,421 B1    4/2001  Backal
9,438,422 B2 *  9/2016  Gutierrez ............ H04W 56/001
(Continued)

FOREIGN PATENT DOCUMENTS

CN    103001765 A    3/2013
CN    102752108 B    12/2014

OTHER PUBLICATIONS

Abugharsa, et al. ; A Novel ImageEncryption using an Integration Technique of BlocksRotation based on theMagic cube and theAESAlgorithm ; Centre of Advanced Computing Technology, Faculty Information and Communication Technology, Universiti Teknikal Malaysia Melaka ; Sep. 2012 ; 7 pages.
(Continued)

*Primary Examiner* — Cheng-Feng Huang
(74) *Attorney, Agent, or Firm* — Oblon, McClelland, Maier & Neustadt, L.L.P.

(57) ABSTRACT

Systems and methods to secure data transmission between IoT sensors and their base station that may include use of a sensor system to obtain sensor data and generate per-packet keys to obtain corresponding values from a multi-dimensional cubic array. The sensor data may be encrypted based on the multi-dimensional cubic array to generate an encrypted data value which is transmitted to a wireless access point then decrypted using the plurality of per-packet keys.

17 Claims, 45 Drawing Sheets

(51) Int. Cl.
*H04W 12/10* (2021.01)
*H04L 9/32* (2006.01)
*H04W 12/12* (2021.01)
*H04W 84/18* (2009.01)

(52) U.S. Cl.
CPC ... *H04W 12/1006* (2019.01); *H04W 12/1201* (2019.01); *H04L 2209/805* (2013.01); *H04W 84/18* (2013.01)

(56) References Cited

U.S. PATENT DOCUMENTS

| | | | | |
|---|---|---|---|---|
| 10,027,475 | B2* | 7/2018 | Rietman | H04L 9/0869 |
| 10,644,940 | B2* | 5/2020 | Mladin | H04W 4/70 |
| 2009/0164797 | A1* | 6/2009 | Kramer | G06F 21/32 |
| | | | | 713/186 |
| 2011/0040977 | A1 | 2/2011 | Farrugia et al. | |
| 2012/0121088 | A1* | 5/2012 | Hata | H04L 9/0836 |
| | | | | 380/255 |
| 2012/0159172 | A1* | 6/2012 | Saxena | H04L 63/107 |
| | | | | 713/171 |
| 2013/0138964 | A1* | 5/2013 | Joyce | G06Q 20/40145 |
| | | | | 713/176 |
| 2014/0068779 | A1* | 3/2014 | Tan | G06F 21/6218 |
| | | | | 726/26 |
| 2014/0205099 | A1* | 7/2014 | Christodorescu | |
| | | | | H04W 12/0401 |
| | | | | 380/278 |
| 2015/0229726 | A1* | 8/2015 | Jimenez | H04L 67/141 |
| | | | | 709/227 |
| 2016/0056964 | A1* | 2/2016 | Andiappan | G06F 21/602 |
| | | | | 713/189 |

OTHER PUBLICATIONS

Rawat, et al ; Text Encryption by Rubik's Cube Using Spatial Steganography ; ISST Journal of Mathematics & Computing System, vol. 7, No. 2 ; Dec. 2016 ; pp. 53-59 ; 8 pages.

* cited by examiner

IOT CRYPTOSYSTEM DEVICE, SYSTEM, METHOD AND COMPUTER PROGRAM PRODUCT

CROSS-REFERENCE TO RELATED APPLICATIONS

The present application claims priority to U.S. provisional application No. 62/582,747, having a filing date of Nov. 7, 2017, the entire contents of which are incorporated herein by reference.

STATEMENT REGARDING PRIOR DISCLOSURE BY THE INVENTORS

Aspects of this technology are described in "The BitCube Cryptosystem—Lightweight Algorithm for the Wireless Sensor Networks in the Internet of Things Environments," a project research paper submitted in partial fulfillment of the requirements for the degree of Bachelor of Science in Cybersecurity and Digital Forensics, by Hala Ehab Hamdy Mohamed, Randa Mujahed Abualrob, Rawan Abdullah AlSleebi, Reem Fuad Shareef, and Reem Ali Rawdhan, Khalid Adnan Alissa, and Abdullah Mohammed Almuhaideb—Imam Abdulrahman bin Faisal University—College of Computer Sciences & Information Technology, April 2018—incorporated herein by reference in its entirety.

BACKGROUND

Field of Disclosure

The present disclosure relates generally to Internet of things (IoT) devices, and, more particularly, to a lightweight cryptosystem to encrypt data transmitted between IoT sensors and another wireless device (e.g., a wireless access point or AP).

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The development of the internet resulted in many new innovations, including the Internet of Things (or IoT). The term "Internet of Things" refers to communications between things (or devices) over the internet. The "things" or devices within an IoT system can include computers, electrical devices, mechanical devices having electrical interfaces, or sensors.

A review of different methodologies that have been used in IoT follows. Investigating the world of IoT starts from the point of the Internet's emergence. See Kumar, J. S., & Patel, D. R. (2014). *A survey on internet of things: Security and privacy issues*. International Journal of Computer Applications 90(11), incorporated herein by reference in its entirety. During the late 1960s, scientists succeeded connecting two computers and creating a small network for sharing information between devices. See Campbell-Kelly, M. (1987). *Data communications at the national physical laboratory (1965-1975)*. Annals of the History of Computing 9(3), doi:10.1109/MAHC.1987.10023; and Perera, C., Zaslaysky, A, Christen, P., & Georgakopoulos, D. (2014). *Context aware computing for the internet of things: A survey*. IEEE Communications Surveys & Tutorials, 16(1), 414-454. doi: 10.1109/SURV.2013.042313.00197, each incorporated herein by reference in their entirety. The concept of layering and the TCP/IP stack was initially published in the early 1980s and was followed by the appearance of the commercial use of the Internet later in that same decade.

In 2014, Kumar & Patel explored the spread of the Internet and its evolution stating that such evolution began when people knew about the World Wide Web in 1991, and it continued to grow when wireless networks and mobile phones were connected over the Internet, which was a further step in the Internet evolution because different types of devices were able to communicate from everywhere without caring about the spatial burdens. Social networks, VoIP, and video call services, allowed people to be connected to the wide web.

Such evolution naturally led researchers to ask if people were able to connect computers, mobile devices, and even themselves to the Internet, then why not permit other objects or devices to connect to the Internet?

One idea behind IoT is to permit objects to communicate with each other over the Internet with minimum human interactions. See Kumar & Patel et. al.; and Oweis, N. E., Aracenay, C, George, W., Oweis, M., Soon, H., & Snasel, V. (2016). *Internet of things: Overview, sources, applications and challenges*. In Proceedings of the Second International Afro-European Conference for Industrial Advancement AECIA 2015 (pp. 57-67). Springer, Cham, each incorporated herein by reference in their entirety. Kumar & Patel mentioned in their paper a fact that the first IoT device was introduced in 1999, and it was a smart toaster. The growth of IoT had begun since that time, especially after Kevin Ashton coined the term "Internet of things".

In 2016, in a paper titled "Internet of things: Overview, sources, applications and challenges," Oweis et al. stated that in 2011, 13 billion devices were connected to the internet and the number is expected to reach 50 billion by 2020. IBM Institute expected the economic impact of IoT by 2025 will be from $3.9 to $11.1 trillion per year. See IBM Institute for Business Value. (2015, November). *Redefining boundaries: The Global C-Suite Study*, incorporated herein by reference in its entirety. Where McKinsey declared that more than 50% of CxO executives consider IoT as an important technology. See McKinsey Global Institute. (2015, June). *The Internet of Things: Mapping the Value Beyond the Hype*, incorporated herein by reference in its entirety.

Because of such rapid development, in 2016, Tabane & Zuva asked "Are we doing enough to protect these devices from vulnerability threats of intrusion and outside interference that can end up compromising the security, personal privacy and general public safety at large?" See Tabane, E., & Zuva, T. (2016). *Is there a Room for security and Privacy in IoT?* Institute of Electrical and Electronics Engineers (IEEE), incorporated herein by reference in its entirety. Tabane & Zuva in their paper "Is there a Room for security and Privacy in IoT?", discussed different aspects related to IoT (e.g. IoT security threats and challenges) to conclude that we are not doing enough to protect the IoT devices. Tabane & Zuva discussed how until today there is an urgent need for IoT security and privacy since most current adopted solutions and security protocols are either expensive or require a considerable amount of resources and memory.

As noted above, the Internet of Things (IoT) is a rapidly developing area of technology. IoT devices can have the capability to sense and share data over the Internet to build a number of smart systems. See Muhammad Usman, Irfan Ahmedy, Imran Aslamy, Shuj aat Khan, Usman Ali Shah. (2017). *SIT: A Lightweight Encryption Algorithm for Secure Internet of Things*. International Journal of Advanced Computer Science and Applications, 10, incorporated herein by reference in its entirety. To achieve contemplated objectives, IoT environments can include a wide range of technologies. One of the more utilized technology aspects of IoT systems is the Wireless Sensor Network (WSN).

The concept of WSN security has been gaining attention due to rapid advancements in IoT device making use of this technology. In some IoT systems, critical data may be transferred unencrypted through the wireless network traffic. Therefore, the data can be compromised by unauthorized intruders. See Jongdeog Lee, Krasimira Kapitanova, Sang Son. (2010). *The Price of Security in Wireless Sensor Networks*. Computer Networks, p. 9, incorporated herein by reference in its entirety. Accordingly, development and implementation of cryptographic algorithms in IoT traffic is a concern. However, the need to implement cryptographic algorithms in this unencrypted traffic is raising a challenging issue due to limitations in WSN resources (e.g., computing power or throughput, memory, processing or communication speed, power, etc.). Therefore, it is important to incorporate an appropriate secure and efficient cryptographic algorithm. The algorithm requirements should be commensurate with the resources of IoT sensors (e.g. memory size, processing speed, or low battery life), and overcome many obstacles. See Liang Wei, Xu Jianbo, Tang Mingdong, Huang Li. (2009). *A New Embedded Encryption Algorithm for Wireless Sensor Networks*. (p. 4). IEEE, incorporated herein by reference in its entirety.

The reliance and usage of smart devices and their vivid features have rapidly grown, which raise the need for security in IoT. See Vikram, N., Raksha, N., Nihaal, M., Harish, K., & Shetty, K. (2017). *A Low Cost Home Automation System Using Wi-Fi Based Wireless Sensor Network Incorporating Internet of Things (IoT)*. Institute of Electrical and Electronics Engineers (IEEE), incorporated herein by reference in its entirety. WSNs are the eyes, hands, and ears of IoT, and securing them means securing IoT. Given the vast benefits that WSNs offer (e.g. real-time traffic monitoring), they are used in various fields such as retail, health care, and home automation. In every field, sensitive data are found that are threatened by unencrypted WSNs.

WSNs are open wireless communication networks. Therefore, they are vulnerable to security threats and attacks. Understanding the security performance in wireless communications is important for managing security in WSN and IoT in general.

WSNs in IoT environments are facing a wide variety of security vulnerabilities that compromise sensitive data. Consequently, the need for reliable security mechanisms between the sensors in the IoT environments has increased. Although many security solutions have been proposed, applying these solutions may face number of limitations. The constraints of the wireless sensors such as memory size, processing speed, and low battery life, may limit the applicability of existing solutions.

The concept of implementing encryption in a WSN is not new. Many existing studies have proposed models and designs to encrypt WSNs traffic, these have failed to meet WSN requirements (e.g., memory size, processing speed, or low battery life, to name a few). See Haythem Hayouni, Mohamed Hamdi, Tai-Hoon Kim. (2014). *A Survey on Encryption Schemes in Wireless Sensor Networks*. Advanced Software Engineering and Its Applications (ASEA) (p. 5). IEEE; Satyabrata Roy, Jyotirmoy Karjee, Rawat Dayama Pratik, NilanjanDey. (2016). *Symmetric Key Encryption Technique: A Cellular Automata based Approach in Wireless Sensor Networks*. Procedia Computer Science; Panda, M. (2014). *Security in Wireless Sensor Networks using Cryptographic Techniques*. American Journal of Engineering Research (AJER), 7; Bandirmali, N., Erturk, I., & Ceken, C. (2009). *Securing Data Transfer in Delay-sensitive and Energy-aware WSNs Using the Scalable Encryption Algorithm*. 2009 4th International Symposium on Wireless Pervasive Computing. IEEE; Yu, W., & Köse, S. (2017). *A Lightweight Masked AES Implementation for Securing IoT Against CPA Attacks*. 64(11), 2934-2944; Benhadjyoussef, N., Mestiri, H., & Machhout, M. (2012). *Implementation of CPA analysis against AES design on FPGA*. 2012 International Conference on Communications and Information Technology (pp. 124-128). IEEE; Tiri, K., Hwang, D., Hodjat, A., Lai, B.-C., Yang, S., Schaumont, P., & Verbauwhede, I. (2005). *AES-based cryptographic and biometric security coprocessor IC in 0.18-µm CMOS resistant to side-channel power analysis attacks*. Digest of Technical Papers. 2005 Symposium on VLSI Circuits (pp. 216-219). IEEE; Juha Kukkurainen, Mikael Soini, Lauri Sydanheimo. (2010). *RC5-Based Security in Wireless Sensor Networks*, WSEAS TRANSACTIONS on COMPUTERS, 10; Babu Karuppiah, Rajaram. (2012). *Energy Efficient Encryption Algorithm for Wireless Sensor Network*. International Journal of Engineering Research & Technology (IJERT); Shailesh Sisat, Shrikant Honade. (2016). *Security and Privacy in Wireless Sensor Network Using RC6 Algorithm*. International Journal of Advanced Engineering Research and Science (IJAERS); Sritha, Ashokkumar, Bhuvaneswari, Vidhya. (2014). *A new modified RC6 algorithm for cryptographic applications*. International Journal of Advanced Research in Computer and Communication Engineering, 4; Prachi Pathak, Mohd. Amjad Quaz. (2016). *Issues, Challenges and Solution for Security in Wireless Sensor Networks: A Review*. International Journal of Electrical, Electronics; Rashmi Mahidhar, Archana Raut. (2016). *A Survey On Scheduling Schemes With Security In Wireless Sensor*. Procedia Computer Science; Amin, F., Jahangir, A. H., & Rasifard, H. (2008). *Analysis of Public-Key Cryptography for Wireless Sensor Networks Security*. World Academy of Science, Engineering and Technology, 529-534; Ganesh, A. R., Manikandan, N. P., P. K., S. R., & Pl, S. (2011). *An improved AES-ECC hybrid encryption scheme for secure communication in cooperative diversity based Wireless Sensor Networks*. IEEE, 1209-1214; Subasree, S, & Sakthivel, N. K. (2010). *Design of a new security protocol using hybrid cryptography algorithms*. International Journal of Research and Reviews in Applied Sciences. 2; Ren, W, & Miao, Z. (2010, May). *A hybrid encryption algorithm based on DES and RSA in Bluetooth communication*. In Modeling, Simulation and Visualization Methods (WMSVM), 2010 Second International Conference. (pp. 221-225). IEEE; Rizk, R. & Alkady, Y. (2015). *Two-phase hybrid cryptography algorithm for wireless sensor networks*. Journal of Electrical Systems and Information Technology, 2(3), 296-313; Dubal, M. J., Mahesh, T. R., & Ghosh, P. A., (2011). *Design of a new security protocol using hybrid cryptography architecture*. In Proceedings of 3rd International Conference on Electronics Computer Technology (ICECT). Vol. 5, p. 2011; Zhu, S. H. (2011, September). *Research of hybrid Cipher algorithm application to hydraulic information transmission*. In Electronics, Communications and Control (ICECC), 2011 International Conference (pp. 3873-3876). IEEE; Bhave, A., & Jajoo, S. R. (2015). *Secure communication in*

*Wireless Sensor Networks using hybrid encryption scheme and cooperative diversity technique.* IEEE Sponsored 9th International Conference on Intelligent Systems and Control (ISCO), 1-6; Namini, S. K. (2012). *A Secure communication for wireless sensor networks: Through hybrid (AES+ECC) algorithm.* LAP Lambert Academic Publishing; Langendoerfer, P., & Sojka-Piotrowska, A. (2017). *Shortening the Security Parameters in Lightweight WSN Applications for IoT—Lessons Learned.* Institute of Electrical and Electronics Engineers (IEEE); Henriques, M. S., & Vernekar, N. K. (2017). *Using Symmetric and Asymmetric Cryptography to Secure Communication between Devices In IoT.* Institute of Electrical and Electronics Engineers (IEEE); and Rohmad, M. S., Saparon, A., Amaran, H., Arif, N., & Hashim, H. (2017). Lightweight Block Cipher on VHDL. Institute of Electrical and Electronics Engineers (IEEE). Each of the above is incorporated herein by reference in its entirety.

Devices within WSNs (e.g., IoT sensors) may be resource constrained, and usually operate on batteries. They handle and transmit a large amount of data, and at the same time perform other computations to execute the encryption scheme, so both operations (i.e. handling data and executing encryption) should be considered when designing an encryption algorithm. Many ventures in the sphere of WSN security don't consider the communication overhead and power consumption that are the result of huge traffic, and computation processes.

Exhausting the resources of WSN devices can mean that the organization has to replace these devices with new ones, which can put a strain on the organization financial status. Also, current studies did not consider a cost-effective solution. The cost of IoT device maintenance should never be more than the implementation cost.

IoT technology has the potential to provide a radical change, and an entirely new paradigm for many medical, social, commercial, industrial and scientific fields. See Atzori, L., Iera, A., & Morabito, G. (2010). *The Internet of Things: A survey.* ScienceDirect-Elsevier, incorporated herein by reference in its entirety. Take for instance, an example of an employee that proposes a potential solution to secure an IoT system, but the potential solution would consume the power and memory of the IoT system and the cost would be expensive, the solution is not approved to be implemented and the IoT system remains unsecure.

To have an efficient cryptosystem in WSNs, such a cryptosystem should use a key of minimum length. Many cryptosystems have been proposed, but they are not completely suitable for such needs.

Accordingly, it is one object of the present disclosure to provide an efficient method and algorithm that requires low computational complexity as a basis for securing devices and systems connected to the IoT. Such low level of computational complexity will use an efficient level of power consumption and lengthen the lifetime of IoT sensors and system connected thereto.

SUMMARY

In one aspect the present disclosure provides a lightweight security system, method and computer program product for IoT environments to permit more applications and potential opportunities for commercial entities working to expand IoT devices within targeted industries.

In exemplary embodiments the present disclosure includes a cryptographic algorithm to address a need for reliable and efficient security schemes within WSNs, which may have limited resources. In some implementations, constraints posed by an IoT sensor are mitigated and data communications are protected.

In exemplary embodiments the present disclosure includes a lightweight cryptosystem and security protocol. The lightweight cryptosystem can be suitable for WSNs and can take into account the limitations and needs particular to WSNs.

In exemplary embodiments the present disclosure includes a lightweight cryptosystem designed for the IoT environments that provides protection of data transferred between IoT sensors and access points. However, some implementations can be applicable for any environment that needs encryption and decryption.

In exemplary embodiments the present disclosure provides a method, apparatus, system and computer program product that secures IoT environments in an efficient way that does not consume the power of the IoT devices like conventional cryptosystems. Some implementations provide a high level of resistance against brute force attacks within an IoT and/or WSN environment.

In exemplary embodiments the present disclosure describes securing IoT environments that utilize WSNs in an IoT environment structure. FIG. 2 illustrates an example IoT environment scope contemplated by the disclosed subject matter. The security features provided by the cryptosystem include data confidentiality, integrity, message authentication and user authentication.

In a preferred embodiment the disclosed subject matter can be combined with a message integrity check mechanism. Also, a secure key exchange algorithm can be used initially before sending the first packet in the system.

In a preferred embodiment the method of the present disclosure includes obtaining, at a sensor system, sensor data, and generating, at the sensor system, a plurality of per-packet keys, wherein the plurality of per-packet keys is used to obtain a corresponding plurality of values from a multi-dimensional cubic array. The method can also include encrypting, at the sensor system, the sensor data using the corresponding plurality of values from the multi-dimensional cubic array to generate an encrypted data value, and transmitting, from the sensor system, a message including the encrypted data value and the plurality of per-packet keys to a wireless access point.

The method can further include receiving, at the wireless access point, the message, and decrypting, at the wireless access point, the encrypted data value using the plurality of per-packet keys to generate unencrypted sensor data. The method can also include processing, at the wireless access point, the unencrypted sensor data.

The sensor system can include an Internet of Things device. The sensor system can form a portion of a wireless sensor network.

In some implementations, the plurality of per-packet keys includes three per-packet keys. In some implementations, the multi-dimensional cubic array includes a three by three by three cubic array.

In various embodiments the encryption can include obtaining, at the sensor system, a first value from the multi-dimensional cubic array corresponding to a first per-packet key, and generating, at the sensor system, a first ciphertext based on the first value and the sensor data. The encryption can also include obtaining, at the sensor system, a second value from the multi-dimensional cubic array corresponding to a second per-packet key, and generating, at the sensor system, a second ciphertext based on the first ciphertext and the second value. The encryption can also include obtaining, at the sensor system, a third value from the multi-dimensional cubic array corresponding to a third per-packet key, and generating, at the sensor system, a third ciphertext based on the second ciphertext and the third value, wherein the encrypted data value includes the third ciphertext.

In various embodiments the method includes saving, at the sensor system, a current state of the multi-dimensional cubic array, and altering, at the sensor system, an arrangement of the multi-dimensional cubic array after generating the first ciphertext and before generating the second ciphertext. The method can further include altering, at the sensor system, an arrangement of the multi-dimensional cubic array after generating the second ciphertext and before generating the third ciphertext.

In various embodiments the present disclosure includes decryption that includes obtaining, at the wireless access point, a third value from a wireless access point multi-dimensional cubic array corresponding to a third per-packet key, and generating, at the sensor system, a first unencrypted text based on the encrypted data value and the third value. The decryption can also include obtaining, at the wireless access point, a second value from the wireless access point multi-dimensional cubic array corresponding to a second per-packet key, and generating, at the sensor system, a second unencrypted text based on the second value and the first unencrypted text. The decryption can further include obtaining, at the wireless access point, a first value from the multi-dimensional cubic array corresponding to a first per-packet key, and generating, at the wireless access point, unencrypted sensor data based on the second unencrypted text and the first value.

In some implementations, a message can include a first hash value. The method can also include generating, at the sensor system, the first hash value based on the encrypted data value and a next plurality of per-packet keys, and generating, at the wireless access point, a second hash value based on the encrypted data value and a next plurality of per-packet keys. The method can further include comparing the first hash value with the second hash value, and if the first hash value does not match the second hash value, transmitting, from the wireless access point, an indication of a potential security breach.

In various embodiments the present disclosure includes a system comprising a sensor system having one or more sensor system processors coupled to a non-transitory computer readable medium within the sensor system having stored thereon software instructions that, when executed by the one or more sensor system processors, cause the one or more sensor system processors to perform operations. The operations can include obtaining, at the sensor system, sensor data, and generating, at the sensor system, a plurality of per-packet keys, wherein the plurality of per-packet keys is used to obtain a corresponding plurality of values from a multi-dimensional cubic array. The operations can also include encrypting, at the sensor system, the sensor data using the corresponding plurality of values from the multi-dimensional cubic array to generate an encrypted data value, and transmitting, from the sensor system, a message including the encrypted data value and the plurality of per-packet keys to a wireless access point. The wireless access point can include one or more wireless access point processors coupled to a non-transitory computer readable medium within the wireless access point having stored thereon software instructions that, when executed by the one or more wireless access point processors, cause the one or more wireless access point processors to perform operations including receiving, at the wireless access point, the message, and decrypting, at the wireless access point, the encrypted data value using the plurality of per-packet keys to generate unencrypted sensor data. The operations can also include processing, at the wireless access point, the unencrypted sensor data.

In various embodiments the encryption includes obtaining, at the sensor system, a first value from the multi-dimensional cubic array corresponding to a first per-packet key, and generating, at the sensor system, a first ciphertext based on the first value and the sensor data. The encryption can also include obtaining, at the sensor system, a second value from the multi-dimensional cubic array corresponding to a second per-packet key, and generating, at the sensor system, a second ciphertext based on the first ciphertext and the second value. The encryption can also include obtaining, at the sensor system, a third value from the multi-dimensional cubic array corresponding to a third per-packet key, and generating, at the sensor system, a third ciphertext based on the second ciphertext and the third value, wherein the encrypted data value includes the third ciphertext.

In various embodiments the operations includes saving, at the sensor system, a current state of the multi-dimensional cubic array, and altering, at the sensor system, an arrangement of the multi-dimensional cubic array after generating the first ciphertext and before generating the second ciphertext. The operations can further include altering, at the sensor system, an arrangement of the multi-dimensional cubic array after generating the second ciphertext and before generating the third ciphertext.

In various embodiments the decryption includes obtaining, at the wireless access point, a third value from a wireless access point multi-dimensional cubic array corresponding to a third per-packet key, and generating, at the sensor system, a first unencrypted text based on the encrypted data value and the third value. The decryption can also include obtaining, at the wireless access point, a second value from the wireless access point multi-dimensional cubic array corresponding to a second per-packet key, and generating, at the sensor system, a second unencrypted text based on the second value and the first unencrypted text. The decryption can further include obtaining, at the wireless access point, a first value from the multi-dimensional cubic array corresponding to a first per-packet key, and generating, at the wireless access point, unencrypted sensor data based on the second unencrypted text and the first value.

In some implementations, the message can include a first hash value. The method can also include generating, at the sensor system, the first hash value based on the encrypted data value and a next plurality of per-packet keys, and generating, at the wireless access point, a second hash value based on the encrypted data value and a next plurality of per-packet keys. The method can further include comparing the first hash value with the second hash value, and if the first hash value does not match the second hash value, transmitting, from the wireless access point, an indication of a potential security breach.

Various embodiments include a non-transitory computer readable medium having instructions stored therein that, when executed by one or more processors, cause the one or more processors to perform a method. The method can include obtaining, at a sensor system, sensor data, and generating, at the sensor system, a plurality of per-packet keys, wherein the plurality of per-packet keys is used to obtain a corresponding plurality of values from a multi-dimensional cubic array. The method can also include encrypting, at the sensor system, the sensor data using the corresponding plurality of values from the multi-dimensional cubic array to generate an encrypted data value, and transmitting, from the sensor system, a message including the encrypted data value and the plurality of per-packet keys to a wireless access point.

In an embodiment the method includes receiving, at the wireless access point, the message, and decrypting, at the wireless access point, the encrypted data value using the plurality of per-packet keys to generate unencrypted sensor data. The method can also include processing, at the wireless access point, the unencrypted sensor data.

In an embodiment a sensor system includes an Internet of Things device. The sensor system can form a portion of a wireless sensor network.

In some implementations, the plurality of per-packet keys includes three per-packet keys. In some implementations, the multi-dimensional cubic array includes a three by three by three cubic array.

In an embodiment encryption includes obtaining, at the sensor system, a first value from the multi-dimensional cubic array corresponding to a first per-packet key, and generating, at the sensor system, a first ciphertext based on the first value and the sensor data. The encryption can also include obtaining, at the sensor system, a second value from the multi-dimensional cubic array corresponding to a second per-packet key, and generating, at the sensor system, a second ciphertext based on the first ciphertext and the second value. The encryption can also include obtaining, at the sensor system, a third value from the multi-dimensional cubic array corresponding to a third per-packet key, and generating, at the sensor system, a third ciphertext based on the second ciphertext and the third value, wherein the encrypted data value includes the third ciphertext.

In an embodiment the method includes saving, at the sensor system, a current state of the multi-dimensional cubic array, and altering, at the sensor system, an arrangement of the multi-dimensional cubic array after generating the first ciphertext and before generating the second ciphertext. The method can further include altering, at the sensor system, an arrangement of the multi-dimensional cubic array after generating the second ciphertext and before generating the third ciphertext.

In an embodiment decryption includes obtaining, at the wireless access point, a third value from a wireless access point multi-dimensional cubic array corresponding to a third per-packet key, and generating, at the sensor system, a first unencrypted text based on the encrypted data value and the third value. The decryption can also include obtaining, at the wireless access point, a second value from the wireless access point multi-dimensional cubic array corresponding to a second per-packet key, and generating, at the sensor system, a second unencrypted text based on the second value and the first unencrypted text. The decryption can further include obtaining, at the wireless access point, a first value from the multi-dimensional cubic array corresponding to a first per-packet key, and generating, at the wireless access point, unencrypted sensor data based on the second unencrypted text and the first value.

In various implementations, the message can include a first hash value. The method can also include generating, at the sensor system, the first hash value based on the encrypted data value and a next plurality of per-packet keys, and generating, at the wireless access point, a second hash value based on the encrypted data value and a next plurality of per-packet keys. The method can further include comparing the first hash value with the second hash value, and if the first hash value does not match the second hash value, transmitting, from the wireless access point, an indication of a potential security breach.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 14 is a diagram showing an original state of a cube puzzle metaphor in accordance with some implementations.

FIG. 15 is a diagram of an example cube puzzle metaphor after one scattering process has been applied in accordance with some implementations.

FIG. 16 is a diagram of an example cube puzzle metaphor after ten scattering processes have been applied in accordance with some implementations.

Figure 29:
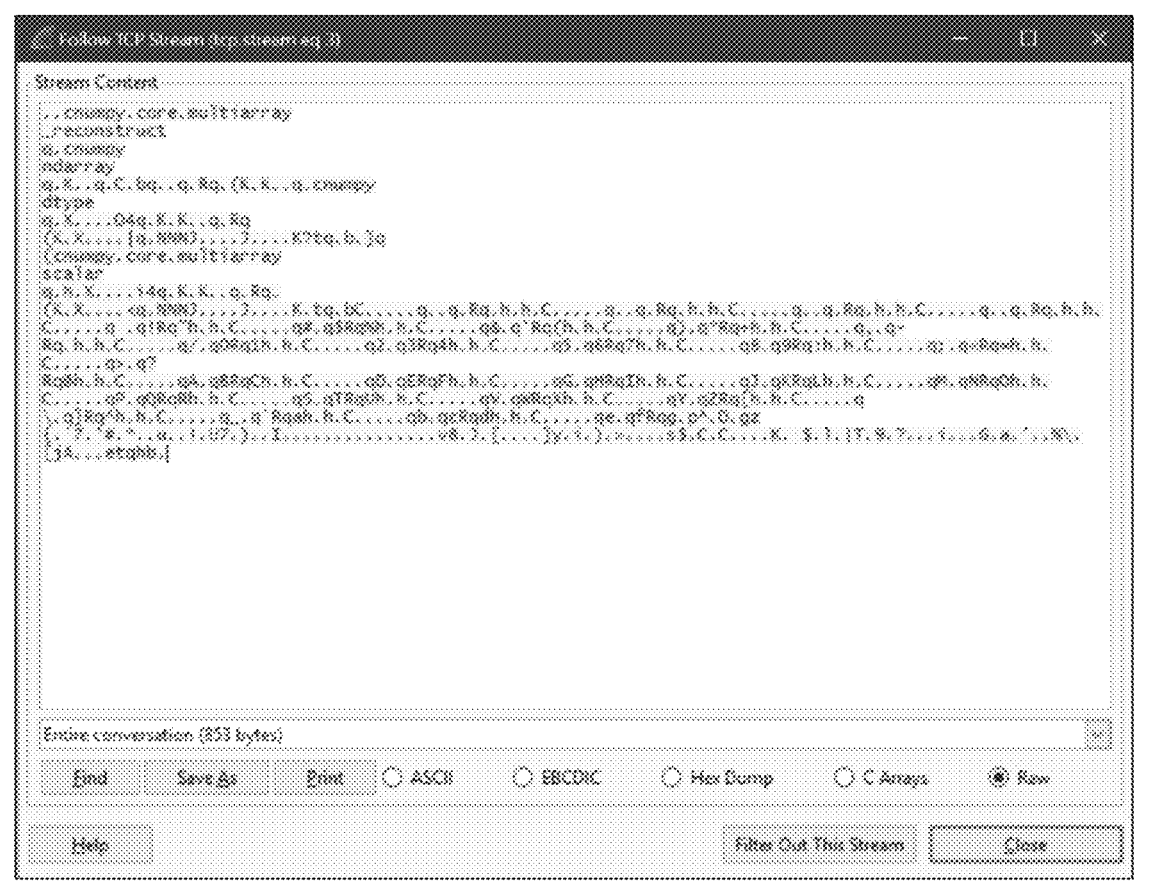

FIG. 29 is a diagram of an example TCP stream of encrypted messages in accordance with some implementations.

DETAILED DESCRIPTION OF THE EMBODIMENTS

Figure 1:
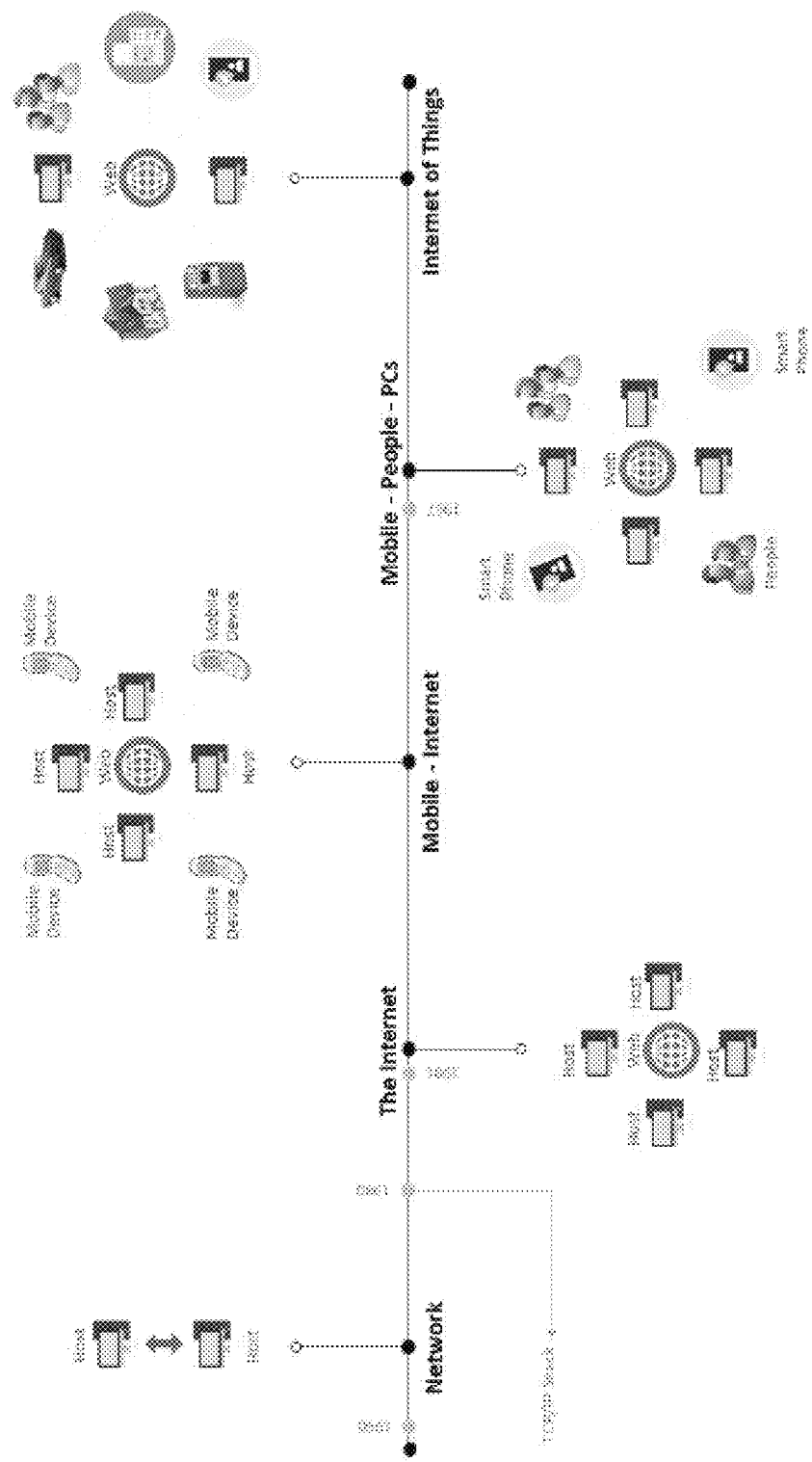
FIG. 1 is a diagram showing an evolution of IoT.
Figure 2:
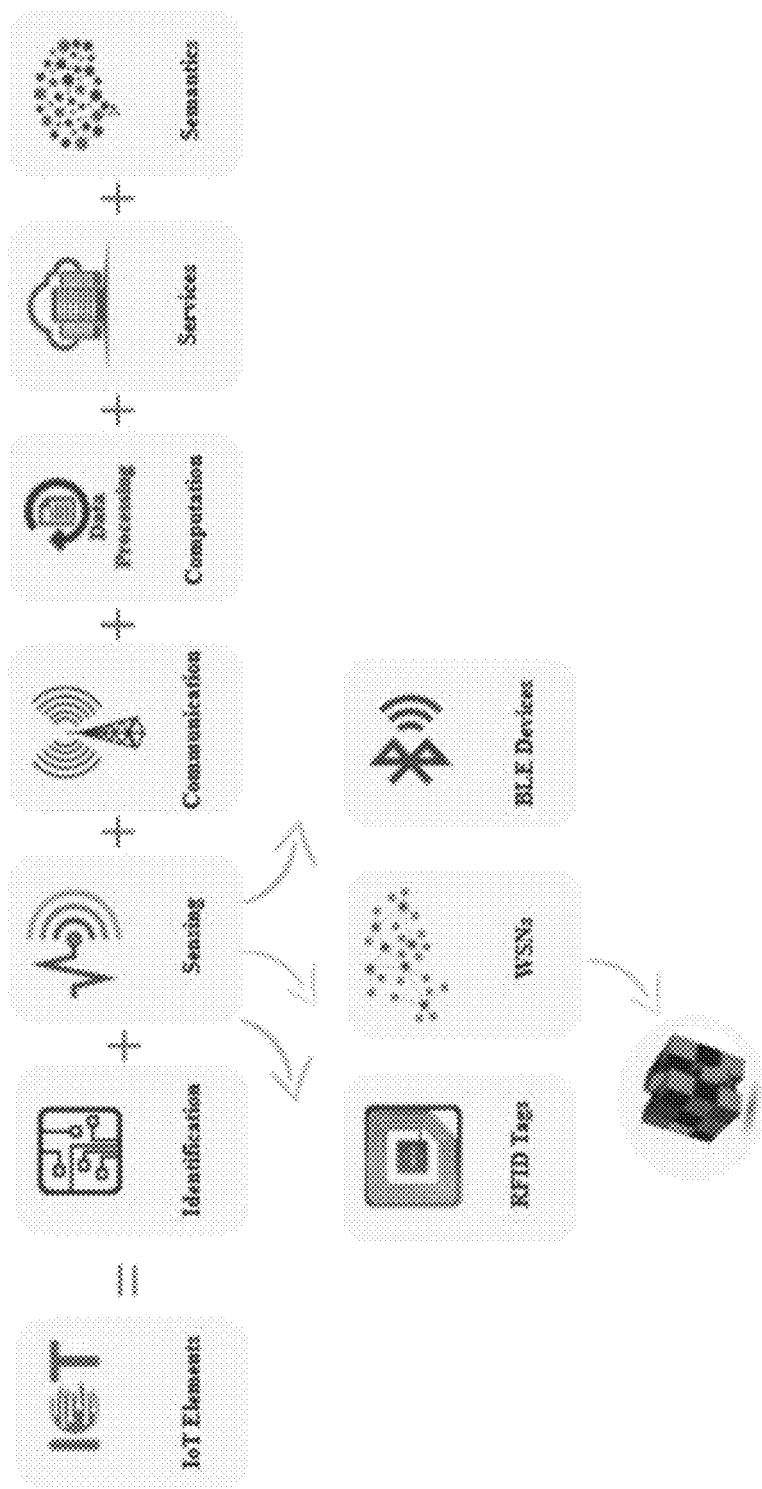
FIG. 2 is a diagram of example areas of IoT suitable for a cryptosystem in accordance with some implementations.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

The growth of IoT facilitates human lives in many fields. However, every new technology introduces new security challenges, and although IoT offers many opportunities, it is still not completely protected. For example, an IoT product (e.g. baby monitor) when not secured properly can be exploited by attackers to serve as an entry point to carry out attacks. Oracevic et. al. points out one of the biggest challenges for IoT is to ensure data privacy and protection.

In 2017, Soos et. al. discussed how IoT is not mature in the safety and security fields, by supporting this idea with a considerable number of vulnerabilities and threats found in IoT systems' layers, and although according to Soos et. al. these layers are not standardized yet; a number of researchers classify the attacks in a layered approach. See Soos, G., Plosz, S., Varga, P., & Hegedus, C. (2017). *Security Threats and Issues in Automation IoT.* Institute of Electrical and Electronics Engineers (IEEE), incorporated herein by reference in its entirety. Oracevic et. al. divides the IoT architecture into three layers: Application layer, Transportation layer, and a Sensing layer. Where Krishna & Gnanasekaran have classified the IoT architecture into four layers: Application layer, Middleware layer, Network layer, and Perception layer. Soos et. al. also divides the IoT architecture into four layers but some layers are given different names: Application layer, Data Processing layer, Networking layer and Sensors and Actuators layer. From a perspective of functionalities, the present disclosure and various implementations thereof will reference the Da Xu et. al. standard. See Da Xu, L., He, W., & Li, S. (2014). *Internet of things in industries: A survey.* IEEE Transactions on industrial informatics, 10(4), 2233-2243, incorporated herein by reference in its entirety.

Da Xu Standard for IoT Architecture

Figure 3:
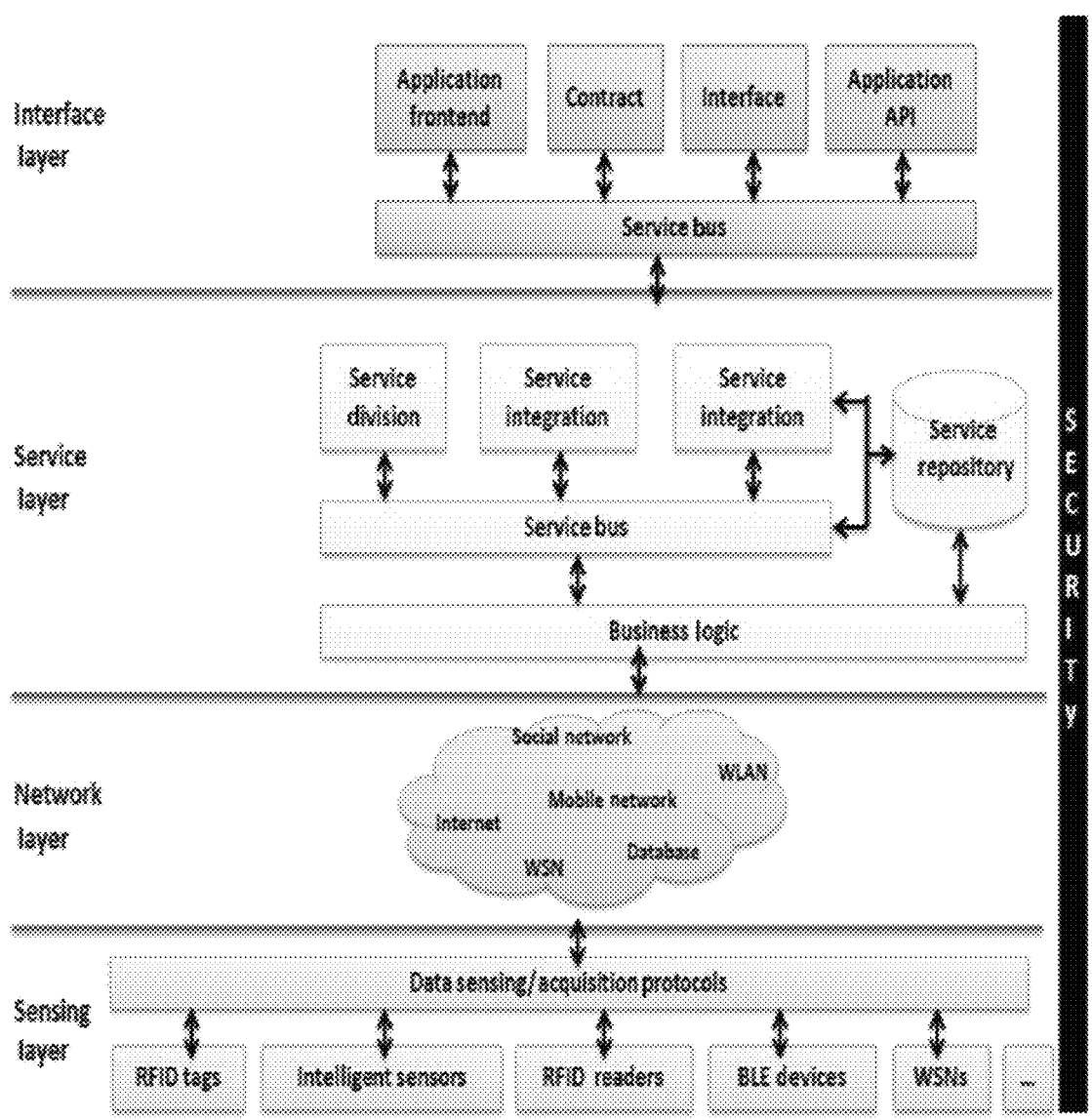
FIG. 3 is a diagram showing IoT layers and associated technologies in accordance with some implementations.

This model classifies the IoT architecture as four layers. Each layer has its feature and functionalities. These layers are Interface Layer, Service Layer, Network Layer, and Sensing Layer. FIG. 3 is a diagram showing an overview of each layer of IoT and its corresponding technologies.

Interface Layer

The interface layer is the upper layer of the IoT structure. It can also be could the user layer. The layer includes the technologies that provide an interaction methodology between the users and the applications.

Service Layer

The service layer is the second layer in the model, it is responsible for the services creation and management. It provides the services according to the user needs.

Network Layer

This layer provides the basic networking support for the data transfer over the wired and/or the wireless medium. This layer utilizes a wide range of technologies like Wireless Sensor Networks (WSN), Wireless Local Area Networks (WLANs), and social networks.

Sensing Layer

The sensing layer integrates the hardware technologies that sense the physical word and acquire the data. The sensing layer may utilize Radio-Frequency Identification (RFID), Wireless Sensor Networks (WSNs), or Intelligence Sensors (IS).

Each layer of the IoT architecture has its own requirements, such as energy, performance, efficiency, and/or security. However, to achieve suitable performance in the environment of IoT, a proposed solution should acquire a good performance rating score in each of the four layers. Security is one of these requirements, and it has to be considered in the implementation of the four layers to ensure the security of the world of IoT.

The layers that presented challenges include the sensing and the network layers because they utilize WSNs as one of their technologies. The sensing layer includes vulnerabilities like tampering of the end devices and the communication link. Tampering has, in some circumstances, been solved by using tamper-resistant packaging, but it can be seen expensive. See Hossain, M., Hasa, R., & Fotouhi, M. (2015). *Towards an analysis of security issues, challenges, and open problems in the internet of things*. Institute of Electrical and Electronics Engineers (IEEE); and Soos et. al.; each incorporated herein by reference in their entirety.

Just like the sensing layer, the "Networking Layer" has a great number of vulnerabilities. An attack on this layer related to a problem described herein is the "Man-in-the-Middle attack". It includes three categories; Eavesdropping, Routing attack, and Replay attack. According to Soos et. al., the countermeasures for such attacks can be found in encryption. To apply encryption on this layer it needs to be lightweight, processing-friendly and cheap. The following section will discuss. To understand the requirements for an IoT cryptosystem, a number of limitations of WSNs are explained herein.

WSNs have a large impact on the IoT vision. See Singh, G., & Bhagat, N. (2015, April). *A Review on BlackHole Attack Issues*. International Journal of Advanced Research in Computer Science, 6, incorporated herein by reference in its entirety. Singh & Bhagat highlighted the integration of WSN into IoT, and how such integration brought new security challenges, and raised the possibility of attacks through five traditional layers.

In 2016, WSNs attacks were classified into two main categories: passive attacks and active attacks. See Patle, A., & Gupta, N. (2016). *Vulnerabilities, Attack Effect and Different Security Scheme in WSN. A Survey*, each incorporated herein by reference in their entirety. In passive attacks, the connection between sensors is not affected. The attacker just monitors the communication and attack the WSN privacy. This can be done by two techniques: "monitor and eavesdropping", and "traffic analysis". In "monitor and eavesdropping", the attacker can easily spoof the network traffic and extract the control information of WSN configuration. Behavior o the sensors can be analyzed even if the network is encrypted. The attackers analyze encrypted data and still can discover important information.

Active attacks are similar to passive attacks in term of listening to the network, in addition to that, the attacker interacts with the network. For example, there are five common types of active attacks. The first type of attack is the blackhole attack where the attack changes the route path of a packet. The second type attack is sybil attack when a malicious node place itself in multiple locations in the network to target the routing protocol. This malicious node utilizes the fault tolerance scheme. See Singh, V. P., Jain, S., & Singhai, J. (2010, may). *Hello Flood Attack and its Countermeasures in Wireless Sensor Networks*. International Journal of Computer Science Issues, 7(3), incorporated herein by reference in its entirety. The third attack is the HELLO Flood attack which targets the routing protocol used in WSNs to negatively affect the topology maintenance and the flow control.

The fourth attack is Denial of Service (DoS) attack where the attacker overwhelms the network by sending too many packets. The fifth attack is Wormhole attack that can target any communication in the network since it has confidentiality and authenticity. The attacker logs the packet information in one location and replays them to another location in the network.

Because of the sensitive data found in WSN, in 2017, Alrababah et. al. demonstrated the WSN challenges which are classified based on WSN architecture itself. To ensure the secure communication on the sensor networks these goals need to be achieved; confidentiality, integrity, availability, authentication, and non-repudiation. See Alrababah, D., Alshammari, E., & Alsuht, A. (2017). A Survey: Authentication Protocols for Wireless Sensor Network in the Internet of Things; Keys and Attacks. The International Conference on new Trends in Computing Sciences (ICTCS), incorporated herein by reference in its entirety. Also, they provided a comparison between the existing protocols used in WSN based on different characteristics; the mechanism of the protocol and the types of attacks prevented. As discussed herein, the major attacks from the chosen protocols are: masquerading attack, forgery, replay attack, and man-in-the-middle attacks. Salleh et. al. state that the threats of WSN will always exist as long as new technologies are created, as they will create new threats. To stop the current threats, one has to think on different levels such as, using security tools, developing encryption algorithms, implementing a useful protocol and so on. See Salleh, A., Mamat, K., & Darus, M. Y. (2017). *Integration of wireless sensor network and Web of Things: Security perspective*. IEEE 8th Control and System Graduate Research Colloquium (ICSGRC), 138-143, incorporated herein by reference in its entirety.

Hence there are a number of limitations of WSNs that act as barriers to the implementation of a large variety of encryption algorithms that meet WSN requirements.

Cryptosystems can be divided into three main categories; symmetric, asymmetric, and hybrid algorithms.

The symmetric key algorithm is an encryption scheme that uses the same key for performing both encryption and decryption. Since the use of the public key is too expensive compared with constrained sensors, most of the proposed algorithms are based on symmetric key algorithm. A number of existing WSN encryption techniques including the Advanced Encryption Algorithm (AES), Rivest Cipher 5 (RC5) and Rivest Cipher 6 (RC6), and Elliptic-Curve Cryptography (ECC) techniques.

Advanced Encryption Standard (AES)

Bandirmali et. al. discusses the Skipjack encryption algorithm, which is an algorithm suitable to be implemented in IoT devices. But as reliability demand increases, there can be a need for a more reliable encryption algorithm to be used in IoT. Accordingly, AES cryptography began to be utilized after its old version, Data Encryption Standards (DES), was found to be inadequate to secure new technology. AES uses symmetric keys that process data as blocks using one of a key length that is either 128-bit, 192-bit or 256-bit key. When cryptosystems are implemented physically, a number of side channel information is released. This released information can be analyzed to extract important information such as secret keys.

An attack called Correlation Power Analysis (CPA) started to be used as a result of implementing AES encryption physically. In a CPA attack, the correlation between the data and the power consumption is explored to extract the secret keys.

Masked AES came after AES, it is a development of AES algorithm to protect the secret keys in the AES engine from CPA attacks. The masked AES technique adds random data by a masked algorithm to the plaintext in the encryption to mitigate the side channel attacks. Before the encryption is completed, the resulting data from the masking algorithm is removed to extract the original ciphertext.

Another solution to mitigate the CPA attack is to replace balanced logic gates, XOR, with Wave Dynamic Differential Logic (WDDL)-based XOR because WDDL hides the correlation between the data and the false key. Since WDDL consumes the AES engine and reduces performance, the false key based AES utilizes the WDDL only in the reconstruction stage. To this end, a false key based AES adds more security in an efficient technique that is suitable for IoT.

Rivest Cipher (RC)

In 2010, Kukkurainen et. al. proposed RC5 as an encryption algorithm for IoT sensors. RC5 which refers to Rivest Cipher is a symmetric block Cipher algorithm, that transfers a message block of a fixed-length into a Cipher block message with the same size. It uses three basic operations in the encryption and decryption which are integer addition, bitwise XOR, and variable rotation. Kukkurainen et. al. considered RC5 one of the best encryption algorithms for IoT sensors due to its performance that overcomes memory and processing limitations issues of IoT sensors. Furthermore, Kukkurainen et. al. mentioned that RC5 is better than AES when compared with speed and memory requirements. Also, it uses the concept of the data-dependent rotations that increases the security of the algorithm.

Although RC5 was suitable for encryption of sensed data, it may not be secure for all possible parameter values. For example, RC5 needs a maximum parameter value to be secure enough, but at the same time, big values contribute to an overhead on the sensor. Moreover, Karuppiah and Rajaram suggested 18-20 rounds as sufficient protection, but on the other hand, the number of rotation depends on the data size the collected by the sensor not predetermined.

In 2016, Sisat and Honade studied RC6 implementation to secure the sensed data in IoT sensor transmission. RC6 algorithm is based on RC5 with a number of improvements and enhancements. The main adjustment that was made was to make RC6 meet the AES's requirements, to increase security, and improve performance. RC6 uses four registers instead of two which decreases the number of rotation to the half. Honade & Sisat stated that RC6 is better than RC5 in terms of memory, energy requirement and speed.

Elliptic-Curve Cryptography (ECC)

ECC depends on the discrete logarithm problem and it works in three steps: key agreement, encryption, and decryption. Many researchers felt that the efficiency of an asymmetric algorithm was not suitable for WSNs because it requires a high power. However, a number of studies as Amin, et al., use Elliptic-Curve Cryptography (ECC) for encrypting WSNs, this is due to the small size of the key found in ECC. The small key size offers the same level of security in RSA. ECC uses 160-bits key rather than 1024-RSA bits and thus reduces memory usage, power, and bandwidth.

Proposed Cryptographic Algorithms in WSNs

The algorithms mentioned above, whether symmetric or asymmetric, have certain strengths and weaknesses. Consequently, different cryptosystems based on the combination of symmetric algorithms, asymmetric algorithms, or both of them have been proposed to provide greater WSN security.

In 2010, Subasree, and Sakthivel proposed one security algorithm that first encrypts the data using ECC, and then the encrypted data is hashed by MD5, then, DUAL RSA encryption is applied for the encrypted data and its hash. Due to the two different data encryption algorithms that were applied, it is difficult to extract the plaintext from the ciphertext. Further, computation time increases, posing an overload to the device. During the same year, Ren, and Miao designed an algorithm that uses DES to encrypt data, and RSA to encrypt the key. As noted by Rizk and Alkady such a combination constricted the security level.

During 2011, three encryption schemes were suggested. The first one proposed by Dubal, Mahesh, and Ghosh included a new system that generates a key using Elliptic-Curve Diffie-Hellman (ECDH), and encrypts the data using DUAL RSA. Hashing and signing techniques were also applied by this algorithm using MD5 and ECDSA. Since the proposed algorithm using two asymmetric algorithms, a high power usage will be produced, and the computation process will decelerate.

The second scheme was suggested by Zhu and it was a hybrid algorithm that encrypts the data with AES, and then encrypts the AES key and digital signature using an asymmetric algorithm. This scheme has been criticized by Rizk and Alkady and it is considered as insecure algorithm because it encrypts the data in one single phase.

The third suggested algorithm was proposed in 2011 by Ganesh et. al. which recognized the limitation of symmetric and asymmetric encryption. In response a hybrid encryption scheme was proposed which is a combination of AES and ECC using Extended Cooperative Space-time Block Codes (ECBSTBC) for transmission in WSN. The proposed algorithm provides the advantages of both AES and ECC. First, the data is encrypted by AES. Then, the encrypted data is encrypted with ECC. Moreover, in 2015, Bhave and Jajoo employed a hybrid scheme similar to the one previously studied by Ganesh et. al. At the end of these studies, it was shown that the security of WSNs is significantly expanded with the hybrid scheme compared to symmetric and asymmetric algorithm alone, but it requires long execution time. During 2012, Kumar Namini suggested a new hybrid algorithm. The algorithm combines AES and ECC to encrypt the data and it uses MD5 for hashing. Although applying a hybrid algorithm needs less computation than two asymmetric cryptosystems, it requires a long execution time.

In 2017, Langendoerfer & Sojka-Piotrowska proposed a cryptographic algorithm that is based on ECC. This algorithm uses a key that is reduced in size to suit IoT devices that require fast, low-energy consumptions and secure algorithms. Although the algorithm is designed efficiently, the paper has a number of restrictions and limitations for the algorithm to be applicable. For example, it is usable for specific scenarios (e.g., a close group of nodes). To join a group, a node has to have a ticket from a trusted third party. The algorithm is only suitable to secure short data payloads, which is not the case for a lot of the IoT products that send a considerable amount of traffic every minute or so. According to Langendoerfer & Sojka-Piotrowska, the proposed algorithm will not replace a lot of the existing state of the art security protocols.

In 2015, Rizk, and Alkady proposed a two-phase hybrid cryptography algorithm (THCA). The main goal of the proposed algorithm was to trick the hacker by splitting the data into two parts. Each part has applied different schema. In the first part, a combination of AES and ECC is used to encrypt the data. The second part of the encryption is done by XOR-DUAL RSA. Moreover, it provides a data integrity checking by using MD5.

In 2017, Henriques & Vernekar proposed a technique that combines both symmetric and asymmetric cryptography. As Henriques & Vernekar claim, such combination will reduce time. The two cryptographic algorithms that were combined are a modified version of the Vigenere Cipher, and RSA algorithm, and here is the problem of such proposition because, by all the references used in this section, it should be obvious by now that RSA is not the right choice for encrypting IoT devices. Furthermore, Henriques & Vernekar used another algorithm to encrypt a certain part of the network, it didn't actually combine the two algorithms into new modified one. Finally, Henriques & Vernekar limited the size of module to the number of alphabet characters, which exposes such a technique to brute-force attacks.

In 2017, Rohmad et. al. compared between existing lightweight block ciphers, the comparison is based on security, and the physical size on hardware. These compared lightweight block ciphers are Present, DESXL, TEA and Simon. First, when AES was compared to Present, it was found that AES has 4 complex operations, where Present has only 2 simple operations, which led into classifying Present as an ultra-lightweight block Cipher. Rohmad et. al. concluded their study by stating "Hence the strongest Cipher is Present due to the stringent cryptanalysis on it presented in the paper produce by its author".

The techniques discussed above are compared and analyzed against a number of criteria in Table 1 and Table 2. In these tables, the comparison elements that fall under the "Security Requirements" and the "Lightweight Features" are the considered criteria. Table 1 compares the existed cryptographic algorithms in IoT environments. While Table 2 compares the proposed cryptographic systems for this environment.

First, it should be noted that almost all the papers (in both tables) have the mark "● Applied Completely" or "◐ Applied Partially" under "Confidentiality" because all of the techniques discussed above use an encryption algorithm.

In Table 2, Dubal achieved almost all of the "Security Requirements" but unfortunately failed at achieving at least one "Lightweight Feature". On the other hand, RC6 in Table 1 succeeded at achieving almost all of the "Lightweight Features" but for the "Security Requirements", RC6 only has means for "Confidentiality".

From Tables 1 and 2, it can be seen that certain techniques provide promising results in a number of aspects of the criteria, but fail at achieving favorable results in other aspects of the criteria.

From this comparison, it would be concluded that an algorithm cannot achieve "Security Requirements" and "Lightweight Features" at the same time, but this is not the case. As described below, an implementation of the disclosed subject matter can include a balance between both security and complexity.

TABLE 1

| Protocol | Complexity | | Cryptography | | | Security Requirements | | | Lightweight Features | | | |
|---|---|---|---|---|---|---|---|---|---|---|---|---|
| | Encryption | Decryption | Symmetric | Asymmetric | Hybrid | Confidentiality | Device Authentication | Message Authentication | Power Consumption | Running Time | Small Storage | Processing Complexity |
| Lightweight Masked AES [27] | — | — | ● | | | ● | ● | ○ | ● | — | ● | — |
| RC6 [30] [32] | — | — | ● | | | ● | ○ | ● | ◐ | ○ | ● | ○ |
| RC6 [32] | — | — | ● | | | ● | — | — | ● | ● | ● | — |
| ECC [36] [37] | — | — | | ● | | ● | ● | — | ● | ◐ | ● | — |
| BitCube | θ(n) | θ(n) | ● | | | ● | ● | ● | — | ● | ● | ● |

● Applied Completely

◐ Applied Partially

○ Not Applied Completely - No Available Info

TABLE 2

| Protocol | Cryptography | | | | Security | | | | Lightweight Features | | | |
|---|---|---|---|---|---|---|---|---|---|---|---|---|
| | Encryption | Requirements Decryption | Symmetric | Asymmetric | Hybrid | Confidentiality | Device Authentication | Message Authentication | Power Consumption | Running Time | Small Storage | Processing Complexity |
| Ganesh et al [37] | — | — | | | • | • | • | — | — | ○ | ◉ | — |
| Ren and Miao [39] | $O(\log(n^2) + \sqrt{n} + 4n)$ | $O(\log(n^3) + \sqrt{n} + 4n)$ | | | • | ◉ | — | ○ | ◉ | ◉ | — | ◉ |
| THCA [40] | $O(\log(n^2) + \log(n) + 3n)$ | $O(\log(n) + \log(2n^3) + 2n)$- | | | • | • | — | • | — | — | — | — |
| Dubal [41] | $O(\log(n^2) + \log 2(n) + \sqrt{n} + 4n)$ | $O(\log(2n^3 + \log 2(n) + \sqrt{n} + 4n)$ | • | | • | • | • | • | ○ | ○ | — | ○ |
| Zhu [42] | $O(\log 2(2n + 1) + \sqrt{n} + 4n)$ | $O(\log 2(2n + 1 + n + 4n)$ | | | • | ◉ | — | ○ | • | • | — | • |
| Bhave & Jajoo [43] | — | — | | | • | • | • | — | — | ○ | ◉ | — |
| Kumar [44] | $O(\log 2(n + 1) + \sqrt{n} + 4n)$ | $O(\log 2(n + 1) + \sqrt{n} + 5n)$ | | | • | • | — | • | ◉ | ◉ | — | ◉ |
| Langendoerfer [45] | — | — | | | • | • | • | — | ○ | — | ◉ | — |
| Henriques [46] | — | — | | | • | • | ○ | • | — | — | — | ○ |

• Applied Completely
◉ Applied Partially
○ Not Applied Completely - No Available Info An example implementation of the disclosed subject matter includes the BitCube cryptosystem. As used herein, the following acronyms are used in connection with describing the BitCube cryptosystem example:
 BitCube Key—the whole cube, including all bit values;
 PPK—illustrates the coordinates of the small cubicles key;
 Next 3 PPKs—next Three Per-Packet Keys; and
 BitsValue—The corresponding value of the PPK.

Figure 4:
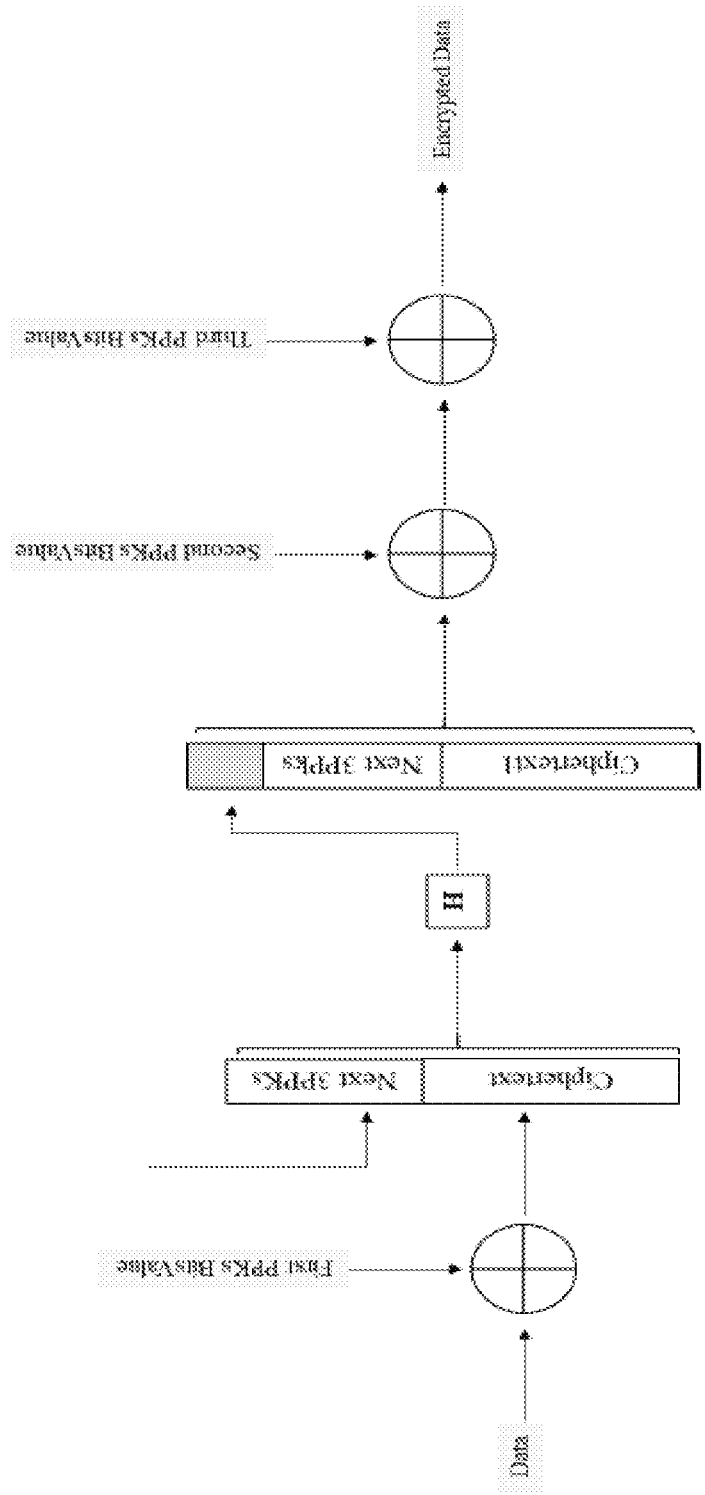
FIG. 4 is a diagram showing an example IoT encryption process in accordance with some implementations.
Figure 5:
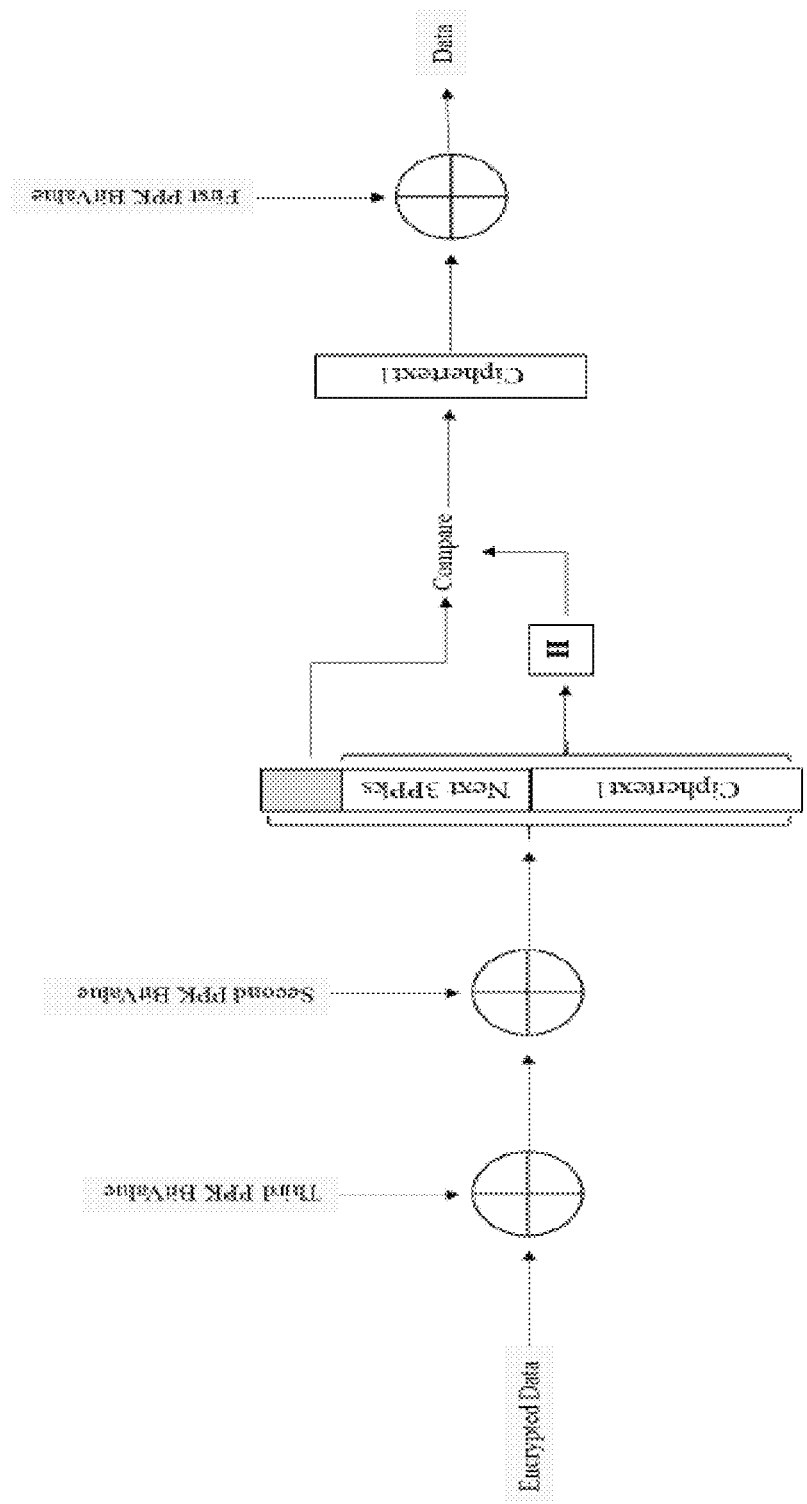
FIG. 5 is a diagram showing an example IoT decryption process in accordance with some implementations.

The BitCube cryptosystem is an implementation of the disclosed subject matter to secure the communications between IoT sensors and other wireless devices (e.g., and access point, etc.). The BitCube cryptosystem may overcome IoT sensors limitations and include a symmetric, lightweight, and powerful cryptosystem that encrypts the sensed data, and sends the data over the network in a protectable manner. In addition, the strength of the BitCube cryptosystem is built on the generation of random, small, and constantly changeable keys by making advantage of the concept of a rotating puzzle cube (e.g., a Rubik's Cube) to generate these keys. Each portion of data obtained from an IoT sensor is encrypted by new 3 keys, and this data is used as an input to generate the next key. Furthermore, the technique utilizes the XOR operation which requires a very low level of computation. The BitCube cryptosystem operates within IoT sensor systems, so those sensor systems can sense, process, communicate securely. FIGS. 4 and 5 include diagrams illustrating an overview of the encryption and decryption processes in the BitCube cryptosystem. Also, as shown in FIGS. 4 and 5, each text is encrypted three times.

The BitCube cryptosystem offers IoT manufacturers a system and method to secure the network of its sensors. The BitCube cryptosystem provides a high level of data protection in an efficient way that does not consume the power of the IoT device rapidly. Further, the BitCube cryptosystem does not require high cost or any additional equipment to implement. For example, an IoT manufacturer that produces IoT sensors or limited power capability IoT devices can include the BitCube cryptosystem within the IoT device The BitCube cryptosystem can be applied to a wide range of IoT devices including, for example, those made by: NIST, ARAMCO, IoT Analytics, Machinestalk, Gemalto, IoT Analytics, IoT Breakthrough, IOT Infrastructure & Energy Services Ltd, and Iot.do.

The BitCube cryptosystem secures the IoT sensors using a technique described herein that satisfies the following security needs: confidentiality, integrity, and authentication. The BitCube cryptosystem achieves user authentication and message authentication. The BitCube cryptosystem also includes a high level of robustness. The high level of robustness comes from the fact that it can be extremely difficult to break the encryption keys of the BitCube cryptosystem.

The external requirements of the BitCube cryptosystem are divided into two main categories: hardware requirements and communication requirements.

Hardware Interfaces

The control over the hardware components is going to be done by connecting the hardware to an external screen such as a television. Example hardware interfaces include the Linux operating system (OS) and the Dexter Jessie Raspbian OS. Other operating system can be used.

Communication Interface

The communication interface between the hardware components can include Wi-If or any other suitable communication interface or protocol.

Figure 6:
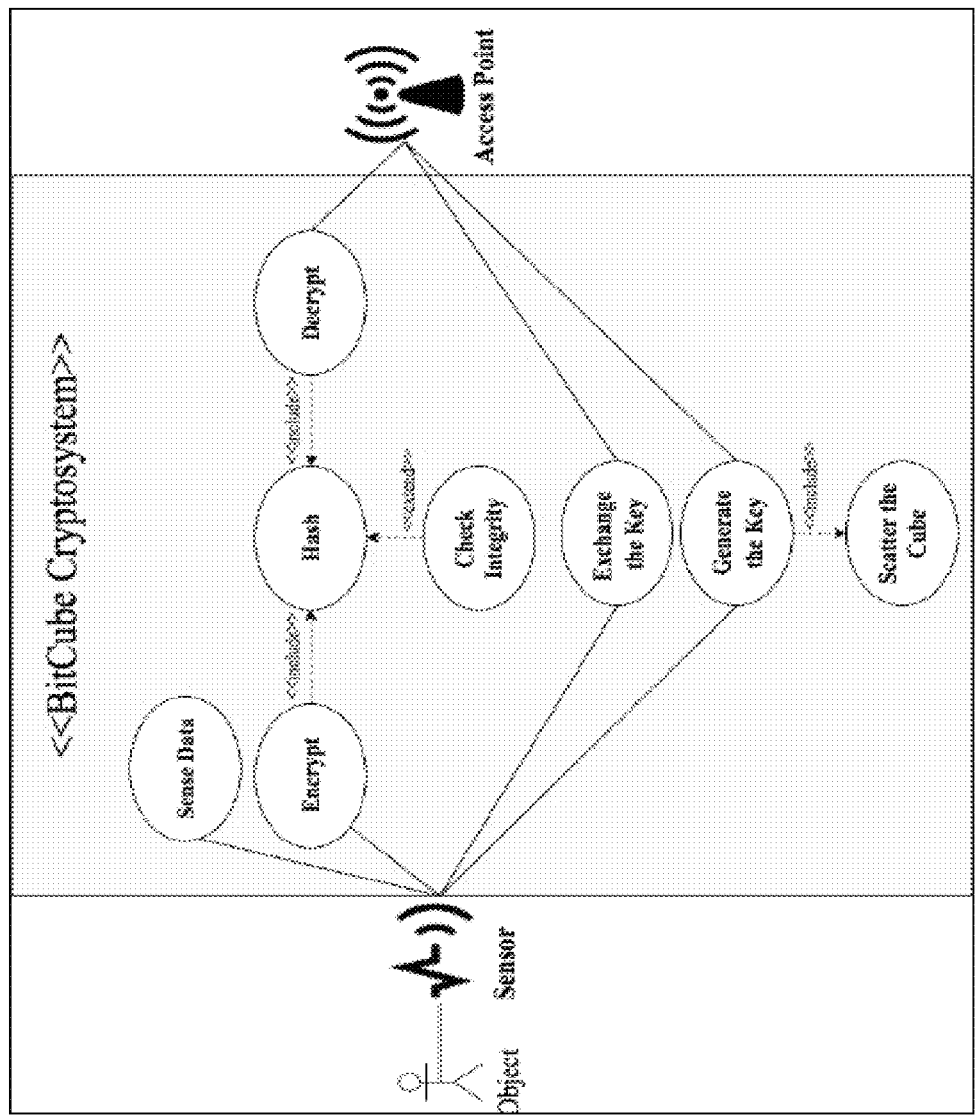
FIG. 6 is an example use case diagram for an IoT cryptosystem in accordance with some implementations.
Figure 7:
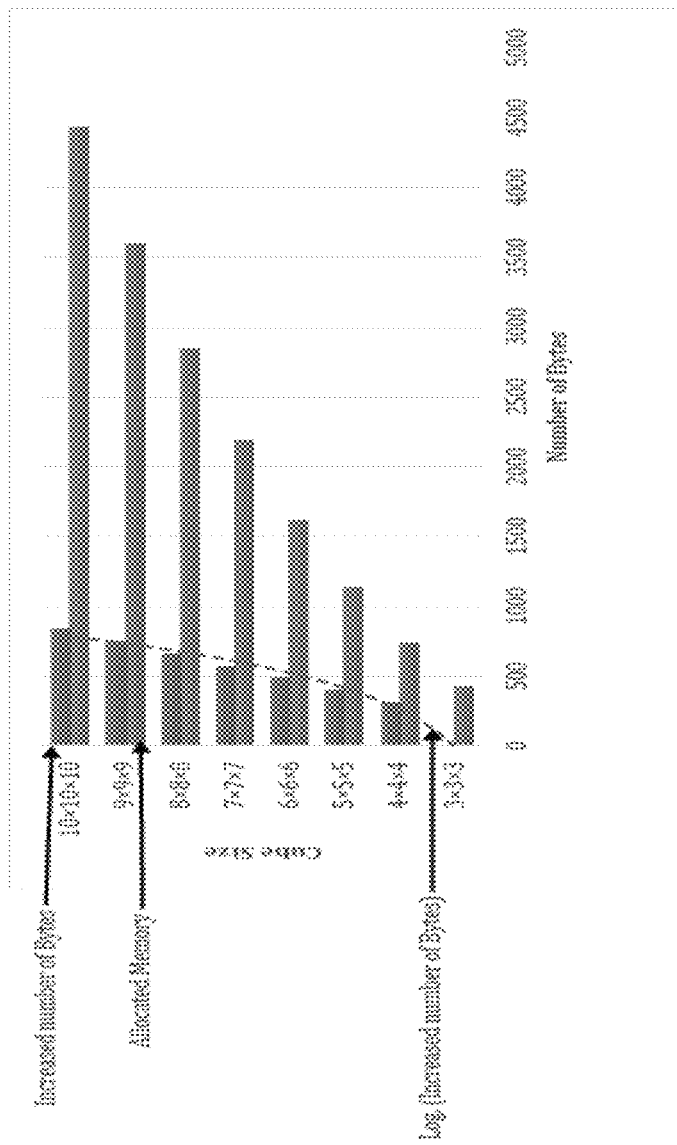
FIG. 7 is a diagram showing an example relationship between cube sizes and allocated memory in an IoT cryptosystem in accordance with some implementations.

FIG. 6 shows an example main use case diagram of the BitCube cryptosystem, with each use case explained in separate tables. The use case in FIG. 6 explains the high level functions that should be performed in the BitCube cryptosystem between an IoT sensor and an access point (AP). There are seven main use cases that represent the functions of the BitCube cryptosystem including: sense data, encrypt, decrypt, hash, generate the key, exchange the key, and scatter the cube. Tables 3-9 illustrate the use cases.

TABLE 3

| Use Case Name | Sense Data |
| --- | --- |
| Actors | Sensor |
| Description | The sensor transmits microwaves signals inside its range. When an object within the range of the sensor moves, the signals are going to be reflected to the sensor. |
| Input | Signals. |
| Stimulus | The signals are reflected by a movement of an object. |
| Output | Sensed data (Plaintext) is going to be sent. |
| Include | — |

TABLE 4

| Use Case Name | Encrypt |
| --- | --- |
| Actors | Sensor |
| Description | Sensor gets the Plaintext. Then, the Plaintext is XORed three times using the bits Value of the three Per-Packet-Keys (3 PPKs). |
| Input | Sensed data (Plaintext) and the 3 PPKs. |
| Stimulus | After the sensor senses data (Plaintext). |
| Output | An encrypted data (Ciphertext) is produced. |
| Include | Hash. |

TABLE 5

| Use Case Name | Decrypt |
| --- | --- |
| Actors | Access point (AP) |
| Description | AP receives the encrypted data. This data is XORed three times using the bitsValue of the 3 PPKs. |
| Input | Encrypted data (Ciphertext). |
| Stimulus | When the access point successfully received the encrypted data. |
| Output | The original data (Plaintext). |
| Include | Hash. |

TABLE 6

| Use Case Name | Hash |
| --- | --- |
| Actors | Sensor, AP |
| Description | Both the Ciphertext and the next 3 PPKs are hashed for message authentication. |
| Input | Ciphertext and the next 3 PPKs. |
| Stimulus | After appending the next 3 PPKs to the Ciphertext. |
| Output | The hash value is produced. |
| Include | — |
| Constraints | In the integrity check, if the extracted hash does not equal the generated hash, send an email to the owner. |

TABLE 7

Table 3.2-5 Description of Exchange the Key Use Case.

| Use Case Name | Exchange the Key |
| --- | --- |
| Actors | Sensor, AP |
| Description | Public key cryptography, the sensor and the AP exchange the BitCube key and 3 PPKs. |
| Input | BitCube key and 3 PPKs. |
| Stimulus | After the sensor generates the 3 PPKs. The key exchanging process begins. |

TABLE 7-continued

Table 3.2-5 Description of Exchange the Key Use Case.

| Use Case Name | Exchange the Key |
| --- | --- |
| Output | The BitCube key, and the 3 PPKs are shared between the AP and the sensor. |
| Include | — |

TABLE 8

Table 3.2-6 Description of Generate the Key Use Case

| Use Case Name | Generate the Key |
| --- | --- |
| Actors | Sensor, AP |
| Description | Selection of the 3 PPKs happens randomly. However, both actors generate the same key. The actors will extract the middle 1 bit from the first Ciphertext. These extracted data will be the input for the scattering function. |
| Input | The middle 1 bit of the first XORed data (Ciphertext). |
| Stimulus | After actors produce the first XORed data (Ciphertext). |
| Output | Generation of the 3 PPKs. |
| Include | Scatter the Cube. |

TABLE 9

Table 3.2-7 Description of Scatter the Cube Use Case.

| Use Case Name | Scatter the Cube |
| --- | --- |
| Actors | Sensor, AP |
| Description | Actors extract the middle 1 bit from the first Ciphertext. These extracted bits will be the input of the scattering function. |
| Input | The middle 1 bit of the first XORed data (Ciphertext). |
| Stimulus | After actors produce the first XORed data (Ciphertext). |
| Response | A new shape for the cube, and each cubicle will have different value in it than the one it had before the scatter. |
| Include | — |

There are six non-functional performance requirements used to evaluate the BitCube cryptosystem: confidentiality, integrity, authentication, robustness, small storage, and lightness.

Only the sensor and the AP are able to decrypt the message and extract the message content because the sensor and the AP are the only parties that know the current state of the BitCube Key and the coordinates for the three PPKs. Even if an eavesdropper was successful in intercepting a message and getting the new three keys, the eavesdropper would only obtain the coordination, but not the current state of the cube, and therefore would not be able to get the key.

Authentication

As above, the BitCube cryptosystem ensures message authentication. In addition to that, it achieves device authentication.

Device Authentication

The encryption process by itself provides a measure of authentication for the device because no one owns the keys except the sensor and the AP. As long as the AP is able to decrypt the message with the sensor's key, the message was encrypted by the device having the same key which is the legitimate sensor.

Message Authentication

For the BitCube cryptosystem, guaranteeing the correctness of the packet content is very important. That is because every packet is carrying coordinates for the next three PPKs and the arguments values for the scattering function. Altering the content of a single packet by an adversary, may lead to a compromise of the system. Accordingly, the BitCube cryptosystem requires a message integrity check through the implementation of hashing. It attaches the message digest to the data and XOR the result two times later. Comparing the attached digest by the Access Point (AP), will confirm that the received packet came from the stated sender. As a result, the messages authentication is ensured.

Robustness

There is nothing in principle that determines whether symmetric or the asymmetric cryptosystems are superior to another from the point of view of resisting cryptanalysis. See Stallings, W., & Tahiliani, M. P. (2014). *Cryptography and network security: principles and practice* (Vol. 6). London:

Equation 1—The Number of Combinations of 3×3×3 Puzzle Cubes

Number of Cube Combinations=[(Number of locations for each corner cubicle)!×(Number of locations for each edge cubicle)!×(Number of flipping configurations of the edge cubicles)× (Number of rotations for each corner cubicle)ˆ(Number of locations for each corner cubicle)]× [½×½×½]=[8!×12!×(2¹²)×(3⁸)]÷[3×2×2]≈43 quintillion Increasing the size of the cube, gives rise to an incredible number of combinations. Table 10 shows the number of combinations of different sizes of multi-dimension cubic arrays (or puzzle cubes as a metaphor).

TABLE 10

| Cube Size | Number of All Available Combinations |
| --- | --- |
| 3 × 3 × 3 | 43 252 003 274 489 856 000 |
| 5 × 5 × 5 | 282 870 942 277 741 856 536 180 333 107 150 328 293 127 731 985 672 134 721 536 000 000 000 000 000 |
| 6 × 6 × 6 | 157 152 858 401 024 063 281 013 959 519 483 771 508 510 790 313 968 742 344 694 684 829 502 629 887 168 573 442 107 637 760 000 000 000 000 000 000 000 000 |
| 7 × 7 × 7 | 19 500 551 183 731 307 835 329 126 754 019 748 794 904 992 692 043 434 567 152 132 912 323 232 706 135 469 180 065 278 712 755 853 360 682 328 551 719 137 311 299 993 600 000 000 000 000 000 000 000 000 000 000 000 |
| 8 × 8 × 8 | 35 173 780 923 109 452 111 509 592 367 006 557 398 539 936 328 978 098 352 427 605 879 843 998 663 990 903 628 634 874 024 098 344 287 402 504 043 608 416 113 016 679 717 941 937 308 041 012 307 368 528 117 622 006 727 311 360 000 000 000 000 000 000 000 000 000 000 000 000 000 000 000 000 |
| 9 × 9 × 9 | 14 170 392 390 542 612 915 246 393 916 889 970 752 732 946 384 514 830 589 276 833 655 387 444 667 609 821 068 034 079 045 039 617 216 635 075 219 765 134 861 573 075 573 092 224 082 416 866 010 882 486 829 056 000 000 000 000 000 000 000 000 000 000 000 000 000 000 000 000 000 000 000 |
| 10 × 10 × 10 | 82 983 598 512 782 362 708 769 381 780 036 344 745 129 162 094 677 382 883 000 000 000 00 000 000 000000 000 000 000000 000 000 000000 000 000 000 |

Pearson, incorporated herein by reference in its entirety. The security of any scheme depends on the encryption keys and the computational work involved in breaking a cipher.

In order to decrypt a single packet that has been encrypted by the BitCube cryptosystem, the adversary has to break two keys. The first one is the BitCube Key and the second one is the PPKs. As the next two sections will illustrate, breaking those keys may be considered as a stuff of fantasy, even with the powerful computers and clusters.

What makes the job worse for an attacker, is not only the required high level of difficulty to break those keys, but also the nature of the BitCube cryptosystem which continuously changes those keys after each single packet. That means the attacker has to decrypt both keys in a very short time—the time between sending two packets—in order to break the system.

Cracking the BitCube Key

A metaphor for the BitCube Key in the BitCube cryptosystem can be a puzzle cube such as a Rubik's Cube. However, in the BitCube cryptosystem, the cube carries a unique sequence of sixteen bits in each cubicle instead of the colors. Utilizing the concept of a puzzle cube (e.g., Rubik's Cube) in cryptography to generate the keys, can lead to strong algorithms due to a large number of combinations that result from the cube movement.

By making a use of the statistical theories, one can find the number of combinations of (3×3×3) cube is equal to 43,252,003,274,489,856,000≈43 quintillion. Equation 1 illustrates how this number was determined.

From the cryptography perspective, having this number of combinations will strengthen the cryptographic keys against being broken. By constructing a simple mathematical equation similar to Equation 2, it will be easy to calculate the average required time for an attacker to break one BitCube Key of a specific size, taking into consideration the computational capability of the attacker's machine.

Equation 2—The Average of the Required Time from an Attacker to Break the BitCube Key Time in Years={[(Number of combinations of specific cube size)−(Number of the cracked keys per second by the attacker machine)]÷(365×24× 60×60)}÷2

Where,

Number of combinations of specific cube size→From the obtained results from Table 10

Number of the cracked keys per second by the attacker machine→Depends on the computational power of the attacker machine.

(365×24×60×60)→To convert seconds to years.

The division by two→To get the average (the required time to try half of the keys).

Table 11 shows the average of time required from an attacker to break one BitCube Key with size 3×3×3. The figure shows the required time by different machines with varying capabilities.

TABLE 11

| Number of Cracked Passwords Per Second | Average of the Required Time |
|---|---|
| $10^3$ Keyes/second | 685756013 Years |
| $10^4$ Keyes/second | 68575601 Years |
| $10^5$ Keyes/second | 6857560 Years |
| $10^6$ Keyes/second | 685756 Years |
| $10^7$ Keyes/second | 68575 Years |
| $10^8$ Keyes/second | 6857 Years |
| $10^9$ Keyes/second | 685 Years |

In the BitCube cryptosystem, a plurality (e.g., three) PPKs are used. Each PPK has a size of sixteen bits. Breaking the three keys together, will reveal the content of a single packet. However, that will not break the system nor the BitCube Key. In addition, the required time to break the three PPKs is relatively long. Equation 3 shows the average of the required time to break the three PPKs.

Equation 3—Calculating the Average of the Required Time from an Attacker to Break the Three PPKs $$\text{Time in years} = \left\{ \left[ \left( \frac{2^{16}!}{(2^{16}-3)!} \right) \right. \right.$$

÷(Number of the cracked keys per second by the attacker machine)]÷(365×24×60×60)}÷2

Where, $$\frac{2^{16}!}{(2^{16}-3)!} \rightarrow$$

Gives the number of permutation for the small PPKs from one BitCube key
Number of the cracked keys per second by the attacker machine→Depends on the computational power of the attacker machine.
(365×24×60×60)→To convert seconds to years.
The division by two→To get the average (the required time to try half of the keys). Table 12 shows the average of the required time to break the three PPKs.

TABLE 12

| Number of Cracked Passwords Per Second | Average of the Required Time |
|---|---|
| $10^3$ Keyes/second | 4575 Years |
| $10^4$ Keyes/second | 458 Years |
| $10^5$ Keyes/second | 46 Years |
| $10^6$ Keyes/second | 5 Years |
| $10^7$ Keyes/second | 163 Days |
| $10^8$ Keyes/second | 16 Days |
| $10^9$ Keyes/second | 2 Days |

As the BitCube cryptosystem was designed to fulfill the requirements of IoT environments, the amount of required memory space was taken into account. The memory allocation that is required for the BitCube cryptosystem from the sensor and the AP is space for the BitCube Key and a small number of one byte variables.

By ignoring the small amount of memory that will be occupied by the byte variables and calculating the allocated memory for the BitCube Key, an approximate value of the required memory size by the BitCube cryptosystem can be estimated.

Programmatically, it is possible to construct the puzzle cube representation by a two-dimensional array. For a cube with size N×N×N, declaring its array in Java will be as the following:

short Array_X [ ] [ ]=new short [$N^2$] [6];

The number six in this declaration line, represents the how many faces the Rubik's Cube has. In the 64-bit memory model, every short variable consumes two bytes from the memory. So, storing one-dimensional array with ten short elements needs twenty bytes from memory. Actually, they are not twenty bytes exactly because each array also stores extra information like the number of its dimensions, and how long it is. Java for example stores 24 bytes array overhead and 8 bytes for the actual array object. So, storing one-dimensional array with ten elements in Java consumes 52 bytes. Equation 4 translates these words in a mathematical form.

Equation 4—The Required Memory Space to Store One-Dimensional Array of Short Values in Java Number of bytes=(2×$M$)+24+8 OR Number of bytes=(2×$M$)+32

Where, M→The number of elements in the array.
For the two-dimensional array, it the same except that each element in the first array is another array of size. So, Equation 4 can be modified to come up with a new equation for the two-dimensional array, see Equation 5 below.

Equation 5—The Required Memory Space to Store Two-Dimensional Array of Short Values in Java Number of bytes=32+((2×$M'$)+32)×$M$ Where,
M→The number of elements in the inner array.
M'→The number of elements in the outer array.
Now it is possible to construct, from Equation 5, a general equation that calculates the required space for any BitCube Key with N×N×N size by using the two-dimensional array.

Equation 6—The Required Space for the BitCube Key with Size N

Number of bytes=32+((2×6)+32)×$N^2$

Where,
N→Depends on the size of the BitCube key.
Table 13 shows the required memory space for the BitCube Key with different sizes.

TABLE 13

| Cube Size | Required Memory Space in Byte | Required Memory Space in Kilobyte |
|---|---|---|
| 3 × 3 × 3 | 428 Bytes | 0.428 KB |
| 4 × 4 × 4 | 736 Bytes | 0.736 KB |
| 5 × 5 × 5 | 1132 Bytes | 1.132 KB |
| 6 × 6 × 6 | 1616 Bytes | 1.616 KB |
| 7 × 7 × 7 | 2188 Bytes | 2.188 KB |
| 8 × 8 × 8 | 2848 Bytes | 2.848 KB |

TABLE 13-continued

| Cube Size | Required Memory Space in Byte | Required Memory Space in Kilobyte |
|---|---|---|
| 9 × 9 × 9 | 3596 Bytes | 3.596 KB |
| 10 × 10 × 10 | 4432 Bytes | 4.432 KB |

Usually, the average code size of embedded systems and small ICs is between 64K to 512 KB. See Rosing, T. S. (2016). *Introduction to Embedded Systems*. Retrieved Dec. 11, 2017, from https://gepdf.com/down/e629403/introduction-to-embedded-systems, incorporated herein by reference in its entirety. The above table shows the feasibility of implementing the BitCube cryptosystems in small systems having limited memory size.

There is an additional feature in the BitCube cryptosystem, which is increasing the size of the BitCube Key will increase its security strength as well, due to the increasing of the number of combinations. However, this requires extra resources because increasing the size will not consume more much memory nor affect the complexity of the algorithm. Equation 7 shows a logarithmic relation between increasing the size of the BitCube Key and the allocated memory.

Equation 7 the Relation Between the Size of the BitCube Key and the Allocated Memory $$\text{Cube Size} = 377.96 \ln(\text{The increased number}) - 0.517$$

Lightness

The time complexity of the BitCube cryptosystem is less than or equal to n, which implies that the IoT cryptosystem process described herein requires a low level of computation resources and provides a high degree of lightness.

Figure 8:
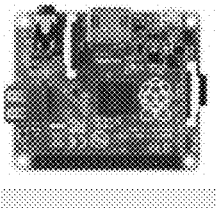
FIG. 8 is diagram of example devices for use with an IoT cryptosystem in accordance with some implementations.

The BitCube cryptosystem encryption and decryption functions are performed in two different ends. The encryption function is performed in the IoT sensor and the decryption is performed in the AP. There are three main hardware components in a suitable hardware environment for the BitCube cryptosystem. These hardware components are shown in FIG. 8. The main components are as follows:

IoT sensor

Any IoT manufacturer can potentially implement the BitCube cryptosystem in their IoT sensors to perform the encryption function on traffic going out from the sensor to a base station such as an AP. Because there are no available open source code IoT sensors in which to test an implementation of the IoT cryptosystem, the encryption function is implemented in a Raspberry Pi development environment that is connected to an IoT sensor. Female to Female jumper wires are used to connect the IoT sensor to the Raspberry Pi. The Raspberry Pi's role is to take the data from the IoT sensor, encrypt it and send it to the AP. It was programmed using the Python programming language in the terminal. The OS of the Raspberry Pi is going to be stored in the SD Card. The Raspberry Pi is connected to a television through HDMI cable to display its OS. The Raspberry Pi takes the power through the power adapter.

Wireless Access Point (AP)

An active motion sensor, any IoT sensor can be used, is used to collect the data from the real world. Any APs manufacturer can program an AP to make it perform the BitCube decryption function. An AP is connected to a Raspberry Pi that will perform the decryption function.

Operating Systems

For the Raspberry Pi, the Dexter Jessie Raspbian OS which is based on Debian is used. For the AP part, The DD-WRT firmware which is based-on Linux OS is used for configurations.

The example hardware environment mentioned above is designed to test the functionality of the BitCube cryptosystem. The type of IoT product might change if the BitCube cryptosystem is implemented in a specific field such as medical or other field.

The nature of the IoT sensors play an important role in security. IoT sensors have limited capabilities and constraints that make employing strong cryptosystems to secure them a difficult job. The IoT sensors constraints that have an impact on its security and affect the design of the Bite Cube cryptosystem are listed below. See Sen, J. (2009). A survey on wireless sensor network security. International Journal of Communication Networks and Information Security, 1(2), 59, incorporated herein by reference in its entirety.

Energy Constraints

Energy consumption is one of the main constraints of IoT sensors. In IoT sensors, the energy consumption constraints can be categorized into three main parts: sensor transducer energy, communication energy and microprocessor computation energy. Hill et. al. demonstrated how transmitting one bit needs about the same amount of energy that the execution of 800 to 1000 instructions need. See Hill, J., Szewczyk, R., Woo, A., Hollar, S., Culler, D., & Pister, K. (2000). *System architecture directions for networked sensors*. ACM SIGARCH Computer Architecture News, 28(5), 93-104, incorporated herein by reference in its entirety. To this end, the energy of the IoT sensors communication costs more than the IoT sensors computational energy. Any cryptosystem that expands the communication packet to secure it will consume significant energy and cost more.

Memory Constraints

IoT sensors are small devices with small memory and storage space. An IoT sensor memory consists of two parts: flash memory and RAM. Flash memory is utilized to store the installed applications. RAM is utilized to store the sensor data, programs and the results of intermediate computations. After loading the sensor OS and the application code, not enough memory space is left to employ a current cryptosystem for security.

The BitCube cryptosystem is efficiently designed to secure the IoT sensors with the consideration of its capabilities and constraints. The BitCube cryptosystem fits into a small memory space and does not require an amount of energy that would consume the IoT sensor.

The BitCube cryptosystem consists of a number of processes. Some of the processes are critical for the overall process to work properly, others are considered as the main processes. These processes are:

Key Generation
Encryption
Scattering of the Cube
Decryption

The devices executing these algorithms are either the IoT sensor and/or the access points. For example, the encryption operations are executed by the IoT sensor, where the decryption operations are executed by the access point is the only actor.

Key Generation

The input for the "Generate the Key" process is the same for both the IoT sensor and the AP, because this algorithm includes both the IoT sensor and the access point.

Figure 9:
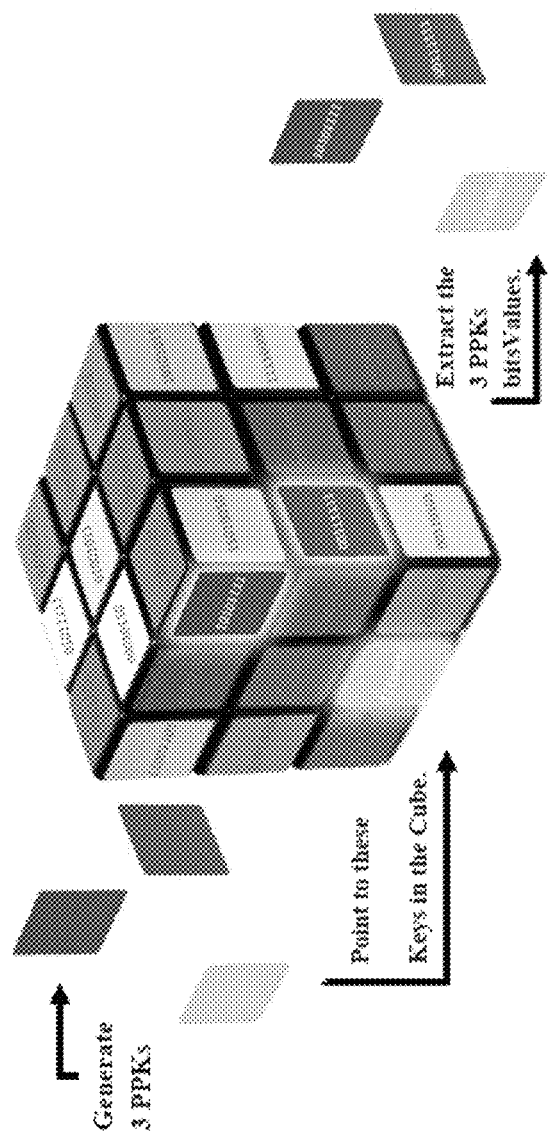
FIG. 9 is a diagram of an example key generation for an IoT cryptosystem in accordance with some implementations.

This algorithm is responsible for generating a plurality of per-packet keys (e.g., 3 Per-Packet Keys (3 PPKs)). Each PPK points to one cubicle (or value) in the cube (or multi-dimensional cubic array), which is one of the many strengths of the BitCube cryptosystem. As FIG. 9 shows, the dimensions (sides of a cube conventionally represented by colors such as yellow, blue and red) of the highlighted cubicles represent the 3 PPKs, where the binary values in the cubicles represent the 3 PPKs bit values.

It should be noted that the colors of a conventional cube are not considered a part of the process, but are merely used to help illustrate the principals of the disclosed subject matter. The colors are included to help in the illustration of process simulation and to make the concepts easier to understand. Instead, in place of colors, the term dimension is used.

The IoT sensor will then uses the 3 PPKs to encrypt the first data (the data that were initially sent from the IoT sensor), in other words, the plaintext.

Encryption

The IoT sensor fetches a previously generated 3 PPKs and uses them to encrypt the plaintext. Since there are 3 PPKs, the plaintext is entered through an XOR operation three times. The following steps explain these 3 XOR operations and their outputs:

Step 1: the IoT sensor takes the first PPK (yellow cubical) and extracts the bitValue of it. This bitValue is XORed with the plaintext to produce "ciphertext1".

Step 2: the IoT sensor takes the second PPK (blue cubical) and extracts the bitValue of it. This bitValue is XORed with ciphertext1 (the output from Step 1), to produce "ciphertext2"

Step 3: the IoT sensor takes the third PPK (red cubical) and extracts the bitValue of it. This bitValue is XORed with ciphertext2 (the output from Step 2), to produce "ciphertext3".

Figure 10:
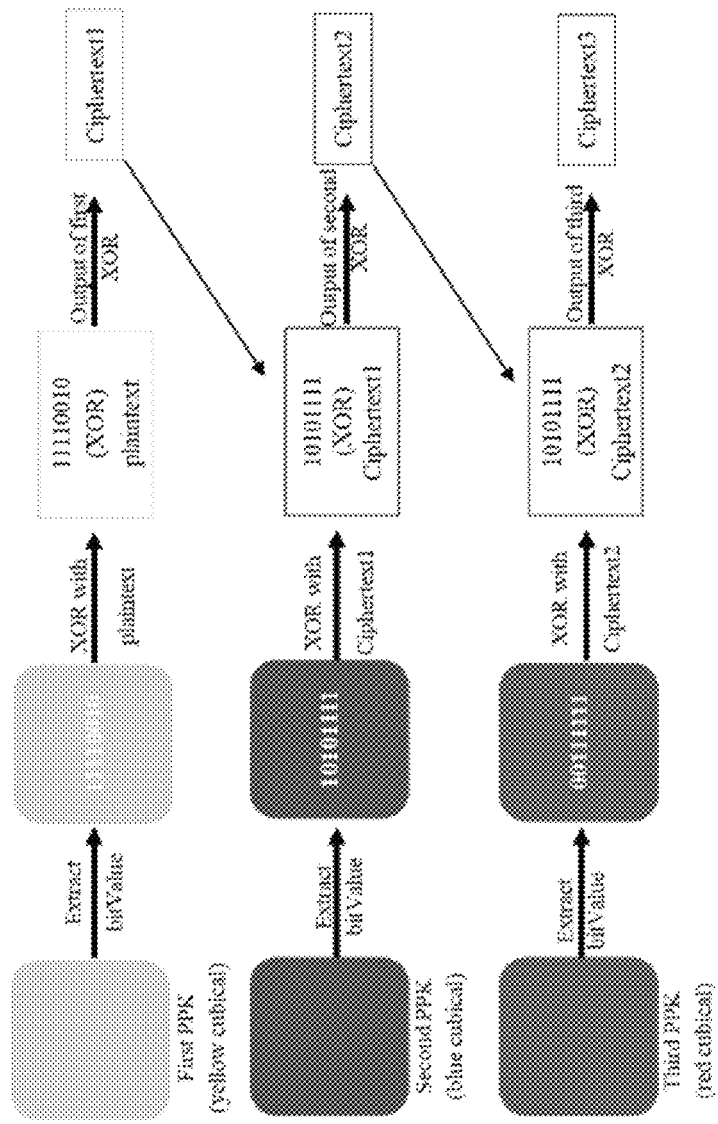
FIG. 10 is a diagram of an example encryption process for an IoT cryptosystem in accordance with some implementations.

FIG. 10 illustrates the encryption process.

Scatter the Cube

Figure 11:
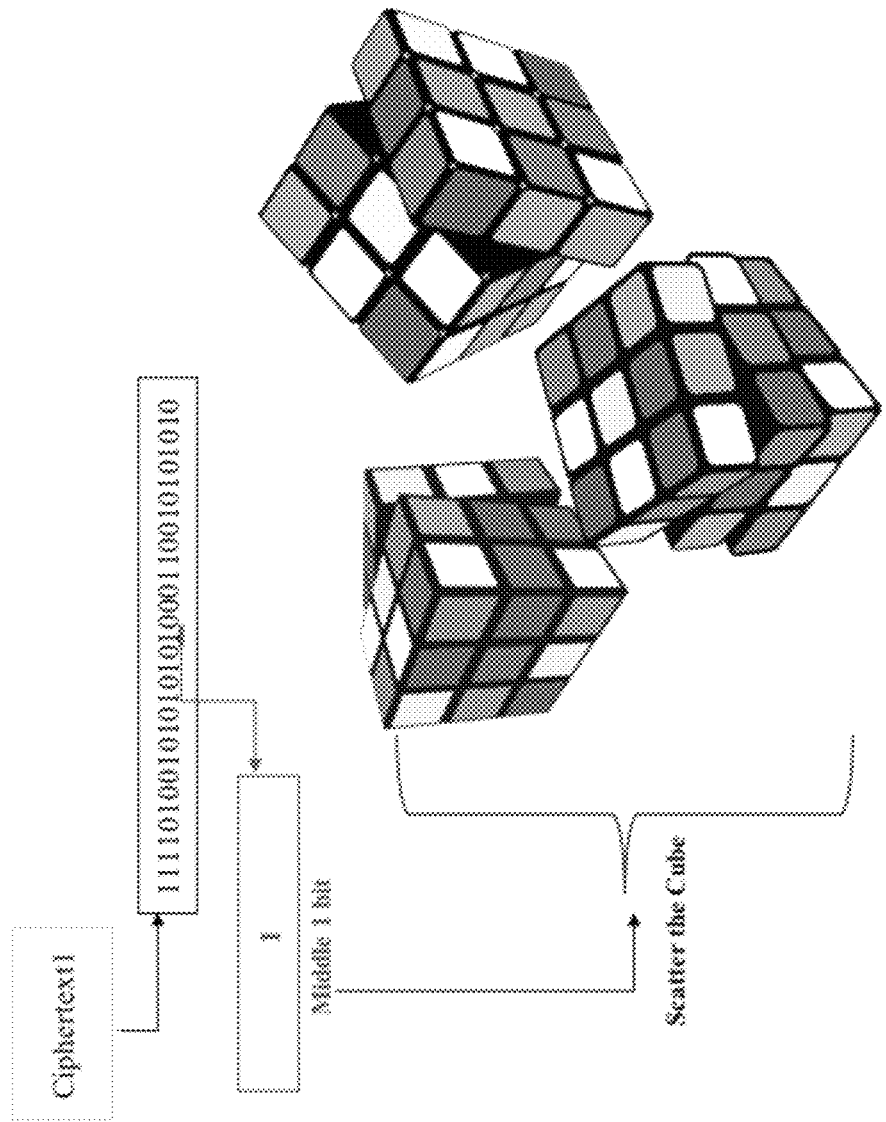
FIG. 11 is a diagram of an example cube scattering process for an IoT cryptosystem in accordance with some implementations.

As mentioned earlier, the output of the "Generate the Key" algorithm is the first 3 PPKs. The first PPK was used to encrypt the plaintext, and the output of this operation is "Cipheretext1". Now, there is "Scatter the Cube" algorithm that runs before producing "Cipheretext2" and "Cipheretext3". It is placed before the second and the third XOR operation because the output of the first XOR operation is used as an input for this algorithm. "Scatter the Cube" algorithm begins when "Cipheretext1" is produced. It extracts the middle 1 bit from "Cipheretext1" and use it as an input to start scattering. The "next 3 PPKs" are appended to the packet. When this packet is sent to the access point, the access point will know which key to use next for decryption. FIG. 11 illustrates the "scatter the cube" process.

Figure 12:
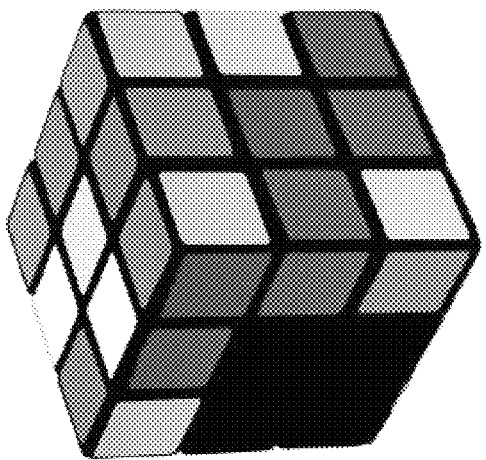
FIG. 12 is a diagram of an example cube puzzle metaphor after a cube scattering process in accordance with some implementations.

The affected values from the scattering in FIG. 11 are illustrated in FIG. 12. The shaded side is not affected. Values in these cubicles are equivalent to the same values before the scattering. As in FIG. 10, the dimensions (colors or locations) are still the same, what is scattered (or altered) are the values inside the cubicles.

It should be clarified that before scattering the cube, the IoT sensor and/or AP should save the current state (shape) of the cube. Otherwise, they won't be able to do the rest of the process correctly. If the scatter happens before the encryption or decryption processes are complete, the PPKs will be pointing to different bitsValues. Therefore, the current state of the cube is saved first. Then, the rest of the XOR operations are done.

"Scatter the Cube" process is related to both the IoT sensor and the AP, which do the same process for this algorithm, the difference is that the IoT sensor saves the current state of the cube after the first XOR operation is done, where the access point saves the current state of the cube after the third and second XOR operations are done.

Decryption

The AP receives a message including the encrypted data, the next 3 PPKs, and a hash. The decryption process happens in a reverse order when compared to the encryption process. Here, the input of this process is "ciphertext3", which was the output of the last XOR operation in the encryption process. This "ciphertext3" is XORed with the bitValue of the third PPK due to the reason that it was encrypted with it. The following steps explain the 3 XOR operations in the decryption process and their outputs:

Step 1: the access point will take the third PPK (red cubical) and extract the bitValue of it. This bitValue will be XORed with the ciphertext3 to produce "ciphertext2".

Step 2: the access point will take the second PPK (blue cubical) and extract the bitValue of it. This bitValue will be XORed with ciphertext2 (the output from Step 1), to produce "ciphertext1"

Step 3: the access point will take the first PPK (yellow cubical) and extract the bitValue of it. This bitValue will be XORed with ciphertext1 (the output from Step 2), to produce the Plain text.

Figure 13:
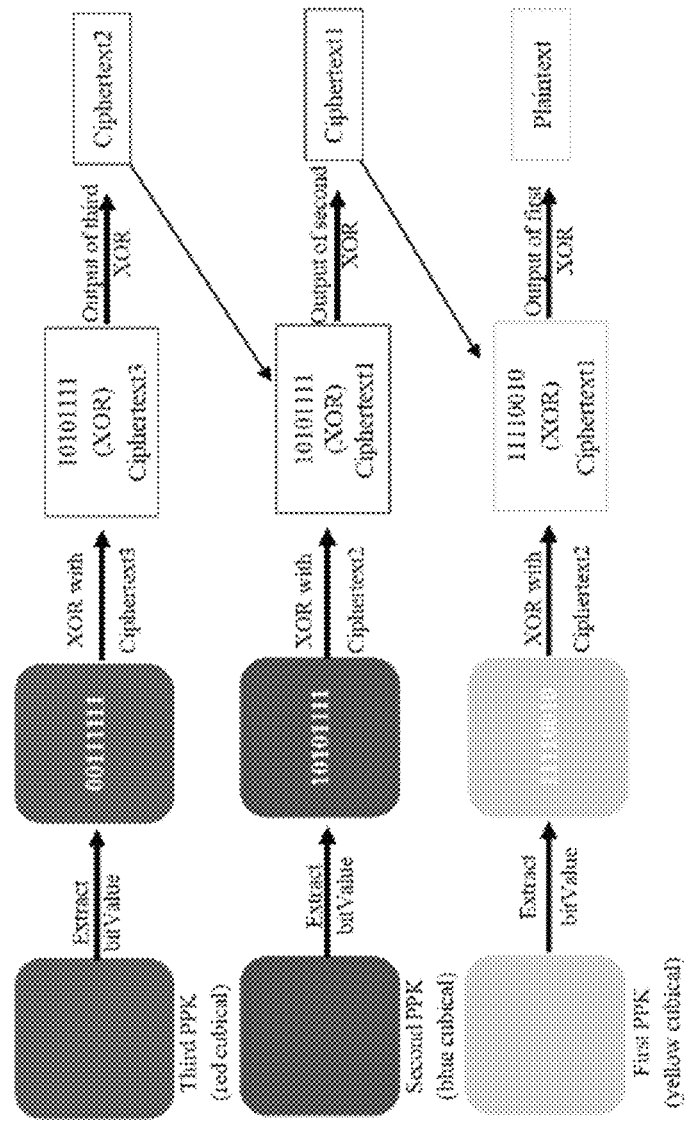
FIG. 13 is a diagram of an example decryption process of an IoT cryptosystem in accordance with some implementations.

FIG. 13 illustrates the decrypt process.

The BitCube cryptosystem starts its operations once the sensor obtains data from the environment. This obtained data as digital signals will be transformed as an input for BitCube encryption process as shown in FIG. 4. The output from encryption process will be sent to the access point, which will use it as an input for a decryption process (e.g., as shown in FIG. 5).

The Utilized Operations and Algorithms

XOR Operation

The BitCube cryptosystem utilizes the XOR operation in its encryption process. The XOR operation is not computationally intensive and it integrates a single digital circuit. The result of this will be a high speed with low computation.

Message Integrity Check Algorithm

The BitCube cryptosystem requires implementing hashing or any suitable message integrity check technique.

Key Exchanging Algorithm

The Algorithm of the BitCube requires utilizing a secure key exchange process to exchange the BitCube key between the sensor and the access point. This process will be done initially before sending the first packet of data.

The Complexity of the Algorithm

As Cormen shows, the complexity of the algorithm depends on its executable operations. See Cormen, T. H. (2009). *Introduction to algorithms*. MIT press, incorporated herein by reference in its entirety. The BitCube cryptosystems utilizing a simple operation in its encryption, the encryption process will not impose any high level of time complexity. The most complex part is related to the scattering function. This function is responsible for changing the state BitCube key to ensure getting the same number of combinations that the Rubik's Cube provides.

As the code shows, there are two functions for each side of the cube. The first side is to rotate the cube in the clockwise direction and the second is for the counterclockwise. The process of the scattering, calls six functions out of the twelve.

Figure 14:
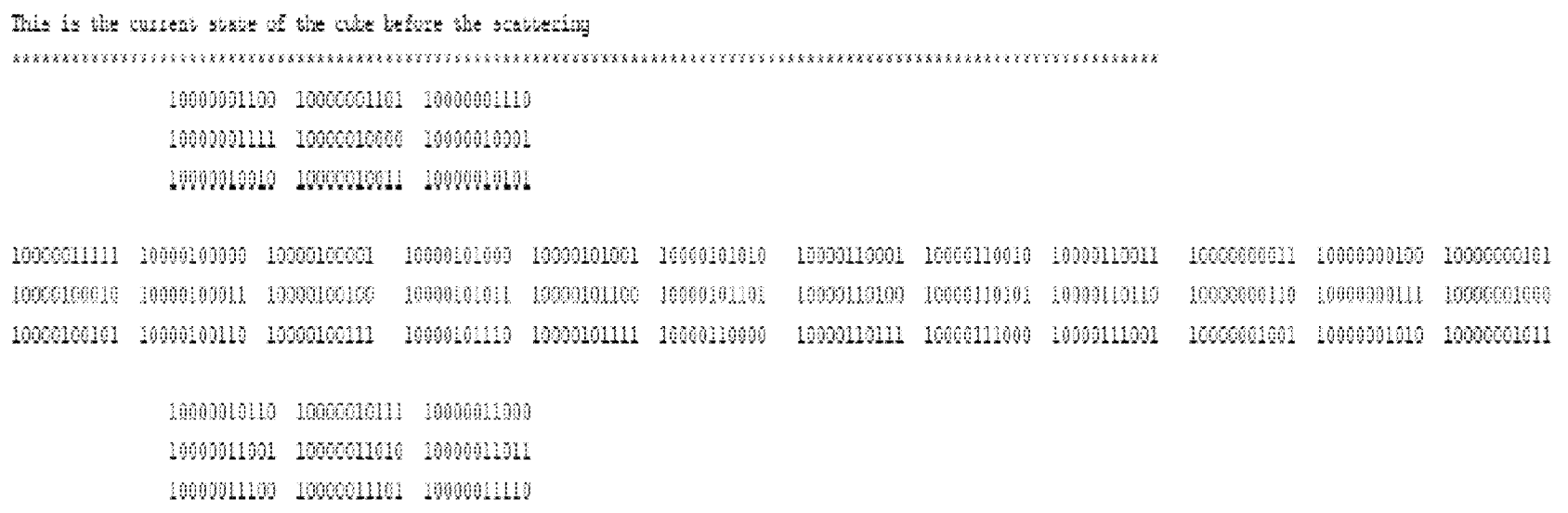
Figure 15:
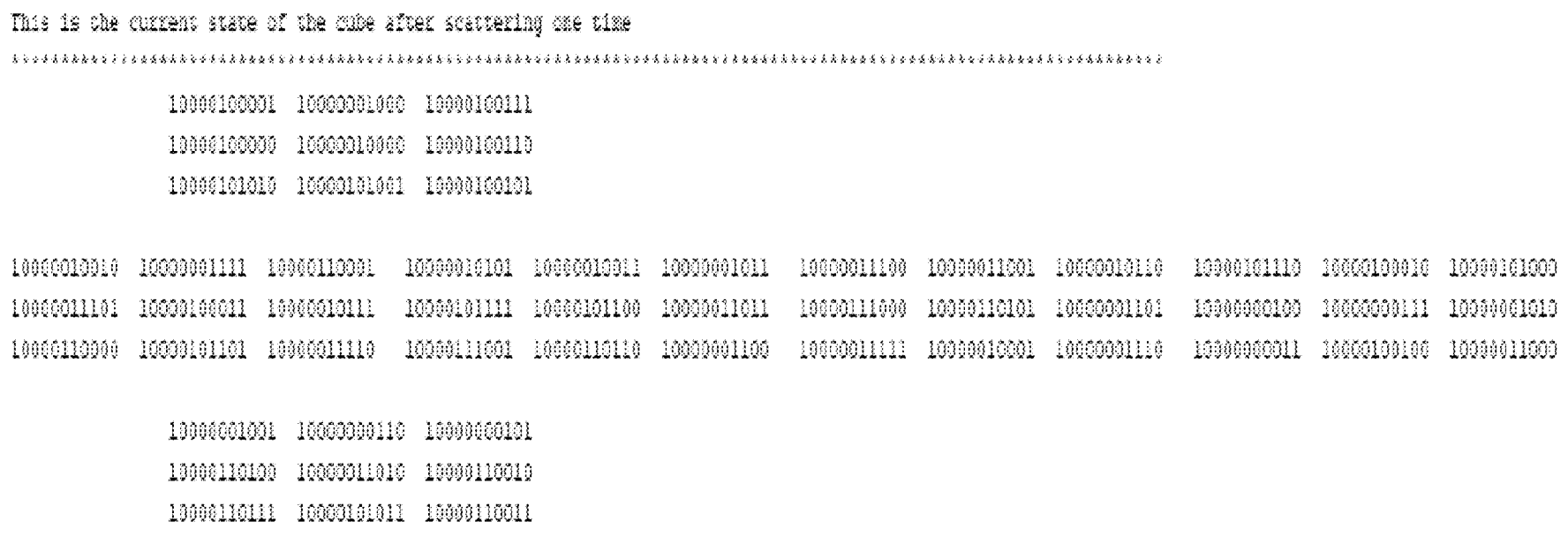
Figure 16:
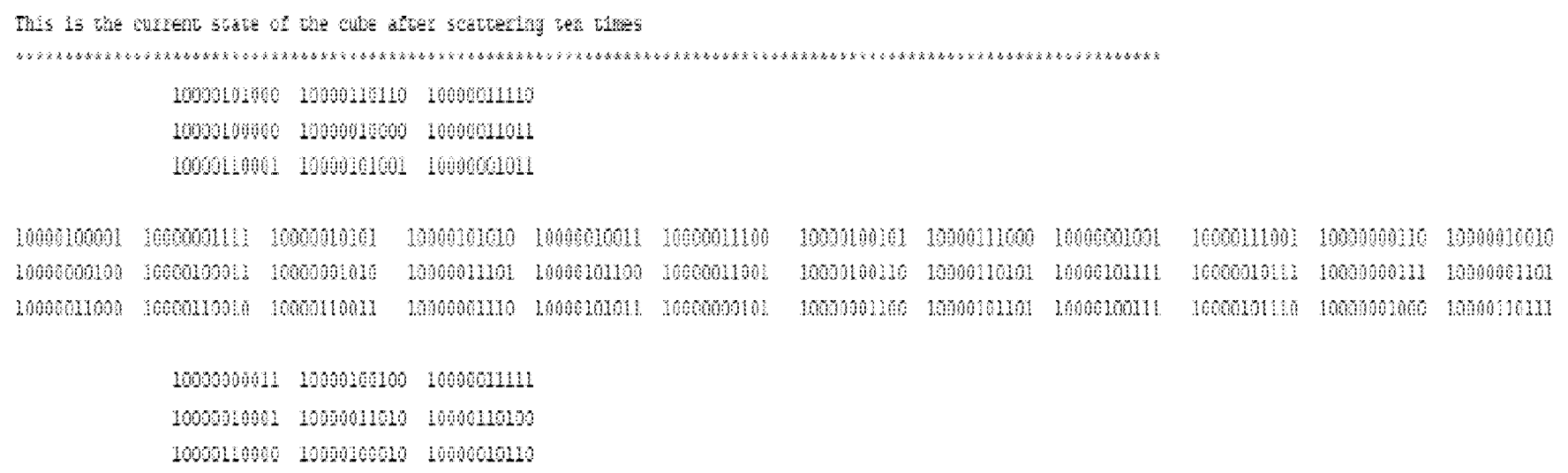

Each function follows a sequential manner and composes a fixed number—forty-two—of instructions. The scattering code doesn't require any iteration and it doesn't depend on an external input. The required time to execute the code is fixed and it is equal to N number of steps. FIGS. 14-16 present a sample of the output from the scattering function.

Time Complexity Calculations The code of the BitCube cryptosystem follows a sequential manner. There are no iterations that depend on the size of the incoming data. To scatter one BitCube key with size 3×3×3, 252 sequential statements of code have to be executed. Increasing the size of the cube will increase the number of steps. To scatter one cube with size N×N×N the code will execute N number of steps. The time complexity of the BitCube cryptosystem is Theta(N).

Figure 17:
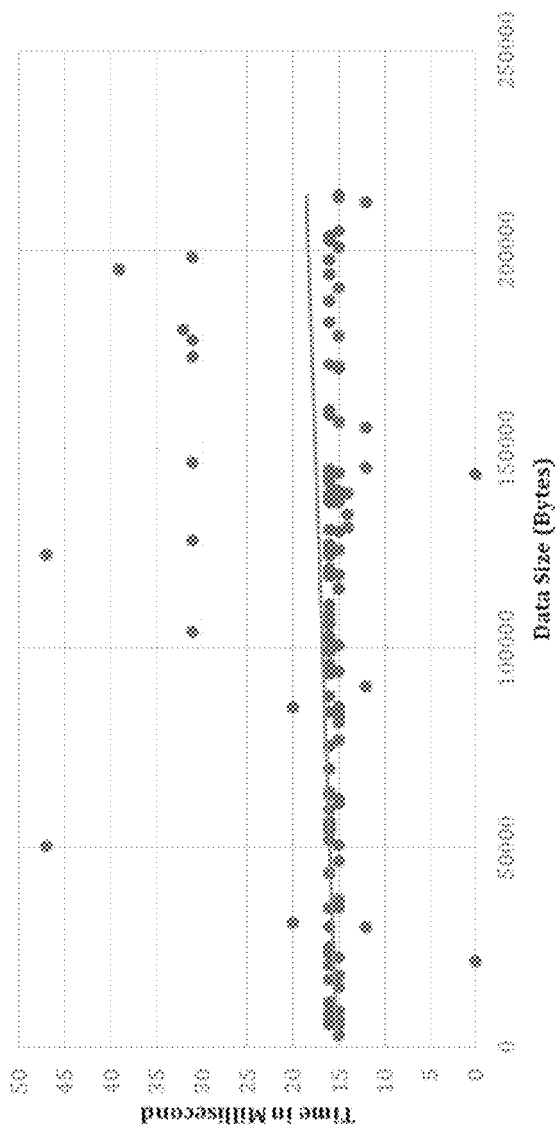
FIG. 17 is a diagram showing a relationship between data size and execution time of an IoT cryptosystem in accordance with some implementations.

To test the time complexity of the algorithm, the code got executed with different data size. The results are shown in FIG. 17.

In an example, a user inputted data (e.g., 124667). The system converted this number to its binary format which was (11110011011111011). This sequence of binary bits is considered the plaintext.

Encrypting the plaintext by the BitCube cryptosystem produces a new sequence of bits (the ciphertext) of (11110001011000001).

After performing the decryption process by the receiver, the obtained decrypted data was exactly like the original plaintext.

Algorithm Flow Diagram

Figure 18:
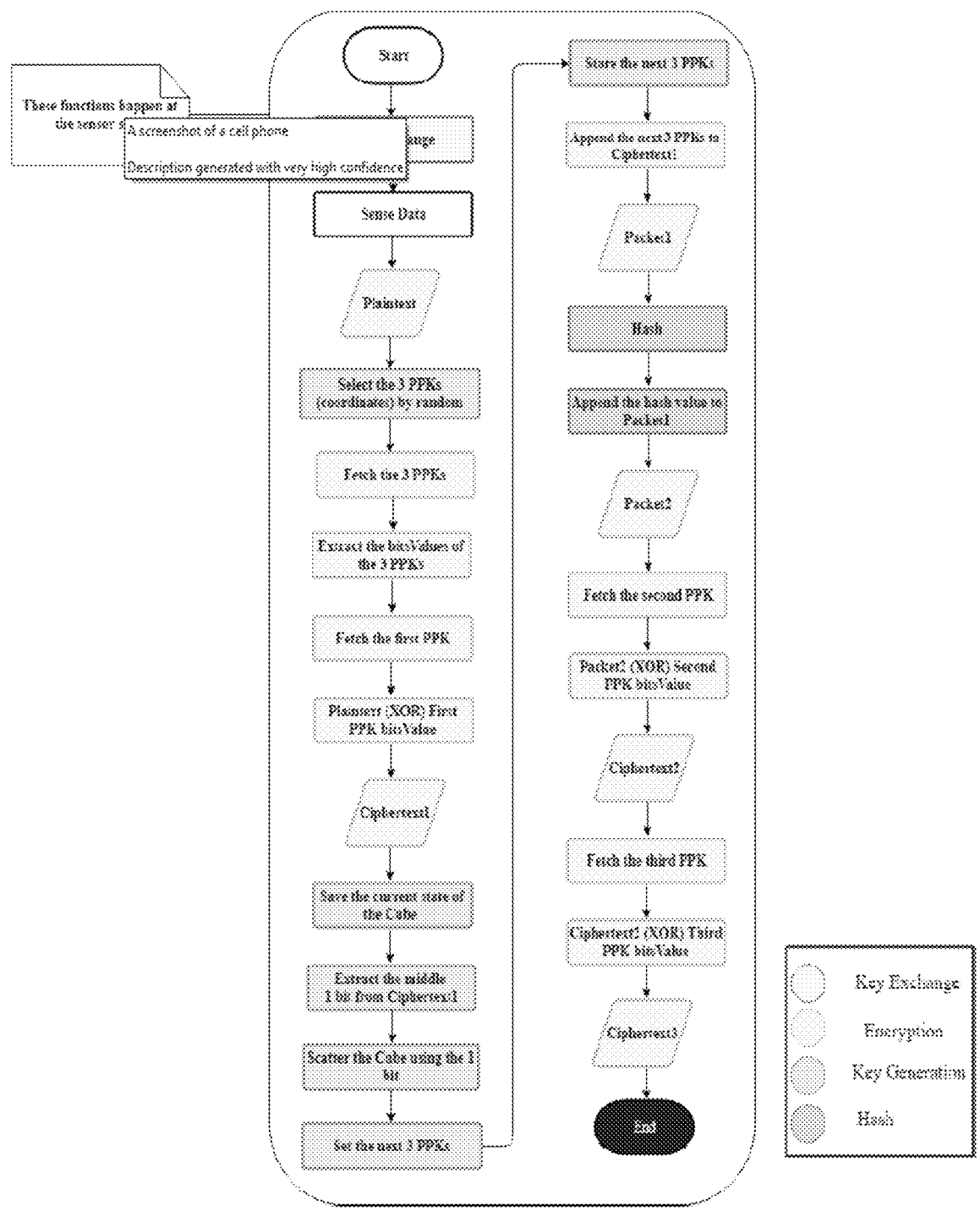
FIG. 18 is a diagram showing example sensor-side functions in accordance with some implementations.
Figure 19:
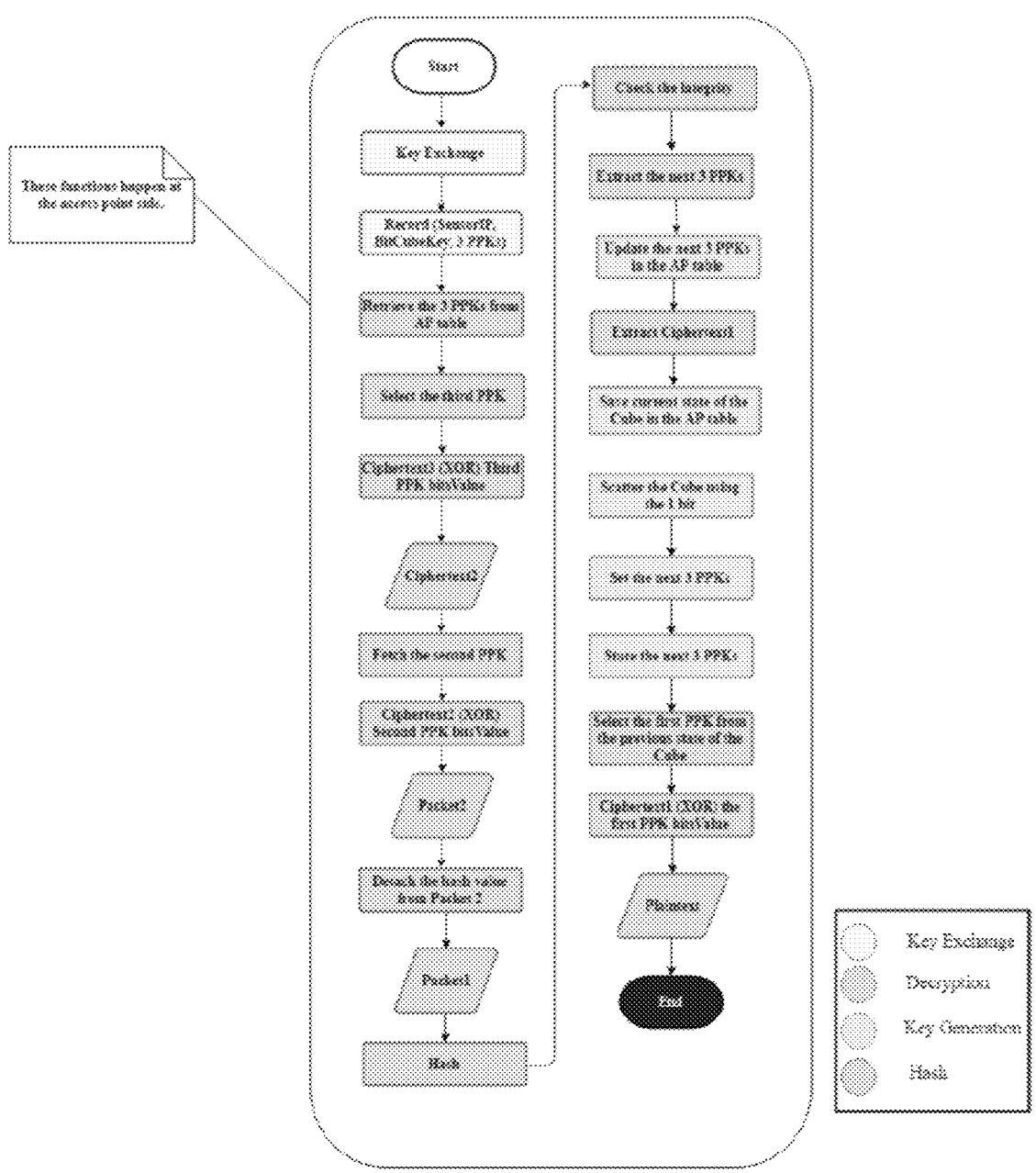
FIG. 19 is a diagram showing example access point side functions in accordance with some implementations.

This section illustrates the flow diagram of the entire BitCube cryptosystem. The diagram is separated into two figures to show the different functions that occur at the IoT sensor and the access point sides. The flow diagrams (e.g., FIGS. 18 and 19) include a key map that represents each function in each diagram. These functions include: Key exchange, Encryption, Decryption, Key Generation and Hash.

Component Design

This section includes the pseudo code of the BitCube cryptosystem functional requirements. The pseudo code helped in developing an efficient algorithm with sufficient details. The following pseudo code demonstrates the main functions of BitCube cryptosystem.

Figure 20:
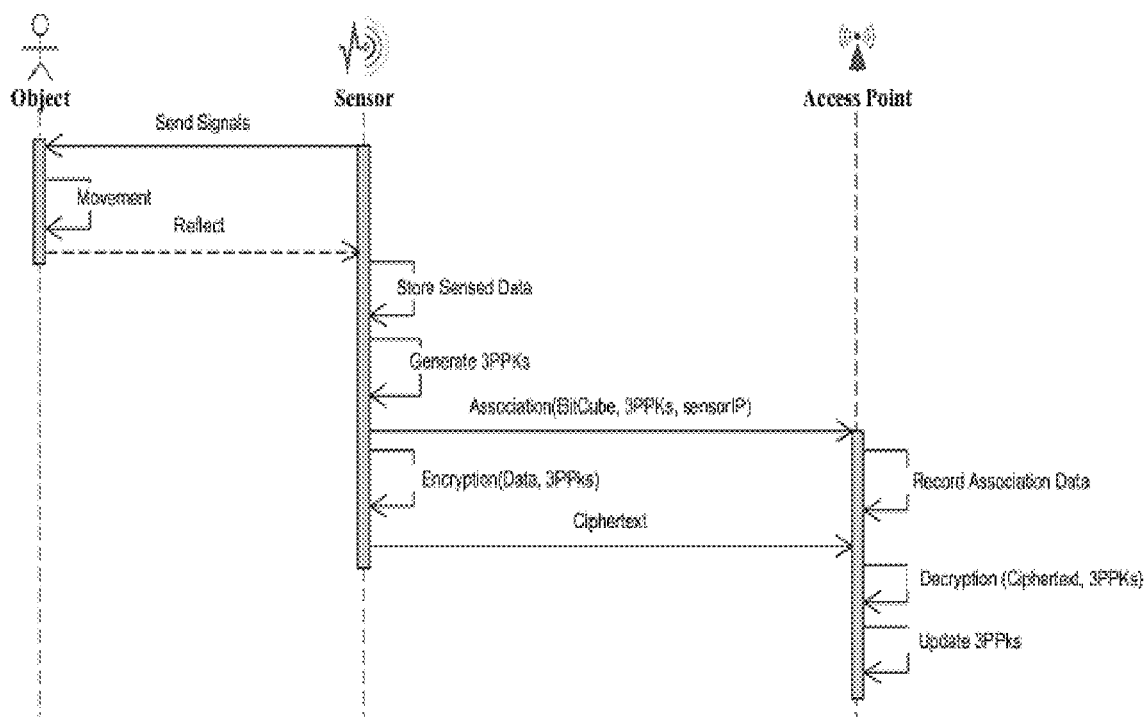
FIG. 20 is a diagram showing an example IoT cryptosystem sequence in accordance with some implementations.

Encryption
Input plaintext from sensor
Extract the stored PPKs
ciphertext1=plaintext XOR with First PPK BitsValue
Save the values of rest PPKs to start scattering the CubeKey
Call Scattering (Middle1Bit_of ciphertext1) function
Set new 3PPKs and store it as next 3PPKs.
Packet1=ciphertext1+3PPKs
Calculate the Hash Value of Packet1.
Packet2=Packet1+HashValue
ciphertext2=Packet2 XOR with Second PPK BitsValue
ciphertext3=ciphertext2 XOR with Third PPK BitsValue
Decryption
Input ciphertext3
Extract the stored 3PPKs
ciphertext2=ciphertext3 XOR with Third PPK BitsValue
Packet2=ciphertext2 XOR with Second PPK BitsValue
Packet1=Packet2—Hash
Calculate the Hash of the Packet1 to check the integrity
If IntegrityCheck function return true
CiperText1=Packet1—3PPKs
Save the value of rest PPKs to start scattering the CubeKey
Extract the new 3PPKs from the end of the Packet1 and store it as Next 3PPKs
Call Scattring(Middle1Bit_ofciphertext1) function
plaintext=ciphertext1 XOR with First PPK BitsValue Scattering(Middle1Bit)
If Middle1Bit>40
rotate the first face one time clockwise
rotate the second face one-time counter clockwise
rotate the third face one time clockwise
rotate the forth face one-time counter clockwise
rotate the fifth face one time clockwise
rotate the sixth face one-time counter clockwise
Else
rotate the first face one-time counter clockwise
rotate the second face one time clockwise
rotate the third face one-time counter clockwise
rotate the forth face one time clockwise
rotate the fifth face one-time counter clockwise
rotate the sixth face one-time counter clockwise
IntegrityCheck(Packet1)
If Hash (Packet1)==Received_Hash
Return true
Component Interactions The sequence diagram of the cryptosystem (e.g., FIG. 20) is discussed below. When the sensors are switched on, they can be transmitting signals. Whenever an object of any kind moves, the signals can be interrupted. The signals will be reflected to the sensor. After which, the cryptosystem is initiated. The sensor stores the reflected data in its memory and starts to generate the 3 PPKs randomly. Once the 3 PPKs are generated, the sensor sends an association message that includes the BitCube key and the generated 3 PPKs frame to the access point. The access point will record these keys in its memory and then wait for an encrypted data message to be received from the sensor.

At the sensor side, each step in the encrypt process is associated with the sensor. The output of the encryption process is a ciphertext that is sent to the access point. The access point can perform the decryption process. The steps in the decrypt process are related to the access point. Finally, the access point can extract the original data and update itself with the new set of PPKs.

Example Implementations

Two case scenarios where the BitCube cryptosystem can be implemented in different environments are described below. The two environment examples include a smart home and a smart jewelry store. The implementation process is described based on four main parts. The first part is a socket programming section related to the communications between the sensor and the AP. The other sections are related to the BitCube functions including: encryption implementation, decryption implementation, and scattering (or altering) implementation.

The BitCube cryptosystem can be implemented in various environments. The architecture of the two environments and the utilized sensors are described below.

To show the importance of the BitCube cryptosystem, each environment has a duplicate. The duplicates have the same architecture and the same sensor. The difference is that one set of environments (e.g., smart home and smart jewelry store) implements the BitCube cryptosystem, and the other set does not. Thus, the duplicates can illustrate what happens when the message is sent unencrypted.

1. Smart Home

Figure 21:
FIG. 21 is a diagram showing an example smart home IoT test environment in accordance with some implementations.
Figure 22:
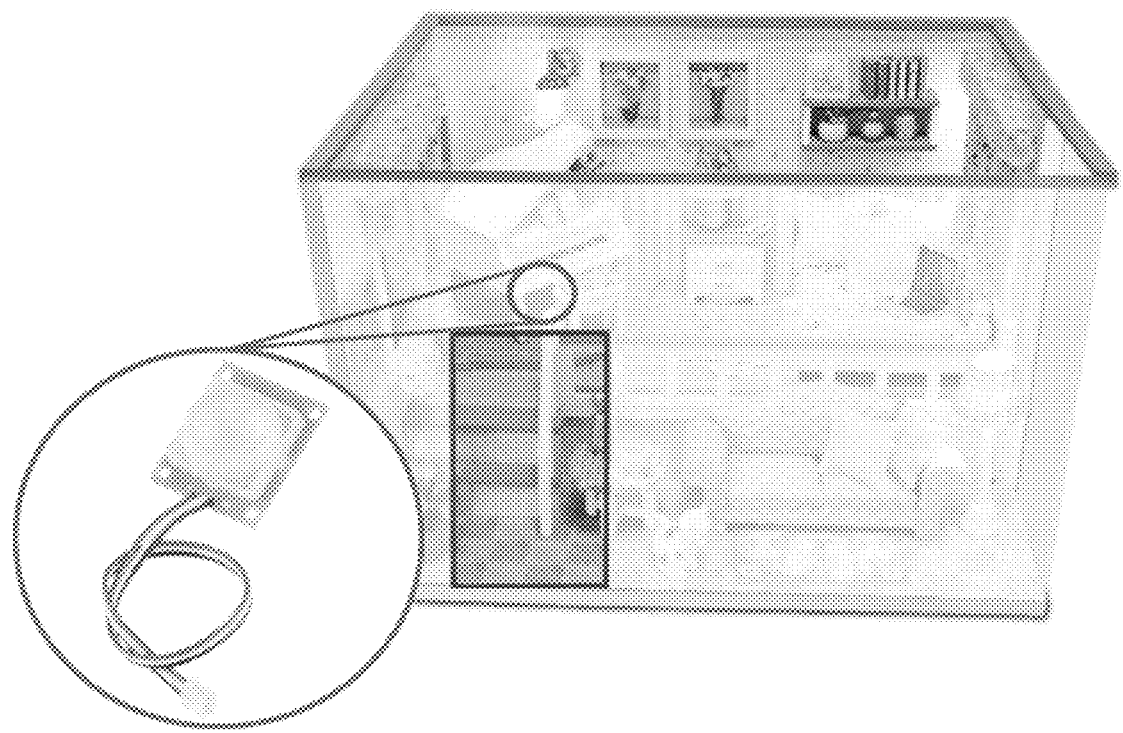
FIG. 22 is a diagram showing placement of an example motion sensor within the smart home IoT environment of FIG. 21.

In the first scenario, a smart home sends to its owner the message "INTRUDER! BitCube Team". This message is sent whenever motion is detected near the front door of the home. This scenario uses a motion sensor such as that shown in FIG. 22. The architecture of the environment is shown in FIG. 21. The focus and the main concern is the message. The BitCube cryptosystem sends the message securely to the AP.

2. Smart Jewelry Store

Figure 23:
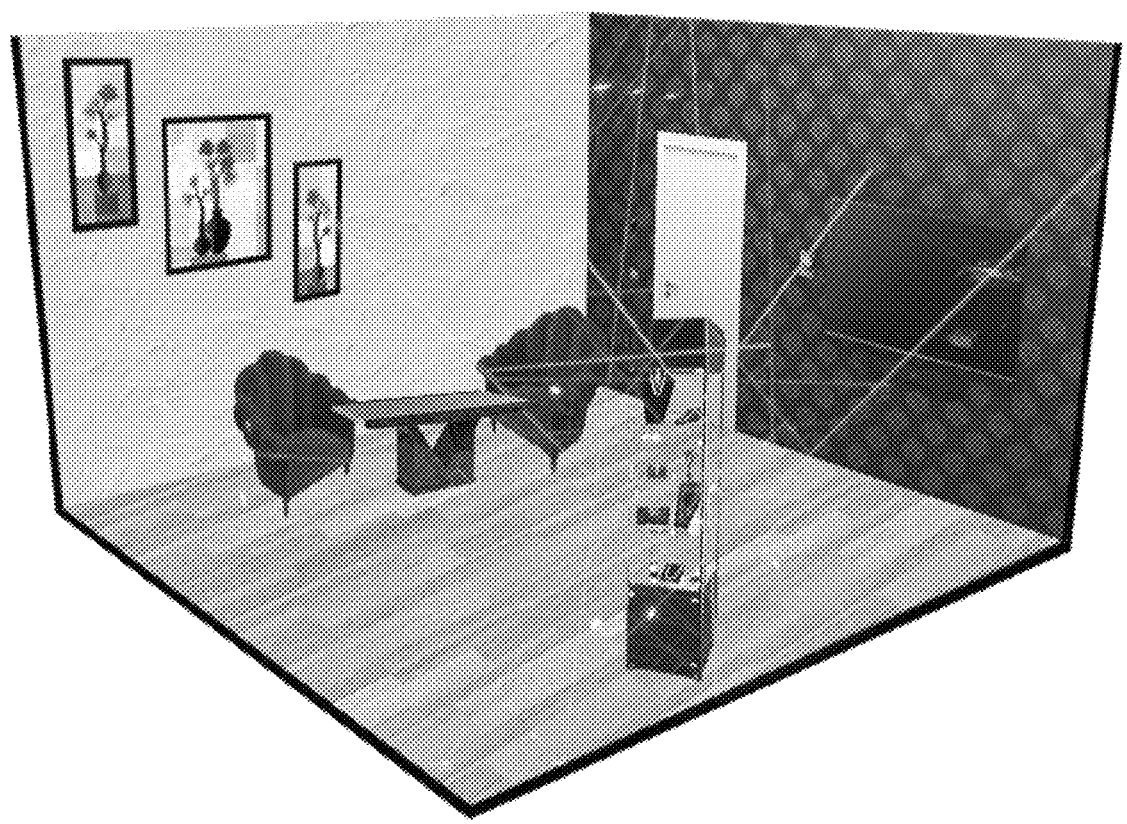
FIG. 23 is a diagram of an example smart jewelry store IoT environment in accordance with some implementations.

A laser tripwire is used in places like museums, banks, and in any place where something of value needs to be protected. In the second scenario, a laser tripwire is activated inside a jewelry store. The laser tripwire is set so that when an object breaks or interrupts the laser line, an alarm goes off. Furthermore, the message "INTRUDER! BitCube Team" is sent to the owner and/or manager of the store. As with the Smart Home, the message is sent securely to the AP. This scenario uses photosensitive resistor sensor or light dependent resistor (LDR). The sensor outputs a high value if light is detected, and a low value if there is no light. Therefore, the laser is illuminated directly into the sensor. When one or more beams of the laser are interrupted, the sensor is triggered. The architecture of the environment is shown in FIG. 23.

Figure 24:
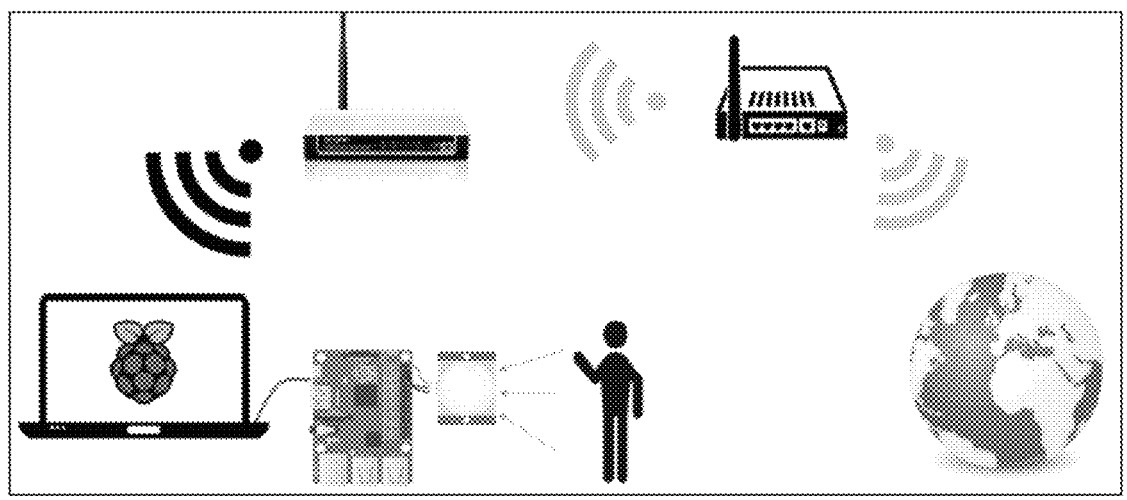
FIG. 24 is a diagram of an example IoT cryptosystem scenario in accordance with some implementations.

The hardware components shown in FIG. 8 can be used with or to simulate the BitCube cryptosystem. For example, the hardware components can be used in a scenario such as that shown in FIG. 24. In that scenario, the sensor is accessed through the Raspberry Pi embedded system. When motion is detected, the Raspberry Pi executes the encryption code. Then, the Raspberry Pi sends the encrypted data to the AP where the AP will decrypt the received data. It is important to mention that another Raspberry Pi will be connected physically to the AP as its controller in order to do its job (decryption).

The implementation of the encryption function is the role of an IoT sensor. For example, the encryption process can be performed in a Raspberry Pi that is connected to an IoT sensor. In addition, the decryption process can be performed in a Raspberry Pi that is connected to the AP.

As part of an initial set up of a Raspberry Pi, the Dexter Jessie Raspbian OS image (or other similar OS) can be installed on an SD card accessible by the Raspberry Pi. But before the installation, the SD card must be formatted. When that is done, the Raspberry Pi can be accessed through a remote access tool such as MobaXterm or physically via a TV by connecting via an HDMI cable.

Figure 25:
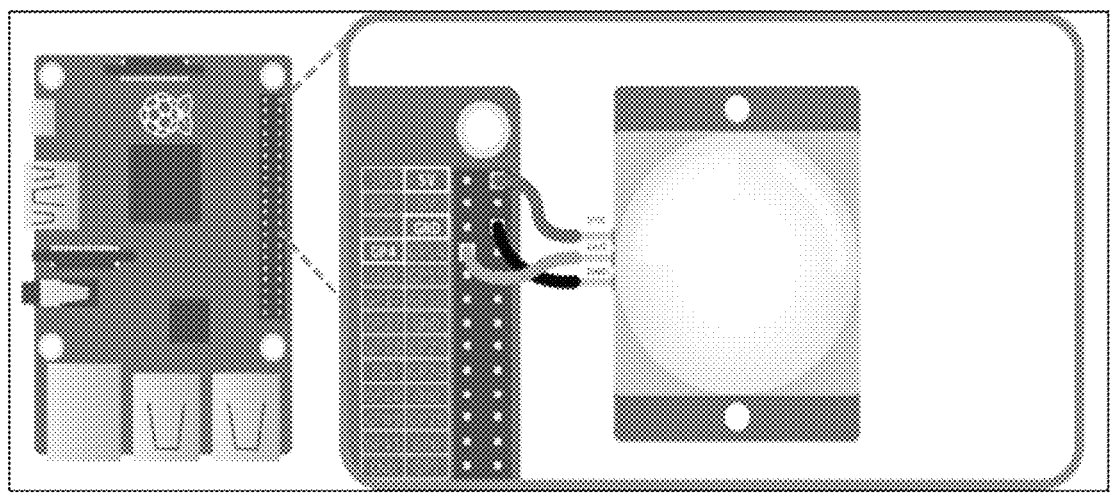
FIG. 25 is a diagram of an example configuration of an embedded processor and a sensor configured for use with an IoT cryptosystem in accordance with some implementations.

For example, a selected scenario from hackster illustrates one implementation of a BitCube cryptosystem scenario out of many implemented sensors types. See hackster. (2016, 5 3). Raspberry Pi Controlled FIR Sensor with Email Notifications. Retrieved from hackster: https://www.hackster.io/enginiler14/raspberry-pi-controlled-pir-sensor-with-email-notifications-0a8588, incorporated herein by reference in its entirety. The huckster example is based on a motion sensor that sends an alert message to email when it detects any movement. As FIG. 25 shows, the motion sensor pins are connected to the correct Raspberry Pi pins using three jumper wires.

The sensor VCC pin is wired to the 5V pin on the Raspberry Pi, providing a power to the sensor.

The sensor GND pin is connected to a ground pin on the Raspberry Pi.

The sensor OUT pin is wired to General Purpose Input Output (GPIO) 4 pin on the Raspberry Pi.

Finally, the signal that will be gained from the sensor will be used as the input to run the encryption algorithm.

As mentioned earlier, the Raspberry Pi can perform the functions of the AP, in this example. In reality, the AP is responsible for transmitting and receiving data as well as managing its table. For the AP table, the role of the AP in BitCube cryptosystem is not only to decrypt the received data, but to also track the BitCube Key as well as the PPKs along with sensor's IP address in a table called the AP Table. To do that, the AP is programmed, using Python, to have that table with high reliability. Once the AP receives data, the AP can determine which CubeKey and which PPKs need to be extracted. Furthermore, this table is used to drop the data that comes from an unknown source.

An implementation of a BitCube cryptosystem includes the encryption process in the sensor and the decryption process in the AP. The communication between the sensor and AP needs to be performed via a technique that permits the sensor to send data through the network and the AP to receive it. This process can be implemented using network programming languages that provide network services. For example, the Python language can be used to implement the BitCube cryptosystem as it is applicable in Raspberry Pi and also includes network services as part of the language features.

Sockets are bidirectional communications channels and can be implemented as connection oriented or connectionless over TCP and UPD, respectively. Sockets include built-in functions that allow two hosts to communicate under different situations. The BitCube cryptosystem utilizes socket functions to create the connection, send, and receive the data. The example code in Table 14 shows that if the sensor gets a signal, it starts establishing the connection using socket( ) function. This function creates the socket that will be used in the communication. Then, the socket function creates an object that will be used to connect the sensor with the AP through the agreed port.

TABLE 14

```
#based on the raspberry pi's pins
sensor = 4
GPIO.setmode (GPIO.BCM)
GPIO.setup (sensor, GPIO.IN, GPIO.PUD_DOWN)
previous_state = False
current_state = False
previous_state = current_state
current_state = GPIO.input(sensor)#reading the signal from the sensor,
0 or 1
host = '192.168.100.21' #IP address of the Access Point
port = 5501 #The port that will be used in the communication
if current_state ! = previous_state: #if the sensor gets signal 1 and the
previous value is 0, this will indicate that it senses
    BitCube.data= "INTRUDER! BigCube Team" #The message that will
    be encrypted
    flag=True
    Bit.Cube.BitCubeKey=BitCubeKeyGen ( ) #Calling BitCubeKey
    Generation function to extract the CubeKey from the file
    BitCube.Temp_BitCubeKey = BitCubeKeyGen( ) #Storing Temporary
    BitCube Key and use it after scattering the original CubeKey while
    flag:
        try: # To check if a problem occurs with connection before
        applying a change to the cube and the PPKs
            s = socket.socket (socket.AF_INET, socket.SOCK_STREAM)
            #Creating socket
            s.connect ((host, port)) #Connecting the sensor to AP's
            address through the agreed port
            encryptData ( ) #Start Encryption
            strtest=pickle.dumps (BitCube.data) #Allowing the socket
            to send a message as an array
            s.send (strtest) #Send the Encrypted message to the AP
            using the socket
            reply = s. recv (9700)
            reply.decode ('utf-8')
            flag = False #Breaking the loop if no problem occurs
            break
        except:
            flag=True #Allowing the creation of the connection again
            if a problem is faced
```

As shown in Table 15, for the AP, after creating the socket object, the port that will be used in the communication is specified. Also, listen( ) function is used to start listing to sensor connections. Although 100 connections are specified in the code, this number is an example and not a constant, it depends on the scenario of the implementation. After that, the accept( ) function is called to accept the incoming connection and returns the sender IP address. Finally, the AP extracts its table and then, a comparison between the IP address of the sender and AP table's IP address to verify its identity is done.

TABLE 15

```
host = ''
port = 5501 #The port that will be used in the communication
s = socket.socket(socket.AF_INET, socket.SOCK_Stream) #Creating
socket print ("Socket created.")
s.bind ((host, port)) #Specifying a port to receive through it
s.listen(100) #Start listening to sensors connections up to 100 connections
conn, address = s.accept ( ) #Establishing, accepting the connection, return
the connection ID and the IP
pickle_in = open ("AP_Table.pickle", "rb")
AP_Table = pickle.load (pickle_in) #Extracting AP Table
#Comparing sender's IP address with the IP addresses in AP Table
flag=False
x=0
for x in range (len(AP_Table)):
    if address [0] == AP_Table[x] [0]:
        BitCube.sensorCubeKey=AP_Table[x] [1]#Generating the BitCube
        Key from stored key in AP table
        BitCube.sensorPPKs=AP_Table[x] [2]#Generating the BitCube Key
        from stored PPKs in AP table
        flag=True
        break# if the IP is found, break the loop
if flag:
    BitCube.data = pickle.loads(conn.recv(9700)) #Receiving the sent
    array
    BitCube.BitCubeKey = BitCubeKeyGen( ) #Calling BitCube Key
    Generation function to extract BitCube Key
    BitCube.Temp_BitCubeKey = BitCubeKeyGen ( ) #Calling BitCube
    Key Generation function to extract BitCube
    decryptData ( )
```

The encryption process is a key part of the BitCube cryptosystem. First, the stored PPKs need to be extracted from PPKs file as well as the BitCube Key. After that, the data "INTRUDER!! BitCube Team" is generated after getting a signal from the sensor. Then, this data is XORed with PPK1. Here, the value that is generated is used as input to Scattering( ) function. More details about Scattering( ) function are discussed herein. The rest of the PPKs can be stored before the start of cube scattering. After the scattering is performed successfully, the new shape (or arrangement) of the cube is stored in CubeKey file to make it accessible next time. Then, PPKGen( ) function is called to generate new PPKs, store them in PPKs file, and attach them at the end of the first XORed message. This new message will be used as an input for the hash function, which then will be attached at the end of the message. Finally, the last two XORs with PPK2 and PPK3 are performed (see Table 16).

TABLE 16

```
def encryptData( ):
#Extracting the stored PPKs from PPKs file
    pickle_in = open("PPKs.pickle", "rb")
    BitCube.PPKs = pickle.load(pickle_in)
#Transforming the message into an array of integers
    BitCube.messageASCII = [ord(c) for c in BitCube.data]
    BitCube.data=np.array(BitCube.messageASCII)
#First XOR of the data after getting a signal from the sensor
    i = 0
    while i < len(BitCube.data):
#Using the first PPKs in the XOR operation
        BitCube.data[i] = BitCube.data[i] ^ BitCube.BitCubeKey
```

TABLE 16-continued

```
    [BitCube.PPKs[0]] [BitCube.PPKs[3]]
        i = i + 1
#Storing the rest of the PPKs temporary to start Scattering( ) function
    BitCube.ppk2F_dimension, BitCube.ppk3F_dimension =
    BitCube.PPKs[1],
    BitCube.PPKs [2]
    BitCube.ppk2S_dimension, BitCube.ppk3S_dimension =
    BitCube.PPKs[4],
    BitCube.PPKs[5]
#Generating a value from the first XORed data to be used in the
scattering function
    Length = lens(BitCube.data)
    if (Length % 2 == 0):
        Direction = BitCube.data[int(Length / 2)]
    else:
        Direction = BitCube.data[int(((Length + 1) / 2))]
#Calling the Scattering() function based on the value that was generated
from the first XORed data
    Scattering (Direction)
#Storing the new shape of the cube in a file after scattering it to make it
accessible next time
    pickle_out = open("bitCubeKey.pickle", "wb")
    pickle.dump(BitCube.BitCubeKey,pickle_out)
    pickle_out.close( )
#Calling PPKGen( ) function to generate new PPKs
    PPKGen( )
    newPPKs = np.array ( [BitCube.First_dimension[0]+01000,
    BitCube.First_dimension[1]+1000 ,BitCube.First_
#Attaching the PPKs at the end of the first XORed message
```

The decryption process is similar to the encryption process, but in inverse steps. As mentioned previously, the AP extracts the CubeKey and the PPKs based on the IP address of the sensor. The first step after the extraction is to XOR the received data with PPK3 then PPK2. Then, the hash will be extracted, removed from the end of the data, and compared to the new generated hash. If the hashes match (e.g., are identical), the new PPKs will be extracted from the end of the data, stored in distinct sensor's PPKs file, and removed from the end. The rest of the data will represent the first XORed data which is used to generate the input of Scattering( ) function as the same way in the sensor encryption. Finally, the data will be XORed with PPK1 to return the actual message (see Table 17).

TABLE 17

```
def decryptData( ):
#Calling PPKGen( ) function to extract the stored PPKs for the intended
sensor from PPKs file
    PPKGen( )
#Using PPK3 and PPK2 in the first and second XOR operation
    i = 0
    while i < len(BitCube.data):
        BitCube.data[i] = BitCube.data[i] ^
        BitCube.BitCubeKey[BitCube.PPKs[2]] [BitCube.PPKs[5]]
        i = i + 1
    t = 0
    while t < len(BitCube.data):
        BitCube.data[t] = BitCube.data[t] ^
        BitCube.BitCubeKey[BitCube.PPKs[1]] [BitCube.PPKs[4]]
        t = t + 1
#Extracting the hash the which is attached to the end of the data
    BitCube.Length = len(BitCube.data) - 1
    ExtractedHash = BitCube.data[BitCube.Length:] #Storing the hash
    BitCube.data = BitCube.data[:-1] #Removing the Hash from the data
    BitCube.Length = len(BitCube.data) - 6 #the length of the data
    without the PPKs
    BitCube.PPKs = BitCube.data[BitCube.Length:]#Extracting the PPKs
    forhash=""
    p = 0
    for p in range (len(BitCube.data)):
        forhash=forhash+""+str(BitCube.data[p]+"" #Transforming the
        data from array to string to be hashed
```

TABLE 17-continued

```
#Calculating the hash
    hashCode = int(loopthrough(hashlib.sha512(forhash.encode("utf-
    8")).hexdigest( )))
    if (hashCode == ExtractedHash):#Compare the extracted hash with
    new generated one
        d = 0
        for d in range (len(BitCube.PPKs)):
            BitCube.PPKs[d]=BitCube.PPKs[d]–1000 #PPKs Extraction
#Writing the new PPKs value to the distinct sensor file, to make them
accessible next time
        pickle_out = open(BitCube.sensorPPKs, "wb")
        pickle.dump(BitCube.PPKs,pickle_out)
```

The strength of the BitCube cryptosystem comes from utilizing the multidimensional cubic array (e.g., a computer data representation of a Rubic's cube). The scattering function is deigned to generate a new shape (or arrangement) of the cube based on the first XORed data. Each face is rotated one time to the right, clockwise, or to the left, counter clockwise, and the values are changed accordingly. With each face rotation, other cubicles, called outer cubicles according to the current face, from other faces are affected by the rotation. Therefore, their values need to be changed in a way that ensures the cube is a legal cube. The condition in the rotation will change the faces according to their assigned numbers. For example, if the inputted value satisfies the condition, the faces with even values will be rotated clockwise, and the odd values will be rotated counter clockwise. If it does not satisfy, the faces with odd values will be rotated clockwise, and the even values will be rotated counter clockwise (see Table 18).

TABLE 18

```
def Scattering(Dir):
    Direction2 = Dir
#As the Cube has 6 faces, the iteration is moved through all of them and
change their shape
    for x in range(6):
#Saving the current 9 cubicles of the current face to use them later
        BitCube.tempFace = [BitCube.BitCubeKey[x] [0],
        BitCube.BitCubeKey[x] [1], BitCube.BitCubeKey[x] [2],
        BitCube.BitCubeKey[,
        if (Direction2 < 40):
#Rotate the current face one time to the right (clockwise) and change the
values accordingly
            clockwiseTemp[x]
#When one face is rotated, the upper(outer) cubicles which are cubicles
from other faces are changed, so the change need to be applied
#Faces with even values will be rotated clockwise, and the odd will be
rotated counter clockwise
            if (x == 0): #rotated clockwise
                tempOuterFace = [BitCube.BitCubeKey[4] [0],
                BitCube.BitCubeKey[4] [3], BitCube.BitCubeKey[4] [6],
                BitCube.
                BitCube.BitCubeKey[4] [0], BitCube.BitCubeKey[4] [3],
                BitCube.BitCubeKey[4] [6], BitCube.BitCubeKey[1] [0]
            elif (x == 1): #rotated counter clockwise
                counterclockwiseTemp(x)
                tempOuterFace = (BitCube.BitCubeKey[4] [6],
                BitCube.BitCubeKey[4] [7], BitCube.BitCubeKey[4] [8],
                BitCube
                BitCube.BitCubeKey[4] [6], BitCube.BitCubeKey[4] [7],
                BitCube.BitCubeKey[4] [8], BitCube.BitCubeKey [2] [0]
            elif (x == 2): #rotated clockwise
                tempOuterFace = (BitCube.BitCubeKey[4] [8],
                BitCube.BitCubeKey[4] [5], BitCube.BitCubeKey[4] [2],
                BitCube.
                BitCube.BitCubeKey[4] [8], BitCube.BitCubeKey[4] [5],
                BitCuber.BitCubeKey[4] [2], BitCube.BitCubeKey[3] [0]
            elif (x == 3): #rotated counter clockwise
                counterclockwiseTemp(x)
                tempOuterFace = [BigCube.BitCubeKey[4] [2],
                BitCube.BitCubeKey[4] [1], BitCube.BitCubeKey[4] [0],
```

TABLE 18-continued

```
                BitCube.
                BitCube.BitCubeKey[4] [2], BitCube.BitCubeKey[4] [1],
                BitCube.BitCubeKey[4] [0], BitCube.BitCubeKey[0] [0]
            elif (x == 4): #rotated clockwise
                tempOuterFace = [BitCube.BitCubeKey[3] [2],
                BitCube.BitCubeKey[3] [1], BitCube.BitCubeKey[3] [0],
                BitCube.
                BitCube.BitCubeKey[3] [2], BitCube.BitCubeKey[3] [1],
                BitCube.BitCubeKey[3] [0], BitCube.BitCubeKey
                [2] [2],
            else: #rotated counter clockwise
                counterclockwiseTemp(x)
                tempOuterFace = [BitCube.BitCubeKey[1] [6],
                BitCube.BitCubeKey[1] [7], BitCube.BitCubeKey[1] [8],
                BitCube.
```

It will be appreciated that the two examples of the IoT environments described above are provided for illustration purposes. The main functions of the BitCube cryptosystem include encryption, decryption, and scattering functions. Socket programming is utilized to initiate the network communication and may vary with a change in the environment.

Following an actual evaluation implementation of the BitCube cryptosystem, a process of validating and verifying the quality of the designed cryptosystem is performed. Validating and verifying includes tests for the level of achieving confidentiality, low memory exhaustion, lightness, low power consumption, authentication, and data integrity.

Attacks in symmetric cryptosystems are divided into two main categories, brute force and cryptanalytic attacks. See Katz, J., & Lindell, Y. (2007). *Introduction to Modern Cryptography* (Chapman 8 Hall/Crc Cryptography and Network Security Series), incorporated herein by reference in its entirety. In the brute force attacks, the adversary tries all the possible keys in order to break the system. There is a high probability of succeeding in the attack if Eve tries half of the keys. The robustness of the BitCube against this attack has been proven mathematically.

In cryptanalytic attacks, the adversary success in decrypting the message without knowing the key. They also include number of cases where analyzing a pair of ciphertext and its corresponding plaintext reveals the encryption key. See Katz et al.; and Hoffstein, J., Pipher, J. C., Silverman, J. H., & Silverman, J. H. (2008). An introduction to mathematical cryptography (Vol. 1). New York: Springer, each incorporated herein by reference in their entirety. There are four types of cryptanalytic attacks:

ciphertext-only attack
Known-plaintext attack
Chosen-plaintext attack
Chosen-ciphertext attack As such attacks require analysis more than computation power, proving the defense against such attacks is done mathematically. This section tests the strength of the BitCube cryptosystems against three types of the cryptanalytic attacks: ciphertext-only attack, Known-plaintext attack, and Chosen-plaintext attack.

For internal networks, the cryptanalytic attacks require an access to the transmitted raw data as a pre-attack step. Usually, that is done by intercepting the data throw the air after conducting a wireless attack and gaining an unauthorized access to the internal network. The next sub-section represents the data interception attack by an intruder against two IoT environments. One environment is protected by the BitCube and the other one does not implement any encryption. After that, a test against the actual cryptanalytic attacks is conducted.

In an IoT environment, users may make an action on their smart devices and/or environment. This action triggers the sensors and generates data which is transmitted over the Internet. This section evaluates the security of such an activity, and how the BitCube confidentiality is affected by revealing the transmitted data.

Figure 26:
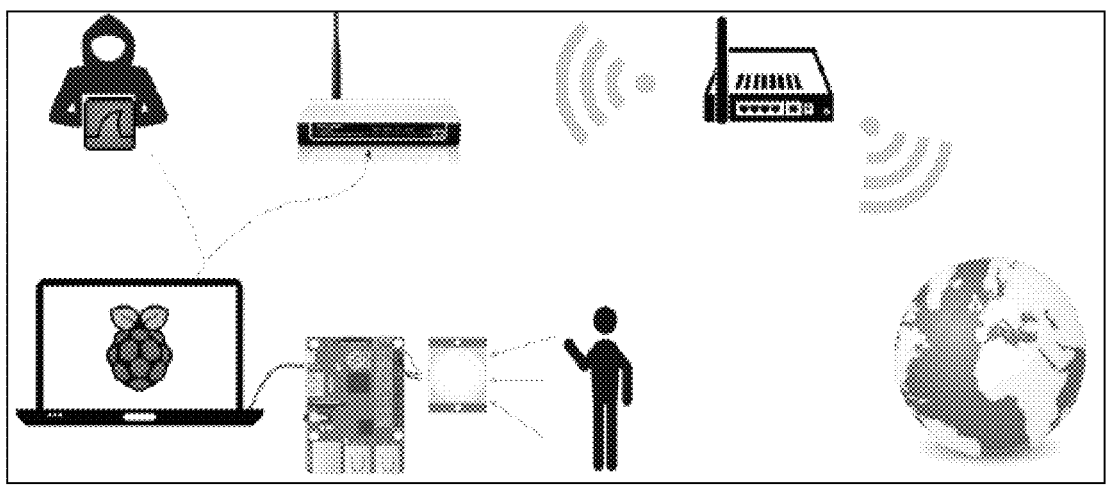
FIG. 26 is a diagram of an example eavesdropping testing scenario in accordance with some implementations.
Figure 27:
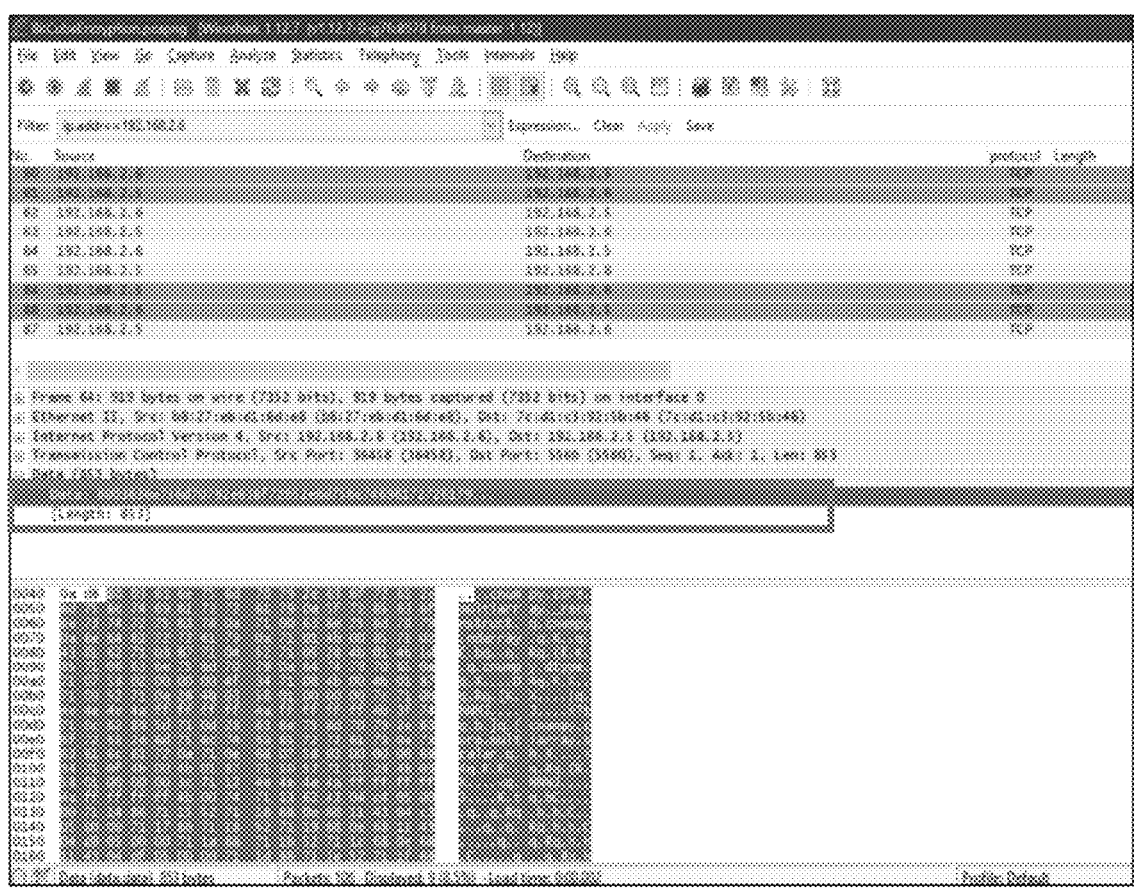
FIG. 27 is a diagram showing example encrypted data traffic in accordance with some implementations.
Figure 28:
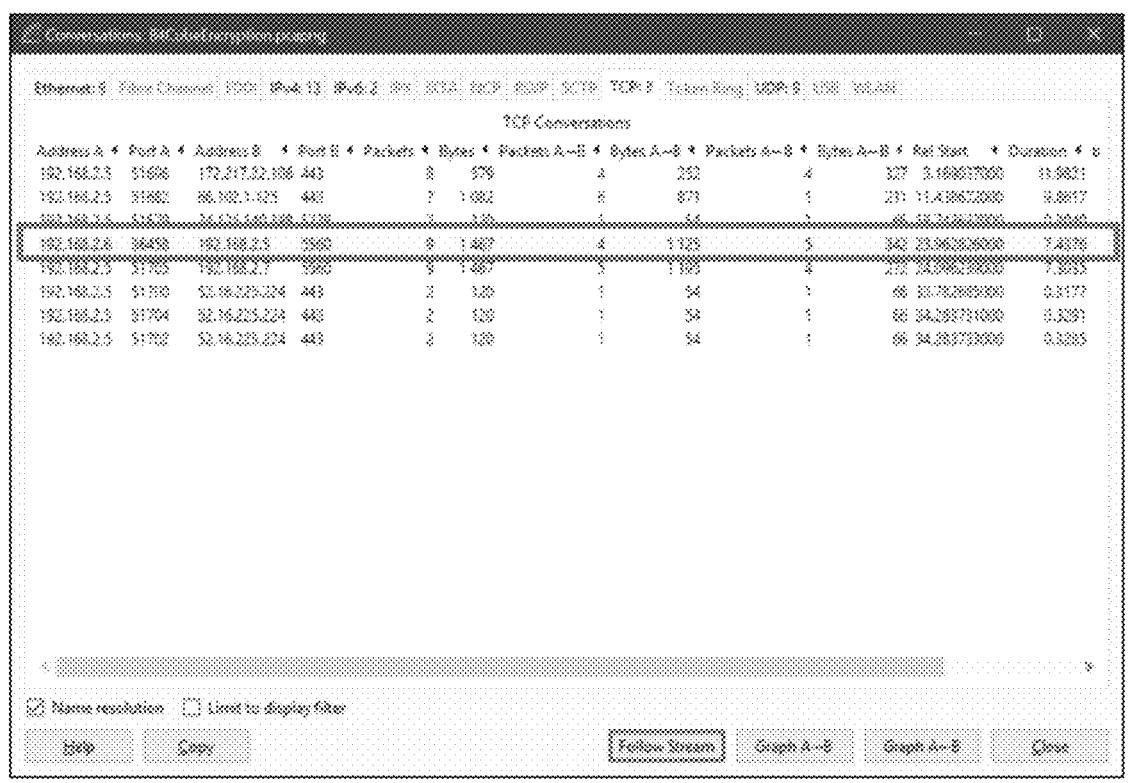
FIG. 28 is a diagram of example IP addressing of a sensor and an AP in accordance with some implementations.

In this test, there is an interception of data. The eavesdropper applies Man-in-the-Middle attack (MITM) using a tool called Wireshark. It is one of the most common tools used for sniffing and analyzing packets transmitted over the Internet. See Orgera, S. (2017, 10 12). *How to Use Wireshark: A Complete Tutorial. Retrieved from lifewire*: https://www.lifewire.com/wireshark-tutorial-4143298, incorporated herein by reference in its entirety. As shown in FIG. 26, an eavesdropper sniffs the data traffic between the sensor and the AP.

In general, this test evaluates the confidentiality in two different IoT environments. The first environment uses BitCube cryptosystem, whereas the second environment does not. Thus, sniffing happens on unencrypted data.

During testing of an implementation in a real IoT environment where the BitCube cryptosystem is implemented, after filtering out the IP address of the sensor and looking through the raw data, a gibberish data is noted. As shown in Table 27, it can be concluded that this IoT environment does not disclose the data. Therefore, it is protected from MITM.

TABLE 27

```
import pickle
import numpy as np
AP_TABLE = np.array([
    ["192.168.100.20", "BitCubeSensor1.pickle", "PPKs1.pickle"],
    ["192.168.100.8", "BitCubeSensor2.pickle", "PPKs2.pickle"]
])
pickle_out = open ("AP_Table.pickle", "wb")
pickle.dump(AP_TABLE,pickle_out)
pickle_out.close( )
```

Moreover, decryption and extraction of the encrypted data will be performed only by verified devices (i.e. who have the BitCube Key). Thus, the eavesdropper will not be able to decrypt the data. Furthermore, the eavesdropper will try to monitor the communications of different protocols. For example, a TCP conversation between a sensor and an AP is shown in Table 28.

TABLE 28

| 5:03 | BitCube Team Be Careful!. . .unauthorized sensor is trying to send data to you - (_____) | ☆ | ☐ |
| 5:03 | BitCubeTeam Be Careful!. . .unauthorized sensor is trying to send data to you - (_____) | ☆ | ☐ |

The eavesdropper discovers the sent data by choosing the option "follow TCP Stream statistics" in Wireshark. As the data is shown in Table 29, it is still encrypted.

TABLE 29

```
x=0
for x in range (len(AP_Table)):
    if address[0]==AP_Table[x] [0]:
        BitCube.sensorCubeKey=AP_Table[x] [1] #Generating the BitCube
        Key from stored key in AP table
        BitCube.sensorPPKs=AP_Table[x] [2]#Generating the BitCube
```

TABLE 29-continued

```
        Key from stored PPKs in AP table
        flag=True
        break#if the IP is found, break the loop
if flag:
    BitCube.data = pickle.loads(conn.recv(9700)) #Receiving the sent
    array
    BitCube.BitCubeKey = BitCubeKeyGen( ) #Calling BitCube Key
    Generation function to extract BitCubeKey for BitCube.
    Temp_BitCubeKey = BitCubeKeyGen( ) # Calling BitCube Key
    Generation function to extract BitCube Key
    decryptData( )
    DmessageASCII=chr(c) for c in BitCube.data]
    x=0
    msg=""
    for x in range (len(DmessageASCII)):
        msg=msg+DmessageASCII[x]+"" #The further action after the correct
        decryption depends on the needed a
else:#Alerting the owner that unauthenticated user is trying to send
    msg = "BitCube Team Be Careful! . . unauthenticated sensor is trying
    to send data to you"
    EmailAlert(msg)
```

Figure 30:
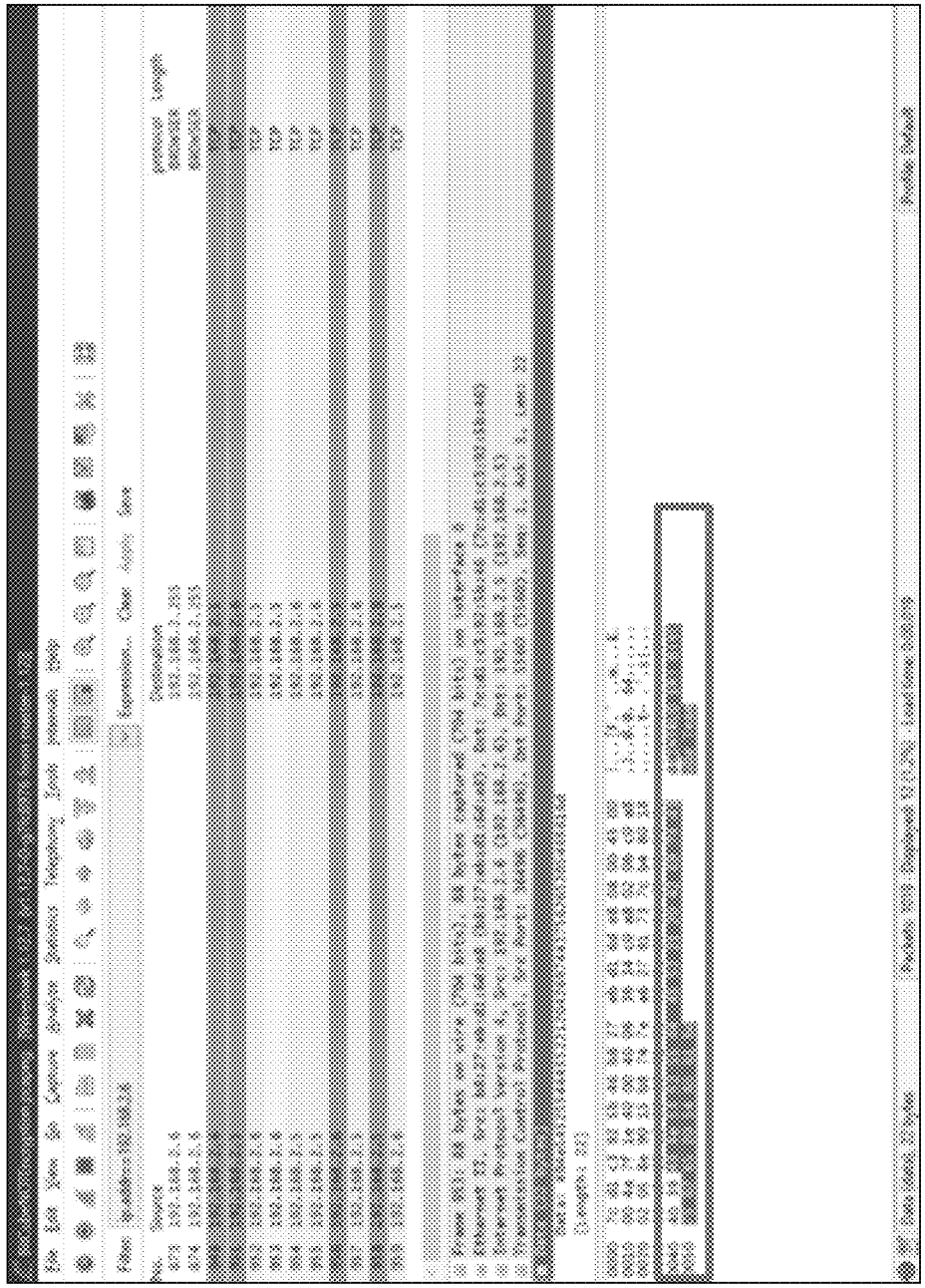
FIG. 30 is a diagram of example unencrypted data traffic in accordance with some implementations.
Figure 31:
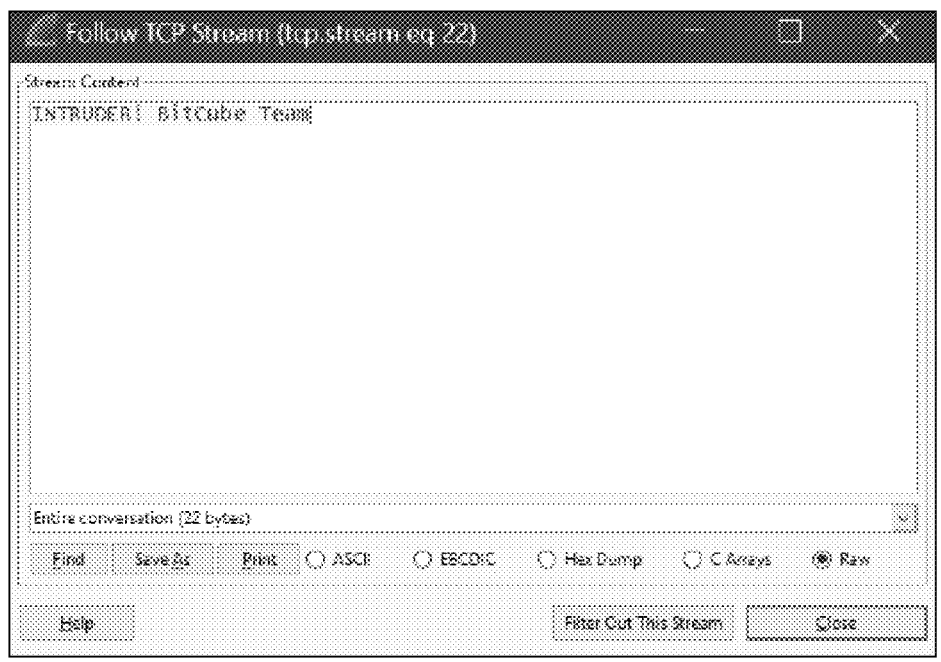
FIG. 31 is a diagram of an example TCP stream of unencrypted messages in accordance with some implementations.

The results of the protected environment are compared with another IoT environment that does not implement BitCube cryptosystem. The results of this test are shown in FIGS. 30-31. The scenario that occurred in testing in the protected environment is repeated. The eavesdropper will check the raw data. FIG. 30 shows that the transmitted data is unencrypted and in a clear text. This data is "INTRUDER! BitCube Team". This shows that the IoT environment that does not use a cryptosystem, could potentially leak and disclose sensitive sensed information.

TABLE 30

```
if (hashCode == ExtractedHash):#Compare the extracted hash with
new generated one
    d=0
    for d in range(len(BitCube.PPKs)):
        BitCube.PPKs[d] =BitCube.PPKs[d]-1000 #PPKs Extraction
#Writing the new PPKs value to the distinct sensor file, to make them
accessible next time
    pickle_out = open(BitCube.sensorPPKs, "wb")
    pickle.dump(BitCube.PPKs,pickle_out)
    pickle_out.close( )
#Removing the attached PPKs
    BitCube.data = BitCube.data[:BitCube.Length]
#Generating a value from the first XORed data to be used in the
scattering function
    if (BigCube.Length % 2 == 0):
        Direction = BitCube.data[int(BitCube.Length / 2)]
    else:
        Direction = BitCube.data[int(((BitCube.Length + 1) / 2))]
#Calling the Scattering( ) function based on the value that was
generated from the first XORed data
    Scattering (Direction)
#Storing the new shape of the cube to distinct sensor file after
scattering it to make it accessible next time
    pickle_out = open(BitCube.sensorCubeKey, "wb")
    pickle.dump(BitCube.BitCubeKey,pickle_out)
    pickle_out.close( )
#Using the Temporary CubeKey and the first PPKs in the last XOR
operation j = 0
    while j < len(BitCube.data):
        BitCube.data[j] = BitCube.data[j] ^
        BitCube.Temp_BitCubeKey[BitCube.ppk1F_dimension] [BitCube.
        ppk1S_dimention]
        j = j + 1
else:#Alerting the owner that the message has been tampered
    msg = "BitCube Team Be Careful!. . your message has been
    tampered"
    EmailAlert(msg)
```

TABLE 31

| 5:09 | BitCube Team Be Careful!...your message has ? ☆ ☐ been tampered - (_____) |
|------|---|

In this test, a passive attack is performed. In passive attacks, the attacker sniffs the transmitted data and observes the behavior of the sensor. There is no modification or impact on the normal operations of the system. However, the leaking of information affects the privacy of the IoT users. For example, the attacker can figure out a lot of private information like the time users enter and exit their smart environments (e.g. smart home, store, and hospital), such as sensitive medical information and so on. The previous attack can be a first step for other attacks where the attacker can perform malicious actions and present further risks.

Figure 32:
FIG. 32 is a diagram of an example IoT cryptosystem testing interface in accordance with some implementations.

Due to the lack of suitable software to test the achievement level of the BitCube requirements, the BitCube Testing Program was developed. It is written in the Java programming language and it implements the BitCube encryption and decryption. The program measures several values such as the RAM and CPU consumption. It also provides statistics that help in conducting cryptanalytic tests. FIG. 32 shows the interface of an example program.

The BitCube testing program consists of three main panels:
The User Panel.
The Data Representation Panel.
The Data Analysis Panel.

Figure 33:
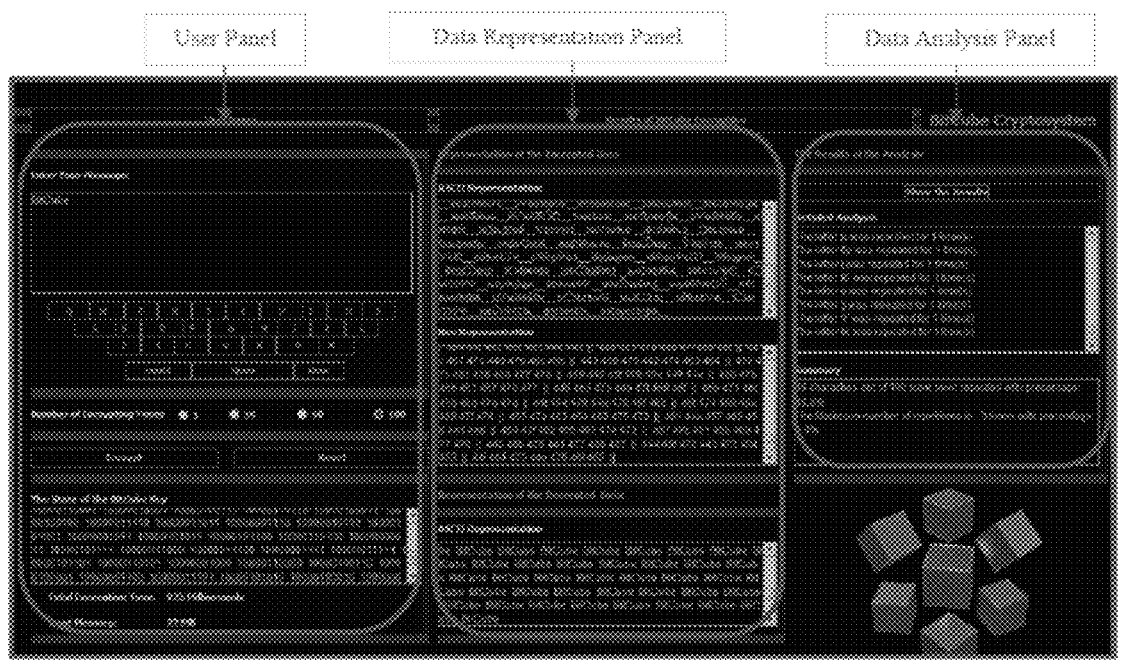
FIG. 33 is a diagram showing example IoT cryptosystem testing software in accordance with some implementations.

Each panel presents to the user different type of information. FIG. 33 shows the three panels.

The User Panel

The user panel is the interaction area between the user and the program. In this panel, a tester can enter the plaintext to the BitCube system and specify the number of encryption times. In the reality, the user of the BitCube cryptosystem does not need to encrypt the same message multiple times. However, this feature added to the program for testing purposes.

At the lower bound of the panel, the tester can monitor the state of the BitCube key. The number of the presented keys in the panel will be equal to the number of the encryption times due to the fact that the BitCube cryptosystem is designed to encrypt every packet with a different key.

Figure 34:
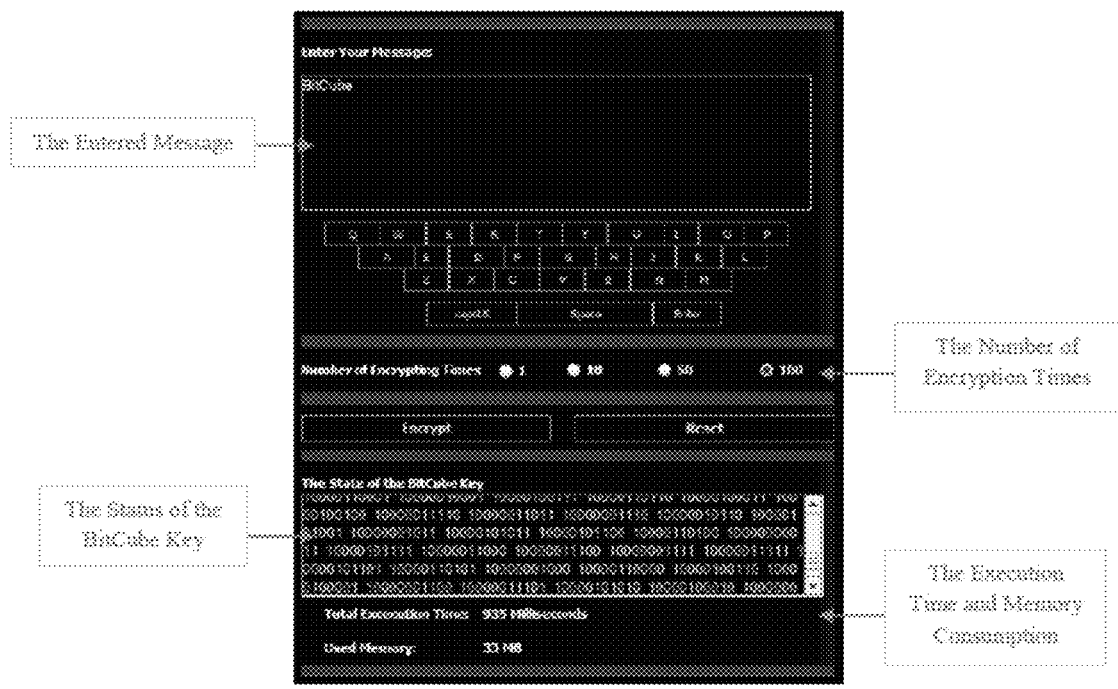
FIG. 34 is a diagram showing example components of a user panel in accordance with some implementations.

At the bottom of the screen, the tester can observe the execution time and the consumed amount of the RAM after each process. FIG. 34 shows the components of the user panel.

The Data Representation Panel

Figure 35:
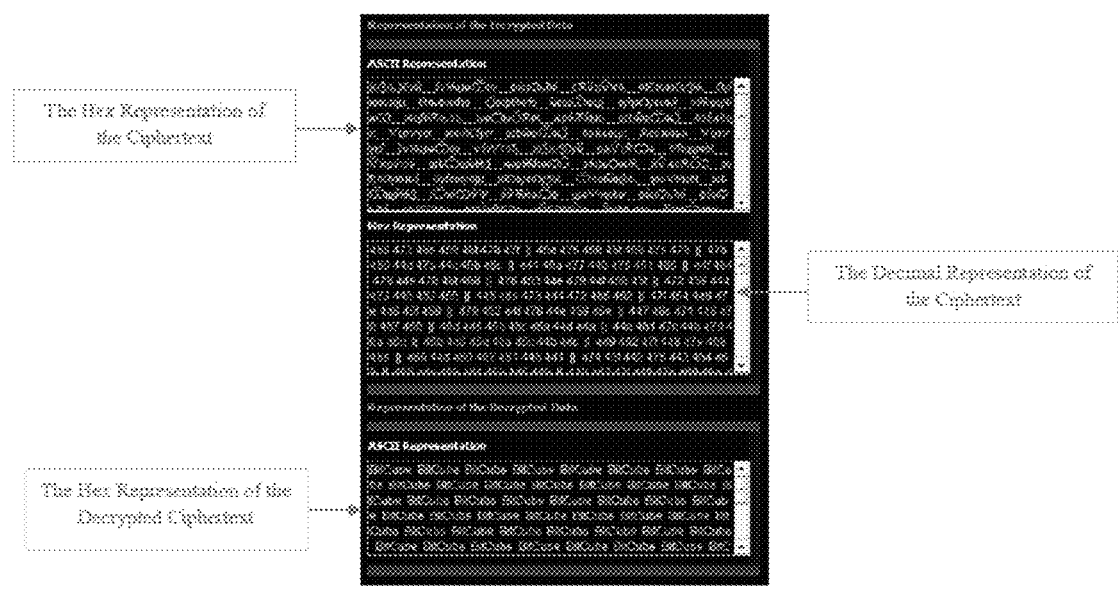
FIG. 35 is a diagram showing example components of a data representation panel in accordance with some implementations.

This panel provides the tester with two types of presentations, one for the encrypted data and one for the decrypted data. The encrypted data is presented in two forms Hex and Decimal, where the decrypted data will be presented in the Hex presentation. FIG. 35 shows the components of this panel.

The Data Analysis Panel

This panel provides the tester with a detailed analysis of the ciphertext. It shows the relation between all repeated times of encryption. The given analysis shows how many times for a specific letter in the plaintext is encrypted with a specific letter in the group of ciphertext. For example, if the plaintext is the letter 'A' and the tester chooses to encrypt it one hundred times; this panel will show how many times the letter 'A' was encrypted as 'B' and how many for 'C', 'D', 'E', etc. This kind of information helps the tester in his/her cryptanalysis examination.

Figure 36:
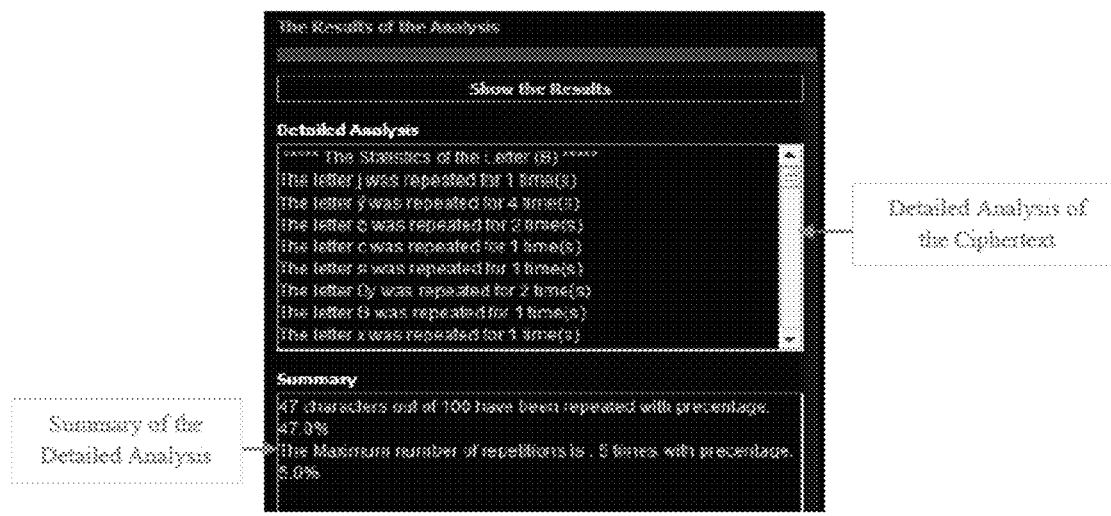
FIG. 36 is a diagram showing example components of a data analysis panel in accordance with some implementations.

The data analysis panel also provides a summary of the analysis in addition to the previously mentioned detailed analysis. FIG. 36 shows the data analysis panel.

Ciphertext-Only Attack

In cryptanalytic, the ciphertext-only attack is a model of attacks where the adversary has access to the ciphertext only. However, the eavesdropper has to have some knowledge of the plaintext like the language in which the plaintext was written and the expected statistical distribution of the characters in this language.

In English for example, the most frequent letter is 'E' followed by 'T', 'A', 'O' and 'N'. It is also known that the letter 'Q' usually followed by the word 'U'. When the attacker conducts a simple frequency analysis for the gained ciphertext, it will be easy to discover the plaintext without brute forcing the key.

However, it is worthy to mention that for the cryptanalytic attacks, in general, and for the ciphertext only attack, in specific, the message must be large. Conducting such attacks against small messages is not efficient. For example, this message "I'll study tomorrow night" has no single 'E' where it is the most used letter. Table 19 shows the frequency of letters in English.

TABLE 19

| E | 13.11% | S | 6.10% | U | 2.46% | K | 0.42% |
|---|--------|---|-------|---|-------|---|-------|
| T | 10.47% | H | 5.26% | G | 1.99% | X | 0.17% |
| A | 8.15%  | D | 3.79% | Y | 1.98% | J | 0.13% |
| O | 8.00%  | L | 3.39% | P | 1.98% | Q | 0.12% |
| N | 7.10%  | F | 2.92% | W | 1.54% | Z | 0.08% |
| R | 6.83%  | C | 2.76% | B | 1.44% |   |       |
| I | 6.35%  | M | 2.54% | V | 0.92% |   |       |

Scenario A: ciphertext-Only Attack Against Affine Cipher

This section tests the level of defense of Affine Cipher against the ciphertext-only attack. Tables 20 and 21 show the components of the scenario.

TABLE 20

Table 6.1-2 The Available Information at the Sender Side.

Sender

| Name | Ahmed |
| Keys | (Ahmed, Bader) $_{shared\ key}$ = (K = 7, b = 4) |
| Plaintext | M E E T M E A T N I G H T |
|           | 77 69 69 84 77 69 65 84 78 73 71 72 84 |

TABLE 31

Table 6.1-3 The Available Information At The Receiver Side.

Receiver

| Name | Bader |
| Keys | (Ahmed, Bader) $_{shared\ key}$ = (K = 7, b = 4) |
| Ciphertext | X T T U X T R U E V H Q U |
|            | 23 19 19 20 23 19 17 20 4 21 7 14 20 |

As shown in Table 21 the most repeated letters are 'T' and 'U'. That gives a probability that the letter 'E' could be mapped to one of them. For example, Eve will start to try one by one by plugging the available information in Equation 8. She will start mapping 'T' to 'E' and 'U' to 'T' since 'E' and 'T' are the most frequently repeated letters in English.

Equation 8—Affine Cipher Encryption Equation

Ciphertext=(Plaintext×k)+b mod 26

Mapping 'T' to 'E': T=(E×K)+b mod 26→19=(4×K)+b)mod 26    (1)

Mapping 'U' to 'T': T=(U×K)+b mod 26→20=(19×K)+b)mod 26    (2)

By adding (1) and (2) it will be easy to get the value of K and b. As a result, Eve is able to get the shared private key by cryptanalysis without the need of brute force. Now, Eve can decrypt the whole message and get the plaintext that Ahmed sent.

Results from Scenario A: Affine Cipher is vulnerable to the ciphertext-only attacks.

Scenario B: ciphertext-Only Attack Against the BitCube Cryptosystem

This section tests the level of defense of the BitCube cryptosystem against the ciphertext-only attack. Tables 22 and 23 show the components of the scenario on both sides.

TABLE 22

| Name | Sender Ahmed | | |
|---|---|---|---|
| Keys | First PPK = 10000100010 | Second PPK = 10000101100 | Third PPK = 10000000100 |
| Ciphertext | MEET ME AT NIGHT | | |
| M | 100111 | | |
| E | 1000101 | | |
| E | 1000101 | | |
| T | 1010100 | | |
| M | 1001101 | | |
| E | 1000101 | | |
| A | 1000001 | | |
| T | 1010100 | | |
| N | 1001110 | | |
| I | 1001001 | | |
| G | 1000111 | | |
| H | 1001000 | | |
| T | 1010100 | | |

TABLE 23

| Receiver Name Bader Keys | | |
|---|---|---|
| First PPK = 10000100010 | Second PPK = 10000101100 | Third PPK = 10000000100 |
| Ciphertext | | |

| | ч я я ў ч я ы ў ф у э т ў |
|---|---|
| ч | 10001000111 |
| я | 10001001111 |
| я | 10001001111 |
| ў | 10001011110 |

TABLE 23-continued

| ч | 10001000111 |
|---|---|
| я | 10001001111 |
| ы | 10001001011 |
| ў | 10001011110 |
| ф | 10001000100 |
| у | 10001000011 |
| э | 10001001101 |
| т | 10001000010 |
| ў | 10001011110 |

Figure 37:
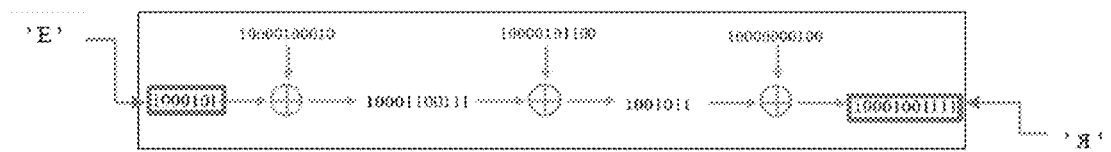
FIG. 37 is a diagram showing an example encryption process in accordance with some implementations.

From Table 23, the most repeated letters are 'я' and 'ў'. Eve will map one by one to the letter 'E' in order to get the key. FIG. 37 shows the encryption process for the letter 'E' at Ahmed's side that gave an output equal to 'я'.

Figure 38:
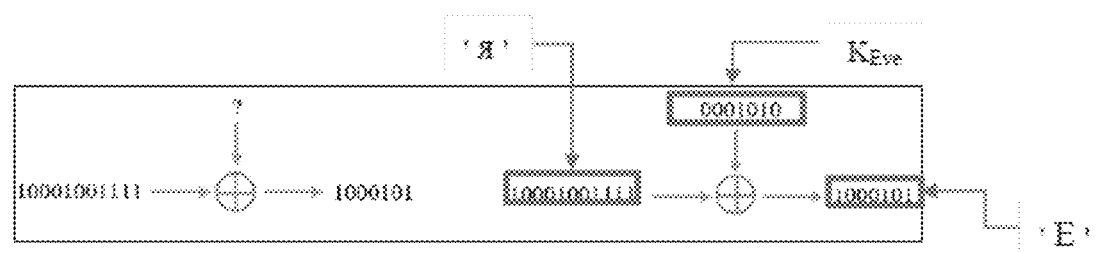
FIG. 38 is a diagram of an example encryption process for a letter in accordance with some implementations.

As the BitCube utilizes three keys in its decryption process, Eve will not be able to get all keys by cryptanalysis. However, this test examines whether she will be able to get one decryption key that achieves a correct decryption process. FIG. 38 illustrates the concept.

Figure 39:
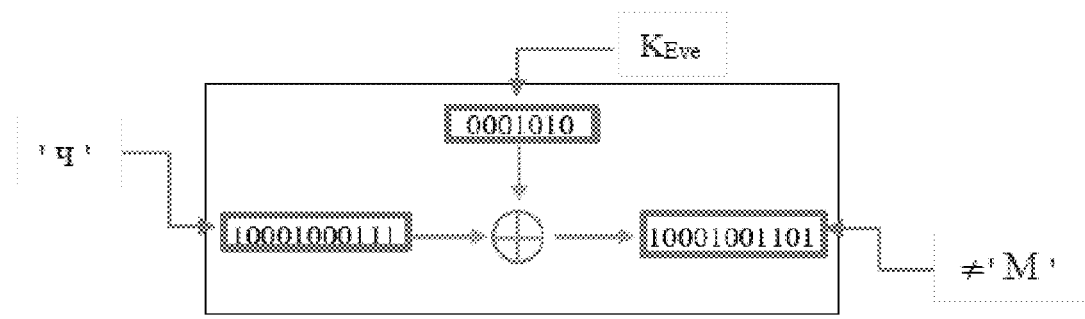
FIG. 39 is a diagram of an example encryption process for a letter in accordance with some implementations.

As in FIG. 38, the generated key by Eve (KEve) achieved a correct decryption process for the letter 'я' to get its corresponding plaintext which is 'E'. However, this key will not work with all letters in the message. FIG. 39 illustrates the decryption process by KEve for the value of 'ч' (corresponding to 'M' in the plaintext) which results in an incorrect value.

Known-Plaintext Attack

A known-plaintext attack is a cryptanalytic attack. In this attack, the attacker has gained by one way or another a pair of the plaintext and its corresponding ciphertext. This section tests the strength of the BitCube cryptosystem against this attack.

Scenario C: Known-Plaintext Attack Against the BitCube Cryptosystem

Suppose that the following message "MEET ME AT NIGHT I NEED HELP" was encrypted by the BitCube and sent by Ahmed to Bader. Through the transmission, the message is divided into two blocks. Eve was able to get the first block of the ciphertext and its corresponding plaintext. Table 24 summarizes the scenario.

TABLE 24

| | First Block | | | | | | | | | | Second Block | | | | | | | |
|---|---|---|---|---|---|---|---|---|---|---|---|---|---|---|---|---|---|---|
| Plaintext | M | E | E | T | M | E | A | T | N | I | G | H | T | I | N | E | E | D | H | E | L | P |
| Ciphertext | Ж | ъ | ъ | Ө | Ж | ъ | А | Ө | Ю | з | — | з | Ө | ъ | Ю | з | з | з | ъ | з | А | о |
| Block Keys | First PPK = 10000011110 Second PPK = 10000001010 Third PPK = 10000110011 | | | | | | | | | | First PPK = 10000100101 Second PPK = 10000010010 Third PPK = 10000011100 | | | | | | | |

As Table 24 shows, the letters in the first block are mapped to different letters in the second block. Gaining a pair of the plaintext and the corresponding ciphertext will not reveal any information regarding any other encrypted blocks. That is because the BitCube cryptosystem utilizes different triple keys for each block.

Results from Scenario C: The BitCube cryptosystem is strong against the known plaintext attacks.

Chosen-Plaintext Attack

In chosen-plaintext attack, Eve can choose random plaintexts to be encrypted by the targeted system and obtain the corresponding ciphertexts. The goal of this attack is to gain further information about the system which can help in conducting cryptanalytic attacks.

As a result of this attack, Eve will have a number of pairs of plaintexts from her chosen and the corresponding ciphertext.

Scenario D: Chosen-Plaintext Attack Against the BitCube Cryptosystem

Suppose employee X works in ABC company that implements the BitCube in its security system. Employee X is not satisfied with his work and wants to take revenge of the company. In this case, Eve is the internal employee X which has access to the system and can send whatever plaintext she wants. Later Ms. X can sniff the data after it encrypted by the BitCube cryptosystem and gain the ciphertext. Does monitoring the system's encryption process for multiple times reveal information that can result in breaking the BitCube cryptosystem?

Figure 40:
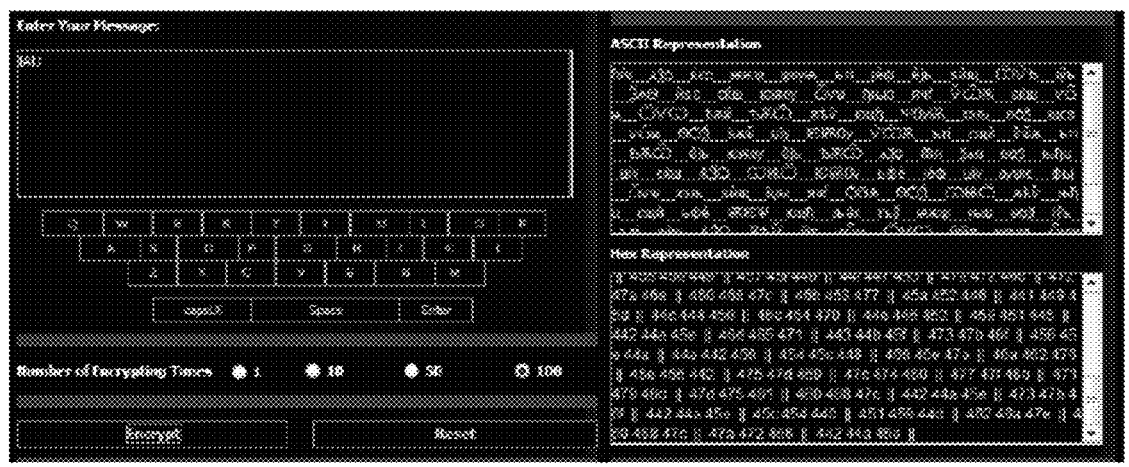
FIG. 40 is a diagram of different representations of ciphertext in accordance with some implementations.

Usually in a chosen plaintext attack, Eve tries to encrypt the same message for many times in order to figure out if there is a pattern of the ciphertexts. The BitCube has been tested against this attack. The same message which is "IAU" got encrypted for one hundred times and the gained ciphertext got analyzed. FIG. 40 shows different representations of the obtained ciphertext.

Analyzing the obtained ciphertext from this process resulted in a non-uniform distribution of the ciphertext. This means, there is no gaining information from this attack that could change the distribution of the ciphertext for the corresponding plaintext. Table 25 summarizes the gained analysis for each letter in the plaintext.

TABLE 25

| Statistics of the Letter (I) | Statistics of the Letter (A) | Statistics of the Letter (U) |
|---|---|---|
| The letter Ӫ was repeated for 2 time(s) | The letter V was repeated for 2 time(s) | The letter Ӫ was repeated for 2 time(s) |
| The letter Ҍ was repeated for 2 time(s) | The letter Т was repeated for 2 time(s) | The letter i was repeated for 2 time(s) |
| The letter Oy was repeated for 1 time(s) | The letter Ѱ was repeated for 1 time(s) | The letter ІЄ was repeated for 1 time(s) |
| The letter Ⱥ was repeated for 3 time(s) | The letter Ӡ was repeated for 3 time(s) | The letter O was repeated for 3 time(s) |
| The letter Ӫ was repeated for 2 time(s) | The letter Ї was repeated for 2 time(s) | The letter y was repeated for 2 time(s) |
| The letter Ɛ was repeated for 1 time(s) | The letter V was repeated for 1 time(s) | The letter Ӫ was repeated for 1 time(s) |
| The letter V̌ was repeated for 1 time(s) | The letter x was repeated for 1 time(s) | The letter ê was repeated for 1 time(s) |
| The letter V was repeated for 2 time(s) | The letter ѿ was repeated for 2 time(s) | The letter Ӿ was repeated for 2 time(s) |
| The letter Ӿ was repeated for 3 time(s) | The letter Ꚋ was repeated for 3 time(s) | The letter Ӿ was repeated for 3 time(s) |
| The letter Ⱥ was repeated for 2 time(s) | The letter Ҍ was repeated for 2 time(s) | The letter V̌ was repeated for 2 time(s) |
| The letter Ѓ was repeated for 1 time(s) | The letter Ӡ was repeated for 1 time(s) | The letter O was repeated for 1 time(s) |
| The letter Я was repeated for 1 time(s) | The letter Ҥ was repeated for 1 time(s) | The letter Я was repeated for 1 time(s) |
| The letter C was repeated for 1 time(s) | The letter Ч was repeated for 1 time(s) | The letter Ѓ was repeated for 1 time(s) |
| The letter Ӡ was repeated for 2 time(s) | The letter Щ was repeated for 2 time(s) | The letter Ӣ was repeated for 2 time(s) |
| The letter Ҵ was repeated for 2 time(s) | The letter Ⱥ was repeated for 2 time(s) | The letter Ө was repeated for 2 time(s) |
| The letter Љ was repeated for 1 time(s) | The letter ê was repeated for 1 time(s) | The letter x was repeated for 1 time(s) |
| The letter Ќ was repeated for 2 time(s) | The letter Ԑ was repeated for 2 time(s) | The letter p was repeated for 2 time(s) |
| The letter y was repeated for 1 time(s) | The letter Ӹ was repeated for 1 time(s) | The letter Ҵ was repeated for 1 time(s) |
| The letter Ӡ was repeated for 1 time(s) | The letter Ⱥ was repeated for 1 time(s) | The letter Ө was repeated for 1 time(s) |
| The letter Њ was repeated for 1 time(s) | The letter Ҍ was repeated for 1 time(s) | The letter Ц was repeated for 1 time(s) |
| The letter Ї was repeated for 3 time(s) | The letter Ҵ was repeated for 3 time(s) | The letter Ӹ was repeated for 3 time(s) |
| The letter V̌ was repeated for 2 time(s) | The letter Ӫ was repeated for 2 time(s) | The letter Ӿ was repeated for 2 time(s) |
| The letter C was repeated for 1 time(s) | The letter Щ was repeated for 1 time(s) | The letter Ӣ was repeated for 1 time(s) |
| The letter Ѭ was repeated for 3 time(s) | The letter w was repeated for 3 time(s) | The letter V was repeated for 3 time(s) |
| The letter Ѭ was repeated for 2 time(s) | The letter w was repeated for 2 time(s) | The letter V was repeated for 2 time(s) |
| The letter Ѭ was repeated for 3 time(s) | The letter ІЄ was repeated for 3 time(s) | The letter Ѱ was repeated for 3 time(s) |
| The letter Ї was repeated for 2 time(s) | The letter Ҵ was repeated for 2 time(s) | The letter Ӹ was repeated for 2 time(s) |
| The letter Ѭ was repeated for 1 time(s) | The letter w was repeated for 1 time(s) | The letter V was repeated for 1 time(s) |
| The letter ӱ was repeated for 1 time(s) | The letter i was repeated for 1 time(s) | The letter τ was repeated for 1 time(s) |
| The letter Ѭ was repeated for 2 time(s) | The letter ІЄ was repeated for 2 time(s) | The letter Ѱ was repeated for 2 time(s) |
| The letter Ⱥ was repeated for 2 time(s) | The letter Ӡ was repeated for 2 time(s) | The letter o was repeated for 2 time(s) |
| The letter Ѭ was repeated for 1 time(s) | The letter Ҍ was repeated for 1 time(s) | The letter V̌ was repeated for 1 time(s) |
| The letter O was repeated for 1 time(s) | The letter Ө was repeated for 1 time(s) | The letter Ⱥ was repeated for 1 time(s) |
| The letter w was repeated for 2 time(s) | The letter Ѭ was repeated for 2 time(s) | The letter Ӫ was repeated for 2 time(s) |
| The letter Ꚋ was repeated for 1 time(s) | The letter V̌ was repeated for 1 time(s) | The letter Ҍ was repeated for 1 time(s) |
| The letter Ҵ was repeated for 1 time(s) | The letter Ї was repeated for 1 time(s) | The letter y was repeated for 1 time(s) |
| The letter V was repeated for 1 time(s) | The letter Ӫ was repeated for 1 time(s) | The letter Ѣ was repeated for 1 time(s) |
| The letter w was repeated for 1 time(s) | The letter Ѣ was repeated for 1 time(s) | The letter Ӫ was repeated for 1 time(s) |
| The letter V̌ was repeated for 1 time(s) | The letter Ꚋ was repeated for 1 time(s) | The letter Ӿ was repeated for 1 time(s) |
| The letter Ӿ was repeated for 1 time(s) | The letter Ҍ was repeated for 1 time(s) | The letter V̌ was repeated for 1 time(s) |
| The letter ê was repeated for 1 time(s) | The letter Ќ was repeated for 1 time(s) | The letter Ш was repeated for 1 time(s) |
| The letter Ӣ was repeated for 1 time(s) | The letter s was repeated for 1 time(s) | The letter c was repeated for 1 time(s) |
| The letter Ќ was repeated for 1 time(s) | The letter ê was repeated for 1 time(s) | The letter p was repeated for 1 time(s) |
| The letter o was repeated for 1 time(s) | The letter Ө was repeated for 1 time(s) | The letter Ⱥ was repeated for 1 time(s) |
| The letter Ⱥ was repeated for 1 time(s) | The letter Ӡ was repeated for 1 time(s) | The letter o was repeated for 1 time(s) |
| The letter Ѭ was repeated for 1 time(s) | The letter ІЄ was repeated for 1 time(s) | The letter Ѱ was repeated for 1 time(s) |
| The letter Ҍ was repeated for 1 time(s) | The letter Т was repeated for 1 time(s) | The letter i was repeated for 1 time(s) |
| The letter Ї was repeated for 1 time(s) | The letter Ҵ was repeated for 1 time(s) | The letter Ӹ was repeated for 1 time(s) |
| The letter V̌ r was repeated for 1 time(s) | The letter ѿ was repeated for 1 time(s) | The letter Ӿ was repeated for 1 time(s) |
| The letter i was repeated for 2 time(s) | The letter Ӹ was repeated for 2 time(s) | The letter Ҍ was repeated for 2 time(s) |
| The letter Ю was repeated for 1 time(s) | The letter Ҵ was repeated for 1 time(s) | The letter ђ was repeated for 1 time(s) |
| The letter i was repeated for 1 time(s) | The letter Ӹ was repeated for 1 time(s) | The letter Ҍ was repeated for 1 time(s) |

Figure 41:
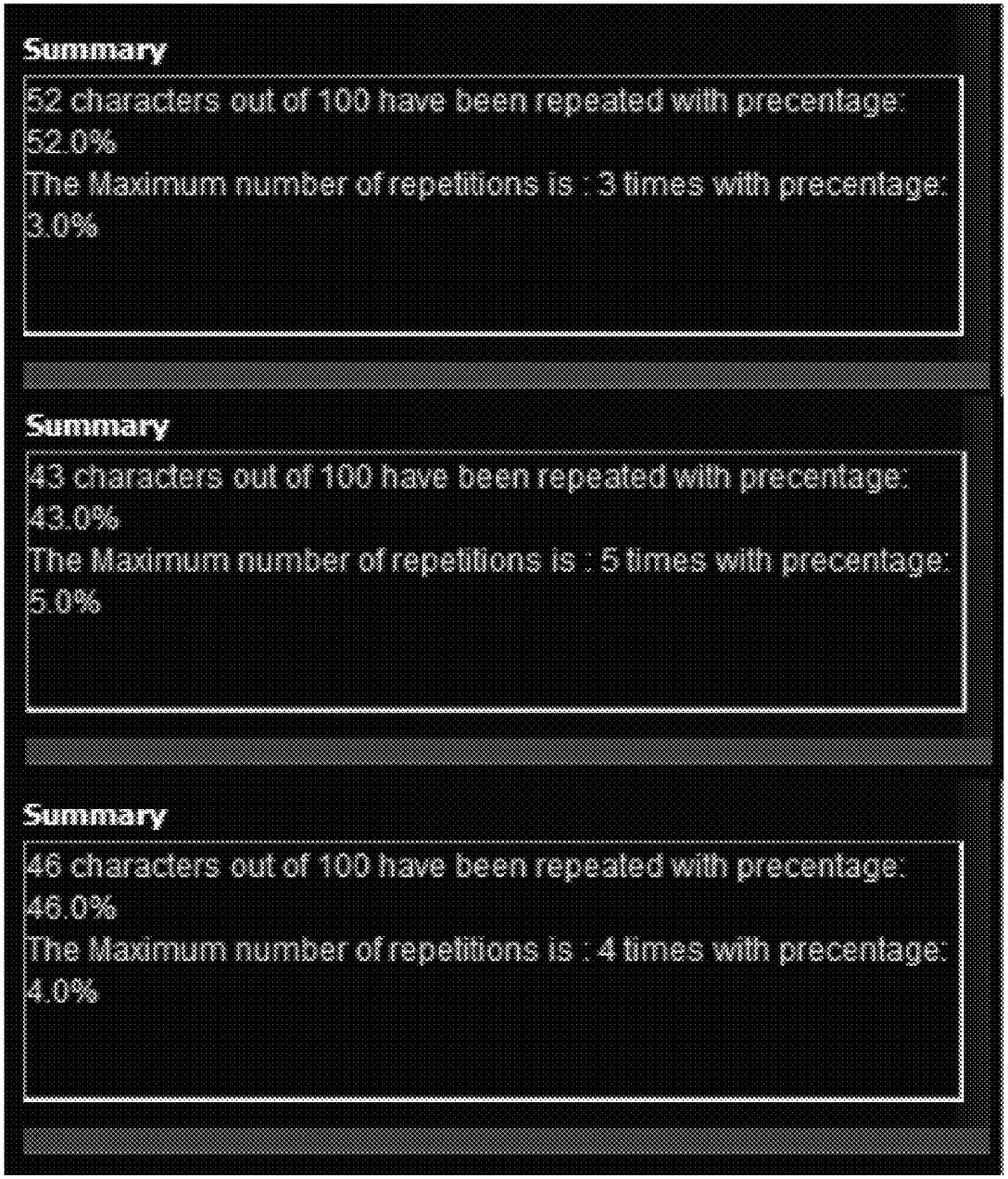
FIG. 41 is a diagram showing example results from IoT cryptosystem testing in accordance with some implementations.

In order to make tests more difficult and get stronger and more accurate results, the same test can be conducted three times, each time with one hundred encryption processes. FIG. 41 shows a summary of the results of the three tests. Each test shows different statistics which proves the randomness of the BitCube encryption process.

Results from Scenario D: The BitCube cryptosystem is strong against the chosen plaintext attacks.

Memory Performance Testing

Figure 42:
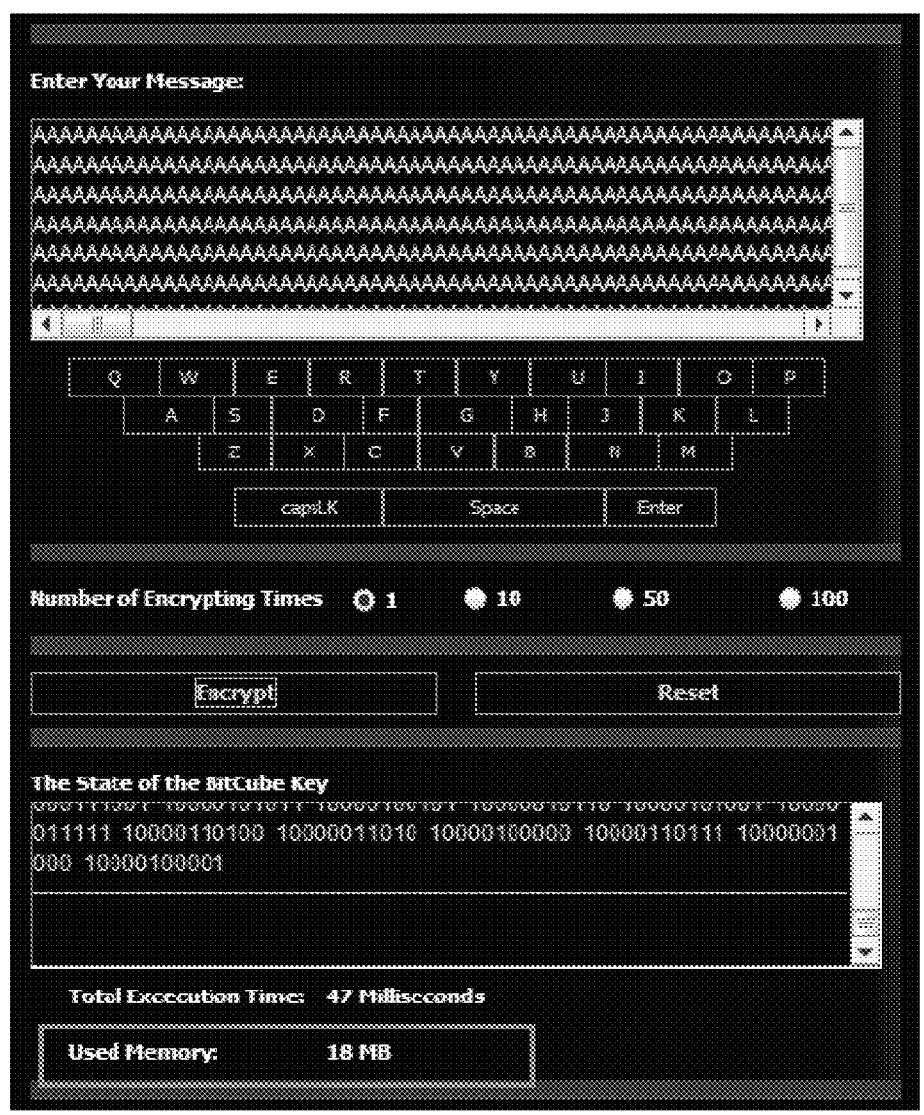
FIG. 42 is a diagram of memory usage for an IoT cryptosystem in accordance with some implementations.

As mentioned above, the BitCube cryptosystem does not require a large amount of storage in the secondary memory to store its keys. Below is provided accurate results about the consumption of the primary memory by the BitCube. The results are gained by an actual test after the real implementation. FIG. 42 shows the required RAM to encrypt one KB of data.

Figure 43:
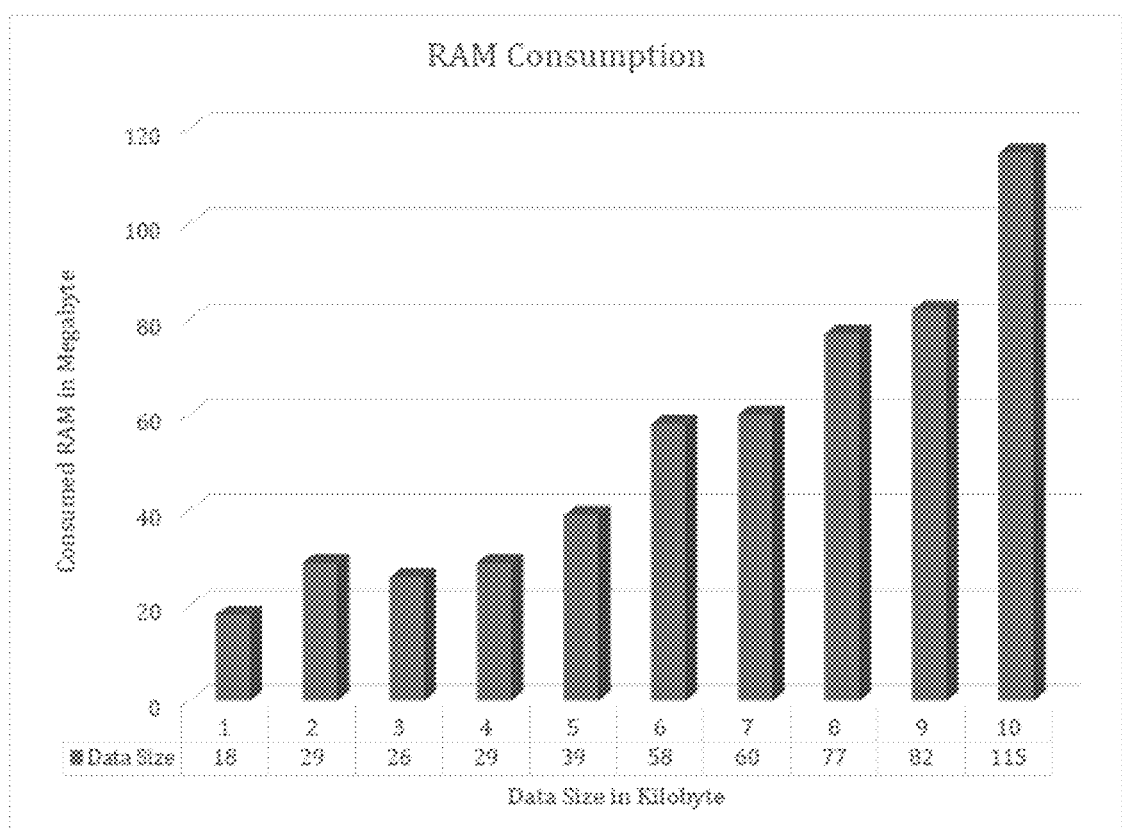
FIG. 43 is a diagram of memory consumption for different data sizes in accordance with some implementations.

Testing the memory performance for the encryption process was conducted for many times with different data sizes. The test shows good results. Where for large sizes of data, the RAM consumption did not reach 120 MB. FIG. 43 summarizes the results.

Figure 44:
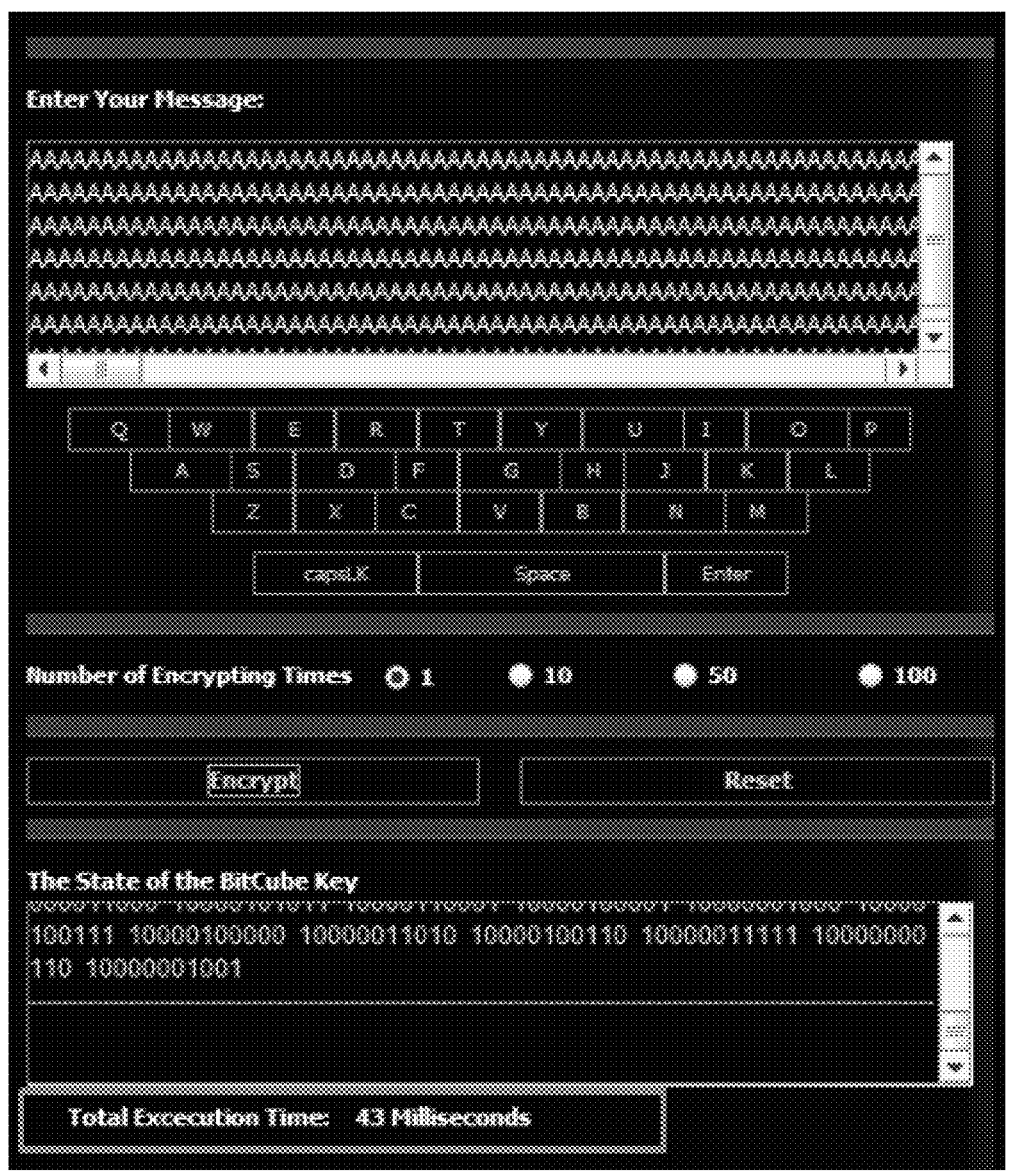
FIG. 44 is a diagram of execution time for an IoT cryptosystem process in accordance with some implementations.

The CPU consumption for the completed code of the algorithm was tested. FIG. 44 shows the execution time to encrypt one KB of data.

Figure 45:
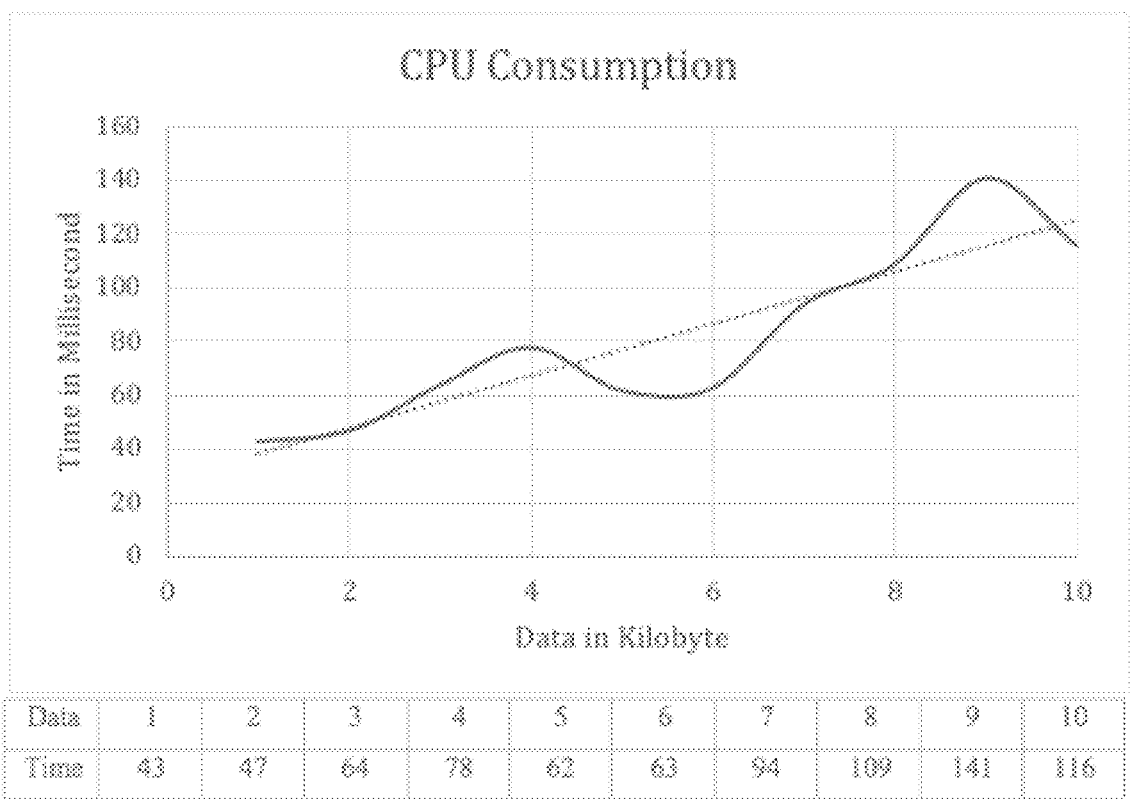
FIG. 45 is a diagram of execution time for different data sizes for an IoT cryptosystem process in accordance with some implementations.

The main result is that increasing the data size has a negligible effect on the CPU consumption. For more confirmation, the complete encryption process by the BitCube has been tested with different data sizes. The range of the data was between one-ten kilobytes. However, the range of the execution time was between 43-141 milliseconds. That means the variance of the time was equal to 98 milliseconds which is equal to 0.098 second. FIG. 45 shows the results of the test.

Figure 46:
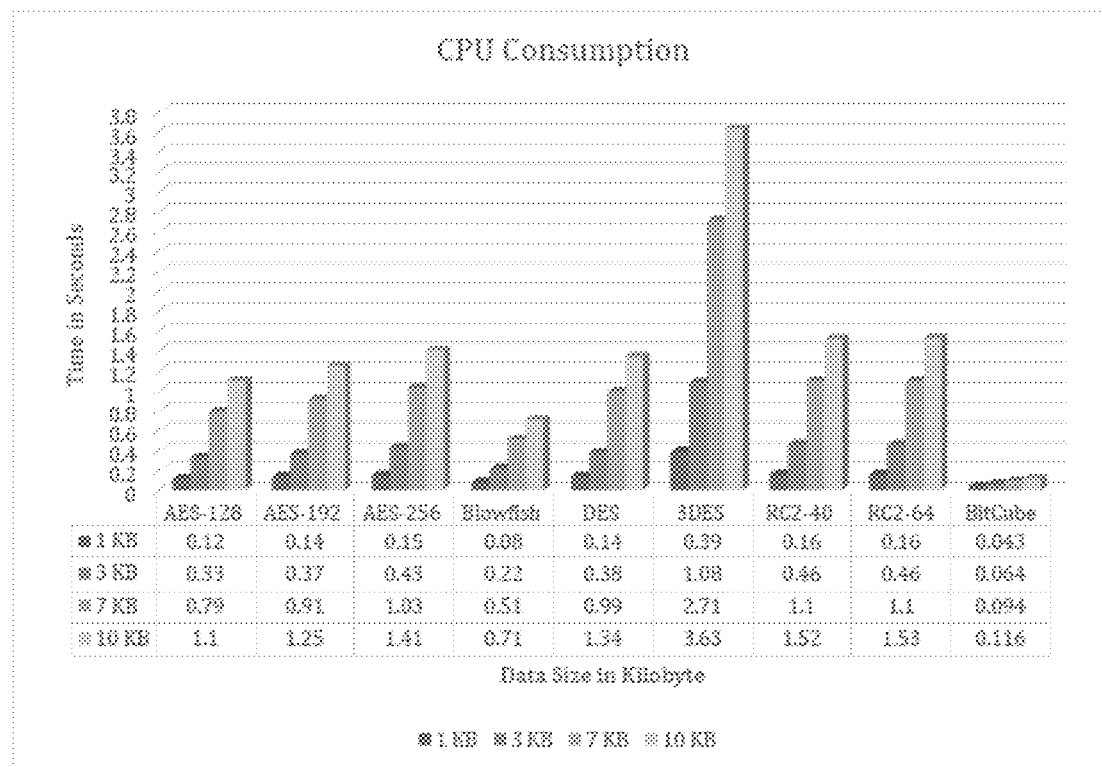
FIG. 46 is a diagram of a comparison of CPU consumption for IoT cryptosystems in accordance with some implementations.

The following FIG. 46 compares the CPU consumption by the BitCube algorithm with different symmetric algorithms. A comparison that includes different data sizes of 1, 3, 7, and 10 KB. The collected data about the symmetric algorithms is gained from experiments done by Silva. See Silva, N. B., Pigatto, D. F., Martins, P. S., & Branco, K. R. (2016). Case studies of performance evaluation of cryptographic algorithms for an embedded system and a general purpose computer. Journal of Network and Computer Applications, 60, 130-143, incorporated herein by reference in its entirety.

Power Consumption Testing

Figure 47:
FIG. 47 is a diagram of a USB charging detector for measuring power consumption in accordance with some implementations.

In this test, a small hardware component is used to test the power consumption of the BitCube cryptosystem. The power is computed by measuring the current and the voltage values. This component is the USB Charger Detector, see FIG. 47. The reason behind using this type USB is related to the Raspberry Pi platform used to access the sensor and execute the BitCube cryptosystem functions. The USB measures the power consumption of both the BitCube cryptosystem and the processes running on the Raspberry Pi. As mentioned in the Raspberry Pi website "Every active device you plug into the Raspberry Pi will consume some energy; even a mouse or a simple keyboard will eat up 50-100 mA". See Geerling, J. (2015, 12 1). *Raspberry Pi Zero—Conserve power and reduce draw to 80 mA*. Retrieved from blogs: https://www.jeffgeerling.com/blogs/jeff-geerling/raspberry-pi-zero-conserve-energy, incorporated herein by reference in its entirety. In some implementations, plugged devices include; HDMI, Keyboard and Mouse.

The USB Charger Detector has two ports, input and output. Any change in voltage produced from the Raspberry Pi will be an input to the power source. The change is then detected from the USB. There is a simple formula to calculate the power:

Equation 9 Calculating the Power $$W = V \times A$$

Results are shown in Table 26. It mentions the idle state of the Raspberry Pi and the changes after executing the BitCube cryptosystem (for both the encryption and decryption code). As it can be seen the value is low.

TABLE 26

| | Raspberry Pi3 model B (idle State) | Raspberry Pi3 model B (Encryption Code) | Raspberry Pi 3 model B (Decryption Code) |
|---|---|---|---|
| Current (A) | 0.26 A | 0.30 A | 0.29 A |
| Voltage (V) | 4.92 V | 5.0 V | 5.0 V |
| Power (W) | 1.27 W | 1.50 W | 1.45 W |

The aim behind doing this test was to produce a value that could be compared with other well-known lightweight cryptosystems values. This is not possible because of the constraints of using a Raspberry Pi and not having an open source sensor in the first place. A reference can be used that has the power consumption values of well-known cryptosystems. However, this comparison will be inaccurate. As the values found in the reference were taken from a different test environment that is not similar to the test performed using the USB Charger Detector. Nevertheless, considering a number of papers, the BitCube power consumption value is always lower. For example, in Yu et al., the masked lightweight AES has a value of 24 Watts which is higher than the BitCube cryptosystem. But again, this cannot be considered a fair and an accurate comparison, since the two test environments are different.

Authentication Testing

As mentioned earlier, a measure of authentication is provided for the sender. As long as the receiver is able to decrypt the message with the sender's key which is supposed to be secret and no one have it. Therefore, the message was encrypted by the one who has the same key which is the sender.

The AP is programmed to have an AP Table which includes each authenticated sensor's IP address, its CubeKey and PPKs (See Table 27). If the AP receives data from unauthorized IP, it will send an alert message to owner's email (See Tables 28 and 29). Also, if the IP was faked as an authenticated sender, the private key is not used to encrypt his fake message. Here, BitCube ensures that the AP receives data just from the authenticated sender as well as who has the private key.

Integrity Testing

Guaranteeing the correctness of the message is provided through the implementation of hashing. Tampering one single bit by an intruder, may lead the whole system to fall down. Before applying any changes to PPKS and BitCube key, the received hash is compared to new generated hash. If they are not identical, an alert email will be sent to the owner (See Tables 30 and 31).

The BitCube cryptosystem has good results in the testing phase and shows strength against different types of cryptanalytic attacks. The cryptosystem evidenced its low resource consumption regarding the power, memory, and CPU. Wide security requirements like authentication and integrity were provided. The results show that the BitCube is a strong and lightweight cryptosystem.

IoT technology is making a paradigm shift in the technology word. The use of IoT is growing at a fast rate. While it may be true that IoT technology facilitates our lives in many fields, however, each new technology introduces new security challenges. The main challenge with IoT resides in the inefficiency when implementing the available strong complex cryptosystems to secure the data transmission in its environment. IoT sensors have constraints in their memory size, processing speed, and power/battery. The nature of IoT sensors and their limited power capabilities and memory space do not allow the implementation of the existing strong complex cryptosystems in the sensors. The IoT cryptosystem disclosed herein (e.g., the BitCube cryptosystem) is a strong security solution to solve this issue in an efficient manner. It achieves many security features which are: confidentiality, message authentication and device authentication. It protects the data transmission between IoT sensors and a base station such as an AP. The proposed cryptosystem is designed for the IoT environment. However, it is applicable to be implemented in any environment that needs encryption and decryption. The simplicity of the BitCube cryptosystem is the main key for its applicability to the IoT sensors. Checking the lightness of the BitCube cryptosystem is done through calculating the time complexity and the memory space it needs. Subsequently, implementing the BitCube cryptosystem in a hardware environment is done to test its functionality. After that, calculating the power, time complexity, and memory space of the implemented BitCube is performed to compare the assumed/expected results. The last step is to check the confidentiality of the BitCube cryptosystem against cyber-attacks such as known plaintext attack, chosen-plaintext attack, and, ciphertext only attack. BitCube cryptosystem is resistant to all these cyber-attacks. A comparison between the BitCube cryptosystem and other cryptosystems is conducted to highlight the BitCube algorithm's uniqueness, lightness and, robustness.

The disclosed subject matter was conceived in part based on the need for a lightweight cryptosystem to secure the communication between IoT sensors and their base station and has resulted in the BitCube cryptosystem. BitCube cryptosystem is designed to encrypt the data before the transmission process. It decrypts the data once it is received.

Some implementations provide a high level of protection that secures the data transmission in WSN. The numerous possibilities of encryption keys highlights the robustness of the cryptosystem. Encrypting a packet with two different encryption keys every time is where the strength of the cryptosystem resides. In addition to that, performing various cyber-attacks against the implemented BitCube cryptosystem proved that cryptosystem is a strong one. The BitCube cryptosystem is proven to be resistant to known-plaintext attack, chosen-plaintext attack, and, Cipher-text only attack.

Some implementations include a lightweight cryptosystem that is suitable to be implemented in IoT environments. The BitCube has to be light on the IoT sensors. The BitCube algorithm's time complexity, power, robustness and, memory space calculations are performed to check the lightness of the BitCube algorithm. Some of them are calculated by mathematics while others are gained by tools and experiments. Results show that the cryptosystem is a lightweight cryptosystem that does not consume the power and battery of the sensor. In addition to that, implementing the BitCube encryption and decryption without a significant consumption of the power and memory space was a grantee.

Some implementations protect the insecure upcoming IoT technology in an efficient way. The BitCube cryptosystem solves the problem of disability of the implementation of strong cryptosystem in IoT environment. Some implementations add a significant value by offering security features without any additional hardware.

The BitCube cryptosystem achieves many security features such as confidentiality, integrity, message authentication, and device authentication. However, to achieve the confidentiality, integrity and availability triad (CIA triad), achieving the availability is one of the important development that needs to be included with the BitCube cryptosystem.

The BitCube cryptosystem is a complete encryption process that can work on its own in the Internet and can include deployment of the system within the TCP/IP network layers. A fixed packet header for the BitCube network communication process can be included in order for the deployment of BitCube in the network layers to work.

The BitCube cryptosystem shows that a strong cryptosystem does not necessarily mean a complex one. From a technology perspective, the BitCube cryptosystem includes a paradigm shift in the security of the IoT field. Some implementations optimize the security objectives without compromising the functionality of IoT sensors. The optimization of IoT security functions can help convince potential users of the viability of the IoT. Ultimately, IoT manufacturers may benefit from increased sales as IoT devices become more trusted and utilized.

Some implementations of the BitCube cryptosystem can help provide secure IoT sensors. As a result, users may view IoT sensors as trustworthy and reliable devices and increase usage of IoT devices. Because IoT sensors are deployed in many fields such as houses and hospitals, protecting these sensors from attacks will protect homes, medical facilities and other facilities, as well as help promote safety of people and property. In general, as the usage of IoT devices increases, securing these devices can help promote a more secure society.

In general, a computer (e.g., a processor in an IoT sensor system or other device, or in a wireless access point, or the like) that performs the processes described herein (e.g., the method shown in FIG. 4, 5, 9-13, 18 or 19) can include one or more processors and a memory (e.g., a non-transitory computer readable medium). The process data and instructions may be stored in the memory. These processes and instructions may also be stored on a storage medium such as a hard drive (HDD) or portable storage medium or may be stored remotely.

Particular advantages and preferable embodiments of the present system, apparatus, method and computer program product include:

A single encryption process may be competed with only one rotation. An entire process of encryption (which includes the rotation) is preferably repeated after each specific number of packets is handled.

The middle bit values of the second and third PPKs are preferably not used in the rotation function.

The cube is preferably not considered as the basis for generating a number of randomized keys in advance to be utilized later in the encryption process. Instead the cube is a representation of key location.

The BitCube preferably generates one key (consumes one rotation) for a specific number of packets and/or permits changing the key after a specific time (in a periodic manner).

As noted above in the BitCube there is preferably no relation between the plaintext and the cube. The Bitcube is for the keys only, not for the real data.

Unlike conventional systems that rely on string keys to rotate a cube based on the characters that are used to construct the string, the BitCube is preferably based on a single bit that eliminates the need for a string key.

The cube can be used to generate a big number of randomized keys utilized later in the encryption process.

The Bitcube system and algorithm can encrypt any type of data with any size because the cube is related to the keys and not the data itself The BitCube uses the concept of Rubik's cube only with the keys. It preferably has no link between the plaintext nor the ciphertext with the cube.

Note that each of the functions of the described embodiments may be implemented by one or more processors or processing circuits. A processing circuit can include a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device.

The processor may contain one or more processors and even may be implemented using one or more heterogeneous processor systems. According to certain implementations, the instruction set architecture of the processor can use a reduced instruction set architecture, a complex instruction set architecture, a vector processor architecture, a very large instruction word architecture. Furthermore, the processor can be based on the Von Neumann model or the Harvard model. The processor can be a digital signal processor, an FPGA, an ASIC, a PLA, a PLD, or a CPLD. Further, the processor can be an ×86 processor by Intel or by AMD; an ARM processor, a Power architecture processor by, e.g., IBM; a SPARC architecture processor by Sun Microsystems or by Oracle; or other known CPU architecture.

The functions and features described herein may also be executed by various distributed components of a system. For example, one or more processors may execute the functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A method comprising:
   obtaining, at a sensor system, sensor data;
   generating, at the sensor system, a plurality of per-packet keys, wherein the plurality of per-packet keys is used to obtain a corresponding plurality of values from a multi-dimensional cubic array;
   encrypting, at the sensor system, the sensor data using the corresponding plurality of values from the multi-dimensional cubic array to generate an encrypted data value;
   transmitting, from the sensor system, a message including the encrypted data value and the plurality of per-packet keys to a wireless access point;
   receiving, at the wireless access point, the message;
   decrypting, at the wireless access point, the encrypted data value using the plurality of per-packet keys to generate unencrypted sensor data, wherein the decrypting includes:
      obtaining, at the wireless access point, a third value from a wireless access point multi-dimensional cubic array corresponding to a third per-packet key;
      generating, at the sensor system, a first unencrypted text based on the encrypted data value and the third value;
      obtaining, at the wireless access point, a second value from the wireless access point multi-dimensional cubic array corresponding to a second per-packet key;
      generating, at the sensor system, a second unencrypted text based on the second value and the first unencrypted text;
      obtaining, at the wireless access point, a first value from the multi-dimensional cubic array corresponding to a first per-packet key; and
      generating, at the wireless access point, unencrypted sensor data based on the second unencrypted text and the first value; and
   processing, at the wireless access point, the unencrypted sensor data.

2. The method of claim 1, wherein the sensor system includes an Internet of Things device.

3. The method of claim 1, wherein the sensor system forms a portion of a wireless sensor network.

4. The method of claim 1, wherein the plurality of per-packet keys includes three per-packet keys.

5. The method of claim 1, wherein the multi-dimensional cubic array includes a three by three by three cubic array.

6. The method of claim 1, wherein the encryption includes:
   obtaining, at the sensor system, a first value from the multi-dimensional cubic array corresponding to a first per-packet key;
   generating, at the sensor system, a first ciphertext based on the first value and the sensor data;

obtaining, at the sensor system, a second value from the multi-dimensional cubic array corresponding to a second per-packet key;

generating, at the sensor system, a second ciphertext based on the first ciphertext and the second value;

obtaining, at the sensor system, a third value from the multi-dimensional cubic array corresponding to a third per-packet key; and generating, at the sensor system, a third ciphertext based on the second ciphertext and the third value, wherein the encrypted data value includes the third ciphertext.

7. The method of claim 6, further comprising:

saving, at the sensor system, a current state of the multi-dimensional cubic array;

altering, at the sensor system, an arrangement of the multi-dimensional cubic array after generating the first ciphertext and before generating the second ciphertext; and altering, at the sensor system, an arrangement of the multi-dimensional cubic array after generating the second ciphertext and before generating the third ciphertext.

8. The method of claim 1, wherein the message includes a first hash value.

9. The method of claim 8, further comprising:

generating, at the sensor system, the first hash value based on the encrypted data value and a next plurality of per-packet keys;

generating, at the wireless access point, a second hash value based on the encrypted data value and a next plurality of per-packet keys;

comparing the first hash value with the second hash value; and if the first hash value does not match the second hash value, transmitting, from the wireless access point, an indication of a potential security breach.

10. A system comprising:

a sensor system having one or more sensor system processors coupled to a non-transitory computer readable medium within the sensor system having stored thereon software instructions that, when executed by the one or more sensor system processors, cause the one or more sensor system processors to perform operations including:

obtaining, at the sensor system, sensor data;

generating, at the sensor system, a plurality of per-packet keys, wherein the plurality of per-packet keys is used to obtain a corresponding plurality of values from a multi-dimensional cubic array;

encrypting, at the sensor system, the sensor data using the corresponding plurality of values from the multi-dimensional cubic array to generate an encrypted data value;

transmitting, from the sensor system, a message including the encrypted data value and the plurality of per-packet keys to a wireless access point;

the wireless access point having one or more wireless access point processors coupled to a non-transitory computer readable medium within the wireless access point having stored thereon software instructions that, when executed by the one or more wireless access point processors, cause the one or more wireless access point processors to perform operations including:

receiving, at the wireless access point, the message;

decrypting, at the wireless access point, the encrypted data value using the plurality of per-packet keys to generate unencrypted sensor data, wherein the decrypting includes:

obtaining, at the wireless access point, a third value from a wireless access point multi-dimensional cubic array corresponding to a third per-packet key;

generating, at the sensor system, a first unencrypted text based on the encrypted data value and the third value;

obtaining, at the wireless access point, a second value from the wireless access point multi-dimensional cubic array corresponding to a second per-packet key;

generating, at the sensor system, a second unencrypted text based on the second value and the first unencrypted text;

obtaining, at the wireless access point, a first value from the multi-dimensional cubic array corresponding to a first per-packet key; and generating, at the wireless access point, unencrypted sensor data based on the second unencrypted text and the first value; and processing, at the wireless access point, the unencrypted sensor data.

11. The system of claim 10, wherein the encryption includes:

obtaining, at the sensor system, a first value from the multi-dimensional cubic array corresponding to a first per-packet key;

generating, at the sensor system, a first ciphertext based on the first value and the sensor data;

obtaining, at the sensor system, a second value from the multi-dimensional cubic array corresponding to a second per-packet key;

generating, at the sensor system, a second ciphertext based on the first ciphertext and the second value;

obtaining, at the sensor system, a third value from the multi-dimensional cubic array corresponding to a third per-packet key; and generating, at the sensor system, a third ciphertext based on the second ciphertext and the third value, wherein the encrypted data value includes the third ciphertext.

12. The system of claim 11, wherein the operations further include:

saving, at the sensor system, a current state of the multi-dimensional cubic array;

altering, at the sensor system, an arrangement of the multi-dimensional cubic array after generating the first ciphertext and before generating the second ciphertext; and altering, at the sensor system, an arrangement of the multi-dimensional cubic array after generating the second ciphertext and before generating the third ciphertext.

13. The system of claim 10, wherein the message includes a first hash value.

14. The system of claim 13, wherein the operations further include:

generating, at the sensor system, the first hash value based on the encrypted data value and a next plurality of per-packet keys;

generating, at the wireless access point, a second hash value based on the encrypted data value and a next plurality of per-packet keys;

comparing the first hash value with the second hash value; and if the first hash value does not match the second hash value, transmitting, from the wireless access point, an indication of a potential security breach.

15. A non-transitory computer readable medium having instructions stored therein that, when executed by one or more processors, cause the one or more processors to perform a method comprising:
    obtaining, at a sensor system, sensor data;
    generating, at the sensor system, a plurality of per-packet keys, wherein the plurality of per-packet keys is used to obtain a corresponding plurality of values from a multi-dimensional cubic array;
    encrypting, at the sensor system, the sensor data using the corresponding plurality of values from the multi-dimensional cubic array to generate an encrypted data value;
    transmitting, from the sensor system, a message including the encrypted data value and the plurality of per-packet keys to a wireless access point;
    receiving, at the wireless access point, the message;
    decrypting, at the wireless access point, the encrypted data value using the plurality of per-packet keys to generate unencrypted sensor data, wherein the decryption includes:
        obtaining, at the wireless access point, a third value from a wireless access point multi-dimensional cubic array corresponding to a third per-packet key;
        generating, at the sensor system, a first unencrypted text based on the encrypted data value and the third value;
        obtaining, at the wireless access point, a second value from the wireless access point multi-dimensional cubic array corresponding to a second per-packet key;
        generating, at the sensor system, a second unencrypted text based on the second value and the first unencrypted text;
        obtaining, at the wireless access point, a first value from the multi-dimensional cubic array corresponding to a first per-packet key; and
        generating, at the wireless access point, unencrypted sensor data based on the second unencrypted text and the first value; and
    processing, at the wireless access point, the unencrypted sensor data.

16. The non-transitory computer readable medium of claim 15, wherein the encryption includes:
    obtaining, at the sensor system, a first value from the multi-dimensional cubic array corresponding to a first per-packet key;
    generating, at the sensor system, a first ciphertext based on the first value and the sensor data;
    obtaining, at the sensor system, a second value from the multi-dimensional cubic array corresponding to a second per-packet key;
    generating, at the sensor system, a second ciphertext based on the first ciphertext and the second value;
    obtaining, at the sensor system, a third value from the multi-dimensional cubic array corresponding to a third per-packet key; and
    generating, at the sensor system, a third ciphertext based on the second ciphertext and the third value, wherein the encrypted data value includes the third ciphertext.

17. The non-transitory computer readable medium of claim 16, wherein the method further includes:
    saving, at the sensor system, a current state of the multi-dimensional cubic array;
    altering, at the sensor system, an arrangement of the multi-dimensional cubic array after generating the first ciphertext and before generating the second ciphertext; and
    altering, at the sensor system, an arrangement of the multi-dimensional cubic array after generating the second ciphertext and before generating the third ciphertext.

* * * * *